(12) United States Patent
Harth et al.

(10) Patent No.: US 11,987,652 B2
(45) Date of Patent: May 21, 2024

(54) LIGHT AS CATALYTIC SWITCH: METAL-ORGANIC INSERTION/LIGHT INITIATED RADICAL (MILRAD) POLYMERIZATION

(71) Applicant: University of Houston System, Houston, TX (US)

(72) Inventors: Eva M. Harth, Houston, TX (US); Dain B. Beezer, Houston, TX (US); Anthony Keyes, Houston, TX (US); Glen Richard Jones, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 831 days.

(21) Appl. No.: 17/054,551

(22) PCT Filed: May 10, 2019

(86) PCT No.: PCT/US2019/031882
§ 371 (c)(1),
(2) Date: Nov. 11, 2020

(87) PCT Pub. No.: WO2019/217930
PCT Pub. Date: Nov. 14, 2019

(65) Prior Publication Data
US 2023/0117728 A1    Apr. 20, 2023

Related U.S. Application Data

(60) Provisional application No. 62/756,974, filed on Nov. 7, 2018, provisional application No. 62/670,591, filed on May 11, 2018.

(51) Int. Cl.
| | | |
|---|---|---|
| C08F 2/46 | (2006.01) |
| C08F 2/50 | (2006.01) |
| C08F 120/14 | (2006.01) |
| C08F 220/36 | (2006.01) |
| C08F 293/00 | (2006.01) |
| C08G 61/04 | (2006.01) |

(52) U.S. Cl.
CPC .......... *C08F 120/14* (2013.01); *C08F 220/36* (2013.01); *C08F 293/005* (2013.01); *C08F 2438/00* (2013.01)

(58) Field of Classification Search
CPC .......... C08F 130/32; C08F 130/18; C08F 130/1456; C08F 130/54; C08F 130/36; C08F 118/08; C08F 12/08; C08F 8/12; C08F 8/32; C08F 8/14; C08F 293/005; C08F 2/46; C08F 2/48; C08F 2/297; C08F 2/06; C08F 116/18; C08F 4/7042; C08F 4/7006; C08F 4/64113; C08F 220/36; C08F 220/14; C08F 220/20; C08F 2438/00; C09D 127/12
USPC .............. 522/65, 6, 189, 184, 71, 1; 520/1
See application file for complete search history.

(56) References Cited

U.S. PATENT DOCUMENTS

| | | |
|---|---|---|
| 2002/0123587 A1 | 9/2002 | Sanders et al. |
| 2016/0340463 A1 | 11/2016 | Xu et al. |

OTHER PUBLICATIONS

Xiang et al, Homo- and Co-polymerization of norbornene and methyl acrylate with Pd-diimine catalysts, May 22, 2015, Journal of Organometallic Chemistry, 798, 429-436 (Year: 2015).*
Murata et al, Visible light controlled homo and copolymerization of styrene by a bichromophoric Ir-Pd catalyst, 2015, Chem. Commun., 51, 5717-5720 (Year: 2015).*
International Patent Application No. PCT/US2019/031882 International Search Report and Written Opinion dated Jul. 29, 2019 (15 pages).
Xu, Jiangtao et al., "Selective Photoactivation: From a Single Unit Monomer Insertion Reaction to Controlled Polymer Architectures," Journal of the American Chemical Society, vol. 138, Feb. 25, 2016, pp. 3094-3106.
Keyes, Anthony et al., "Light as a Catalytic Switch for Block Copolymer Architectures: Metal-Organic Insertion/Light Initiated Radical (MILRad) Polymerization," Macromolecules, Sep. 11, 2018 [retrieved on Jun. 27, 2019], retrieved from the Internet: <URL: https//pubs.acs.org/doi/abs/10.1021/acs.macromol.8b01719> (6 pages).
Keyes, Anthony et al., "Metal-organic insertion light initiated radical (MILRad) polymerization: photo-initiated radical polymerization of vinyl polar monomers with various palladium diimine catalysts," Polymer Chemistry, Dec. 19, 2018 [retrieved on Jun. 27, 2019], retrieved from the Internet: <URL: https://pubs.rsc.org/en/content/articlelanding/2019/py/c8py01556b/unauth> (8 pages).
Extended European Search Report dated Jan. 20, 2022, for European Application No. 19799732.3 (6 p.).
Murata, K., "Visible-Light Controlled Homo- and Copolymerization of Styrenes by a Bichromophoric Ir-Pd Catalyst," Chemical Communications, vol. 51, No. 26, Jan. 1, 2015, pp. 5717-5720 (4 p.).
Xiang, Peng et al., "Homo- and Co-polymerization of Norbornene and Methyl Acrylate with Pd-Diimine Catalysts," Journal of Organometallic Chemistry, Elsevier, vol. 798, May 22, 2015, pp. 429-436 (8 p.).

\* cited by examiner

*Primary Examiner* — Jessica Whiteley
(74) *Attorney, Agent, or Firm* — CONLEY ROSE, P.C.

(57) ABSTRACT

A method of polymerizing a first, and a second class of monomers to form product polymer. The first class of monomers polymerize via a radical pathway in the presence of light, and the second class of monomers polymerize via an insertion pathway in the absence of light.

22 Claims, 33 Drawing Sheets

FIG. 1
| FIG. 1A |
| FIG. 1B |
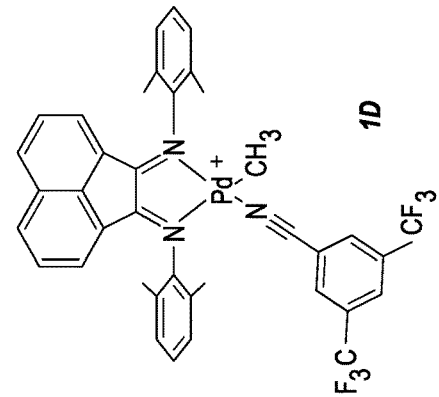
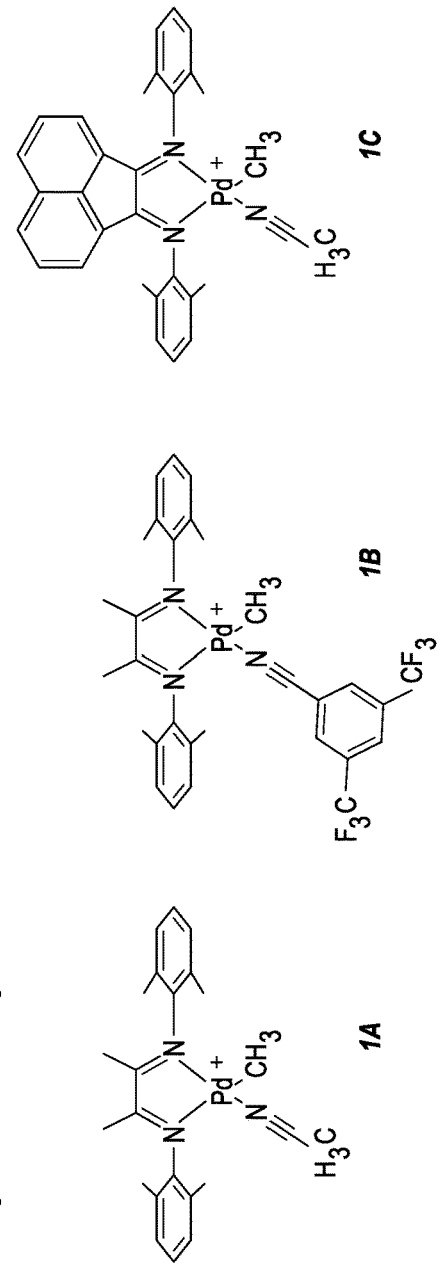
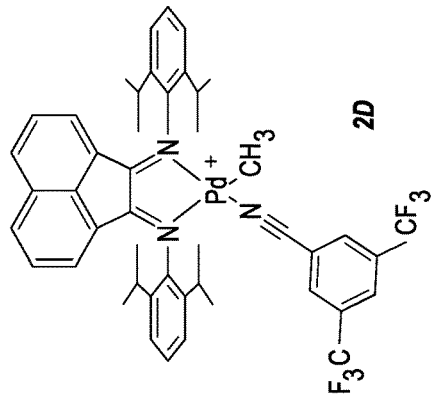
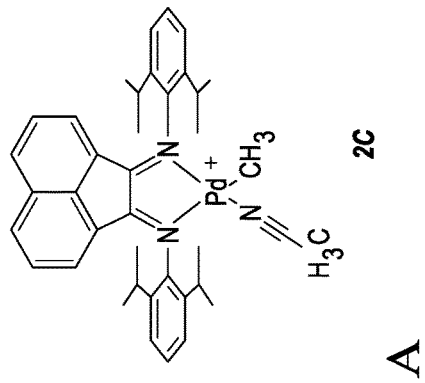
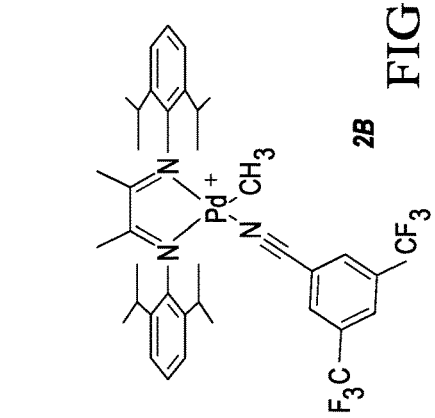
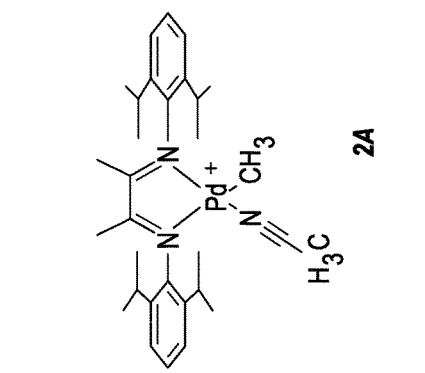
tetrakis[3,5-bis(trifluoromethyl)phenyl]-borate (BArF) counterion for cationic Pd(II)
FIG. 1A tetrakis[3,5-bis(trifluoromethyl)phenyl]-borate (BArF) counterion for cationic Ni(II)

13A - DOUBLE HEADED MILRad CATALYST

14A - DOUBLE HEADED MILRad CATALYST

15A - ONE-POT MILRad/ROMP CHELATE

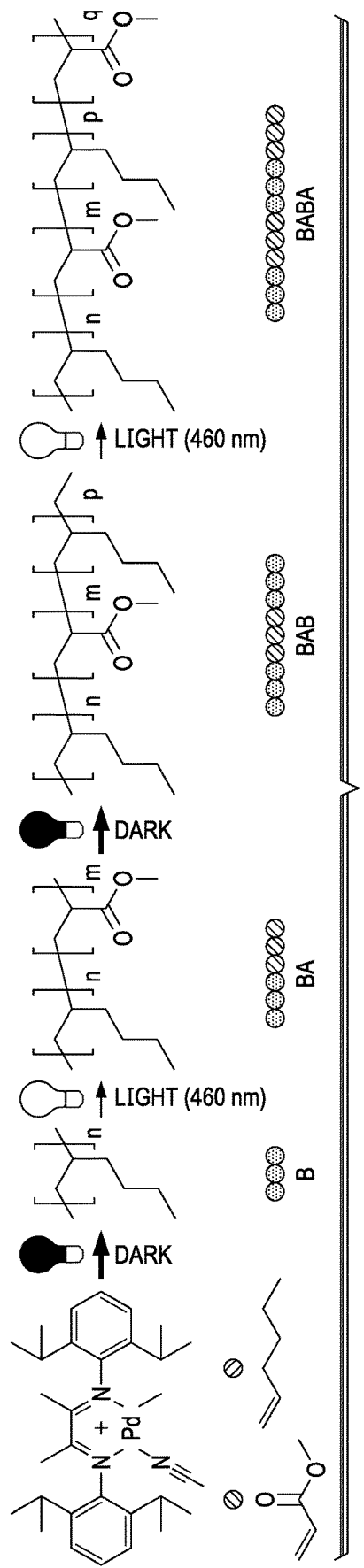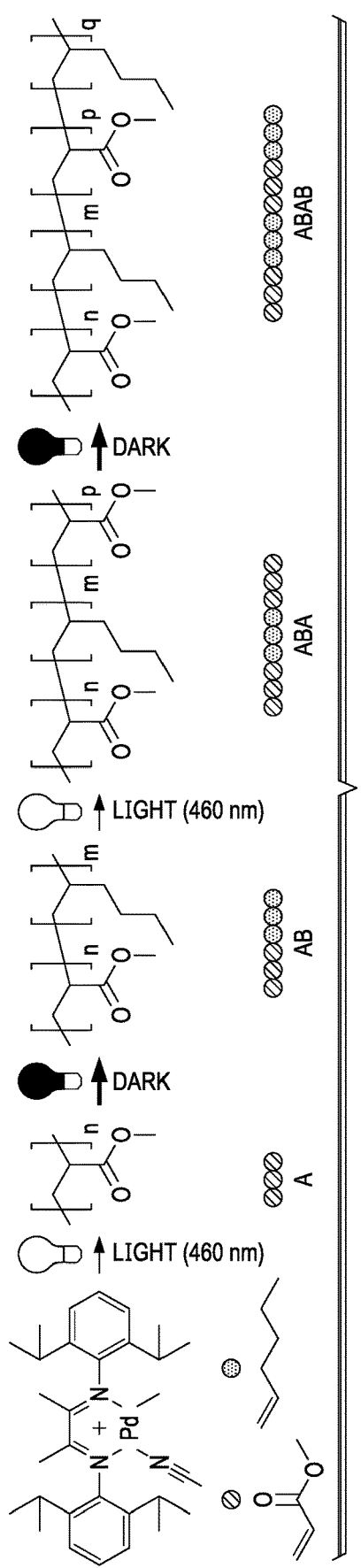
FIG. 5A
FIG. 5B

TABLE 3. ONE-POT MULTIBLOCK COPOLYMERS

| BLOCK COMPOSITION | ONE-POT SYNTHESIS[a] | NUMBER OF BLOCKS | $\alpha$ (%)[b] | $M_{n,th}$ (g/mol)[c] | $M_{n,GPC}$ (g/mol)[d] | $M_w/M_n$[d] | $DP_n$[e] |
|---|---|---|---|---|---|---|---|
| B | DARK | 1 | 32 | --- | 18,000 | 1.22 | 251 |
| BA | LIGHT | 2 | 36 | --- | 23,700 | 1.73 | 141 |
| BAB | DARK | 3 | 5 | --- | 24,400 | 1.82 | 39 |
| BABA | LIGHT | 4 | 9 | 100 | 26,400 | 1.79 | 35 |
| A | LIGHT | 1 | 32 | --- | 16,500 | 1.83 | 125 |
| AB | DARK | 2 | 8 | --- | 18,700 | 1.73 | 63 |
| ABA | LIGHT | 3 | 7 | --- | 19,900 | 1.79 | 27 |
| ABAB | DARK | 4 | 5 | 100 | 21,200 | 1.69 | 39 |

FIG. 8A
TABLE 1. SYNTHESIS OF METHYL ACRYLATE (MA) POLYMERS
| REACTION NUMBER | [MA]/[Pd] | TIME (h)[a] | $\alpha$ (%)[b] | $M_{n,th}$ (g/mol)[c] | $M_{n,GPC}$ (g/mol)[d] | $M_w/M_n$[d] | $DP_n$[e] |
|---|---|---|---|---|---|---|---|
| 1 | 235:1 | 17 | 77 | 20,000 | 56,000 | 1.45 | 195 |
| 2 | 588:1 | 17 | 92 | 50,000 | 83,000 | 1.52 | 541 |
| 3 | 1175:1 | 12 | 87 | 100,000 | 128,000 | 1.68 | 1022 |
| 4 | 2350:1 | 10 | 83 | 200,000 | 201,000 | 1.48 | 1951 |
| 5 | 5880:1 | 10 | 52 | 500,000 | 278,000 | 1.34 | 3058 |
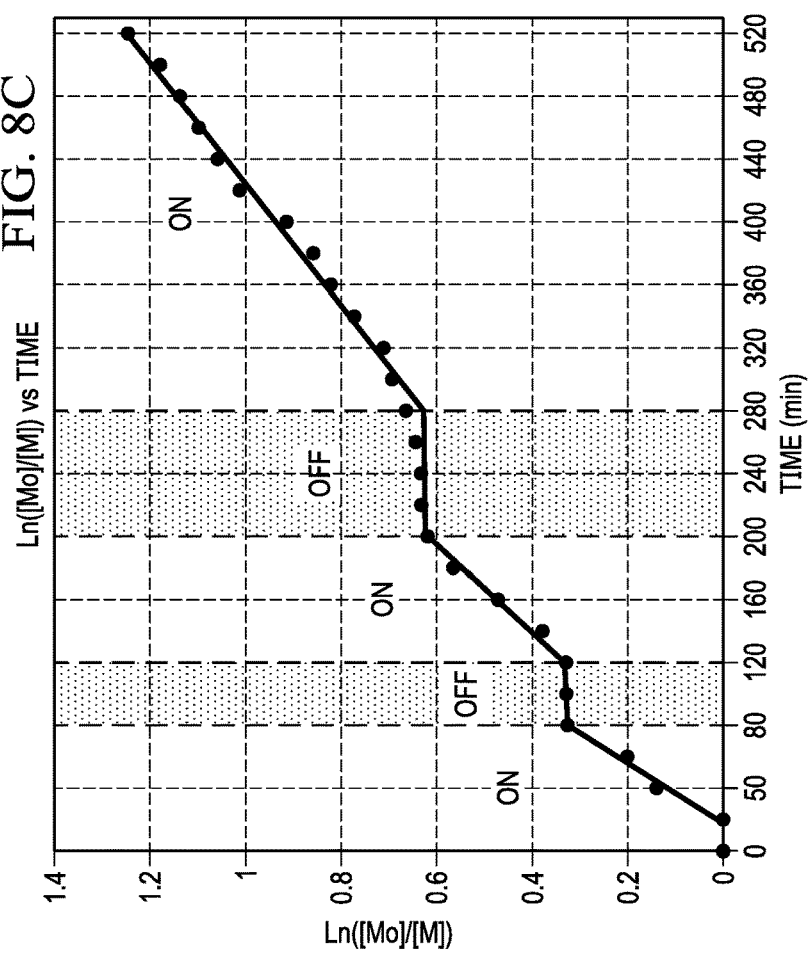
FIG. 8C
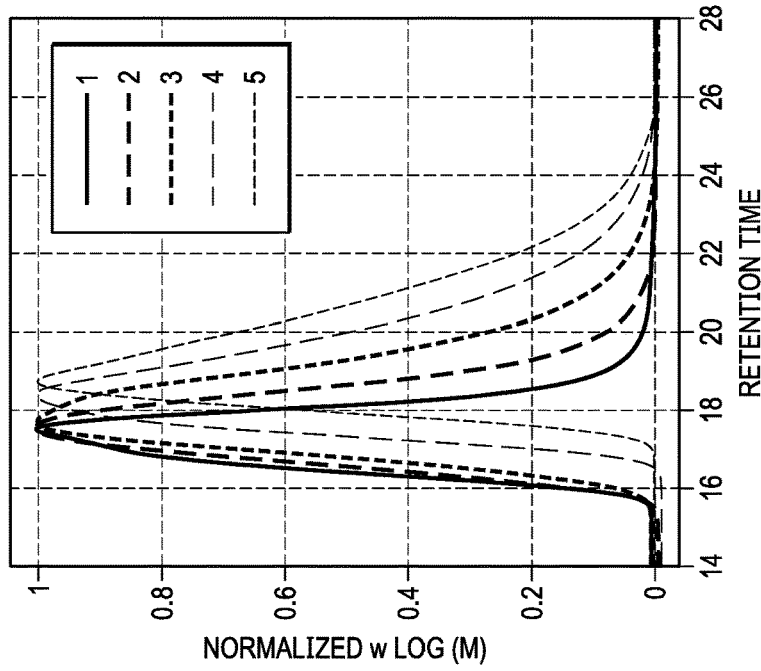
FIG. 8B

| POLYMERIZATION OF MONOMERS UNDER BLUE LIGHT IRRADIATION | | | | | | | | | | |
|---|---|---|---|---|---|---|---|---|---|---|
| | MA | HEA/MA | tBA | nBA | MMA | GMA | NIPAm | DMAA | VAc | St | IBVE |
| 1A | ▒ | ▒ | ▒ | ▒ | ▒ | ▒ | ▧ | ▒ | ▧ | ▧ | ▒ |
| 1B | ▒ | ▒ | ▒ | ▒ | ▒ | ▒ | ▧ | ▒ | ▧ | ▧ | ▒ |
| 1C | ▒ | ▒ | ▒ | ▒ | ▒ | ▒ | ▧ | ▒ | ▧ | ▒ | ▒ |
| 1D | ▒ | ▒ | ▒ | ▒ | ▒ | ▒ | ▧ | ▒ | ▧ | ▒ | ▒ |
| 2A | ▒ | ▒ | ▒ | ▒ | ▒ | ▒ | ▒ | ▒ | ▧ | ▧ | ▒ |
| 2B | ▒ | ▒ | ▒ | ▒ | ▒ | ▒ | ▒ | ▒ | ▧ | ▧ | ▒ |
| 2C | ▒ | ▒ | ▒ | ▒ | ▒ | ▒ | ▧ | ▧ | ▧ | ▒ | ▒ |
| 2D | ▒ | ▒ | ▒ | ▒ | ▒ | ▒ | ▒ | ▒ | ▧ | ▒ | ▒ |
| 3A | ▒ | ▒ | ▒ | ▒ | ▒ | ▒ | ▒ | ▒ | ▧ | ▧ | ▒ |
| 3B | ▒ | ▒ | ▒ | ▒ | ▒ | ▒ | ▒ | ▒ | ▧ | ▒ | ▒ |
| 3C | ▒ | ▒ | ▒ | ▒ | ▒ | ▒ | ▒ | ▒ | ▧ | ▒ | ▒ |
| 3D | ▒ | ▒ | ▒ | ▒ | ▒ | ▒ | ▒ | ▒ | ▧ | ▒ | ▒ |
| 4C | ▒ | ▒ | ▒ | ▒ | ▒ | ▒ | ▒ | ▒ | ▧ | ▒ | ▒ |
| 4D | ▒ | ▒ | ▒ | ▒ | ▒ | ▒ | ▒ | ▒ | ▧ | ▒ | ▒ |

FIG. 12C

| POLYMERIZATION OF MONOMERS IN THE DARK | | | | | | | | | | |
|---|---|---|---|---|---|---|---|---|---|---|
| | MA | HEA/MA | tBA | nBA | MMA | GMA | NIPAm | DMAA | VAc | St | IBVE |
| 1A | ▧ | ▧ | ▧ | ▧ | ▧ | ▧ | ▧ | ▧ | ▧ | ▧ | ▒ |
| 1B | ▧ | ▧ | ▧ | ▧ | ▧ | ▧ | ▧ | ▧ | ▧ | ▧ | ▒ |
| 1C | ▧ | ▧ | ▧ | ▧ | ▧ | ▧ | ▧ | ▧ | ▧ | ▒ | ▒ |
| 1D | ▧ | ▧ | ▧ | ▧ | ▧ | ▧ | ▧ | ▧ | ▧ | ▒ | ▒ |
| 2A | ▧ | ▧ | ▧ | ▧ | ▧ | ▧ | ▧ | ▧ | ▧ | ▧ | ▒ |
| 2B | ▧ | ▧ | ▧ | ▧ | ▧ | ▧ | ▧ | ▧ | ▧ | ▒ | ▒ |
| 2C | ▧ | ▧ | ▧ | ▧ | ▧ | ▧ | ▧ | ▧ | ▧ | ▒ | ▒ |
| 2D | ▧ | ▧ | ▧ | ▧ | ▧ | ▧ | ▧ | ▧ | ▧ | ▒ | ▒ |
| 3A | ▧ | ▧ | ▧ | ▧ | ▧ | ▧ | ▧ | ▧ | ▧ | ▧ | ▒ |
| 3B | ▧ | ▧ | ▧ | ▧ | ▧ | ▧ | ▧ | ▧ | ▧ | ▧ | ▒ |
| 3C | ▧ | ▧ | ▧ | ▧ | ▧ | ▧ | ▧ | ▧ | ▧ | ▧ | ▒ |
| 3D | ▧ | ▧ | ▧ | ▧ | ▧ | ▧ | ▧ | ▧ | ▧ | ▧ | ▒ |
| 4C | ▧ | ▧ | ▧ | ▧ | ▧ | ▧ | ▧ | ▧ | ▧ | ▧ | ▒ |
| 4D | ▧ | ▧ | ▧ | ▧ | ▧ | ▧ | ▧ | ▧ | ▧ | ▧ | ▒ |

FIG. 12D

| FIG. 14A |
| FIG. 14B |

| FIG. 16A |
|---|
| FIG. 16B |
| FIG. 16C |

| FIG. 17A |
| FIG. 17B |
| FIG. 17C |

LIGHT AS CATALYTIC SWITCH: METAL-ORGANIC INSERTION/LIGHT INITIATED RADICAL (MILRAD) POLYMERIZATION

CROSS-REFERENCE TO RELATED APPLICATIONS

The present application is a National Phase Entry of, and claims priority to PCT Application No. PCT/US2019/031882, filed May 10, 2019, which claims priority to U.S. Provisional Patent Application No. 62/670,591, filed May 11, 2018 and U.S. Provisional Patent Application No. 62/756,974, filed Nov. 7, 2018, the entire contents of each being hereby incorporated by reference herein for all purposes.

TECHNICAL FIELD

The present disclosure relates to polymerization; more particularly, this disclosure relates to metal-organic insertion/light initiated radical (MILRad) polymerization; still more particularly, this disclosure relates to methods of polymerization that utilize the presence or absence of light to respectively promote radical polymerization and insertion polymerization.

BACKGROUND

Polymers containing polyolefin and acrylate or styrene segments have been highly desirable because of their material properties which are attributed to the organization of these segmented blocks in the bulk. Conventionally, these materials are made in a time consuming, step-wise process in which the polymers are first made separately, modified and subsequently added together via a chemical reaction. With this conventional process, the variation of these mostly triblock copolymers is limited.

Accordingly, a need exists for a method to provide the synthesis and availability of block copolymers containing functionalized and non-functionalized α-olefins. Desirably, the method enables the production of thermoplastic elastomers in a one-pot process instead of requiring a cumbersome multistep procedure.

BRIEF SUMMARY OF THE DISCLOSURE

Embodiments disclosed herein include: A: A method of polymerization to form a product polymer, the method comprising: polymerizing a first monomer selected from a first class of monomers in the presence of a polymerization catalyst; and polymerizing a second monomer selected from a second class of monomers in the presence of the polymerization catalyst, wherein the first class of monomers comprises monomers that polymerize via a radical pathway and wherein the polymerizing of the first monomer is performed in the presence of light, wherein the second class of monomers comprises monomers that polymerize via an insertion pathway and wherein the polymerizing of the second monomer is performed in the absence of light.

B: A method of polymerization, the method comprising: (a) providing a polymerization mixture comprising a polymerization catalyst, a first monomer (A), and optionally a second monomer (B), wherein the first monomer is selected from a first class of monomers that polymerize via a radical pathway, and wherein the second monomer is selected from a second class of monomers that polymerize via an insertion pathway; (b) effecting polymerization of the first monomer (A) by exposing the polymerization catalyst to light; and/or (c) effecting polymerization of the second monomer (B) by exposing the polymerization catalyst to darkness, to provide a product polymer.

Each of embodiments A and B may have one or more of the following additional elements: Element 1: wherein the polymerization catalyst comprises an organometallic catalyst, including metallocene catalysts, for which light activation of the organometallic catalyst makes it operable as a radical polymerization catalyst, and for which the absence of light makes the catalyst operable as an insertion polymerization catalyst. Element 2: wherein the polymerizing of the first monomer and the polymerizing of the second monomer are effected substantially sequentially. Element 3: wherein the polymerizing of the first monomer is effected prior to the polymerizing of the second monomer, wherein the polymerizing of the second monomer is effected prior to the polymerizing of the first monomer, or a combination thereof. Element 4: wherein the first class comprises functionalized olefins. Element 5: wherein the first monomer is selected from vinyl monomers, including acrylates, methacrylates, acrylamides, styrenes, and derivatives or combinations thereof. Element 6: wherein the first monomer comprises methyl acrylate. Element 7: wherein the second class of monomers comprises non-functionalized olefins. Element 8: wherein the second monomer is selected from hexenes, butadienes, ethylenes, propylenes, or a combination thereof. Element 9: wherein the polymerizing of the first monomer and the polymerizing of the second monomer are initiated by turning a light on or off, respectively. Element 10: wherein the presence of light comprising the presence of blue light. Element 11: further comprising controlling a polydispersity and/or molecular weight of each of the polymerizing of the first monomer and the polymerizing of the second monomer. Element 12: wherein the product polymer comprises a block copolymer. Element 13: wherein the polymerizing of the first monomer and the polymerizing of the second monomer are effected in a single vessel (e.g., via 'one pot'). Element 14: wherein the block copolymer comprises a di-, tri-, or higher multi-block co-polymer. Element 15: further comprising first performing (b) subsequent (a), and/or alternating between (b) and (c) to provide a product polymer comprising the structure A, AB, ABA, or ABAB. Element 16: further comprising first performing (c) subsequent to (a) and prior to first performing (b), and/or alternating between (c) and (b) to provide a product polymer comprising the structure B, BA, BAB, or BABA. Element 17: further comprising providing a third monomer (C) and effecting polymerization of the third monomer in the presence of the product polymer. Element 18: wherein the polymerizing of the third monomer (C) is effected via the same or a different polymerization catalyst, and wherein the polymerizing of the third monomer (C) is effected prior to or subsequent (b) and/or (c).

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5 is a schematic of (A) the one pot synthesis of BABA block copolymers, according to embodiments of this disclosure, and (B) the one pot synthesis of ABAB block copolymers, according to embodiments of this disclosure;

FIG. 8 details the synthesis of Methyl Acrylate (MA) polymers, wherein (A)$^a$ details experimental conditions: duch as solvent, dichloromethane (DCM); light source, blue LED light ($\lambda_{max}$=460 nm). $^b$Monomer conversion was determined by $^1$H NMR spectroscopy. $^c$Theoretical molecular weight was calculated based on 100% conversion of monomer from the following equation: $M_{n,th}$=[M]$_0$/[Pd]×MW$^M$, where [M]$_0$, [Pd], and MW$^M$ correspond to initial monomer concentration, initial Pd catalyst concentration, and molar mass of the monomer respectively. $^d$Molecular weight and polydispersity index ($M_w/M_n$) were determined by GPC analysis with samples run in THF at 40° C. calibrated to polymethyl methacrylate standards. $^e$Degree of polymerization was calculated from the following equation: DP= [M]$_0$/[Pd]×α, where [M]$_0$, [Pd], and α correspond to initial monomer concentration, initial Pd catalyst concentration, and conversion determined by $^1$H NMR respectively. (B) shows GPC curves were obtained from samples (unprecipitated) measured in THF at 40° C. using polymethyl methacrylate standards; and (C) shows the polymerization of MA in the presence (ON) and absence (OFF) of light.

DETAILED DESCRIPTION OF DISCLOSED EXEMPLARY EMBODIMENTS

Figure 1B:
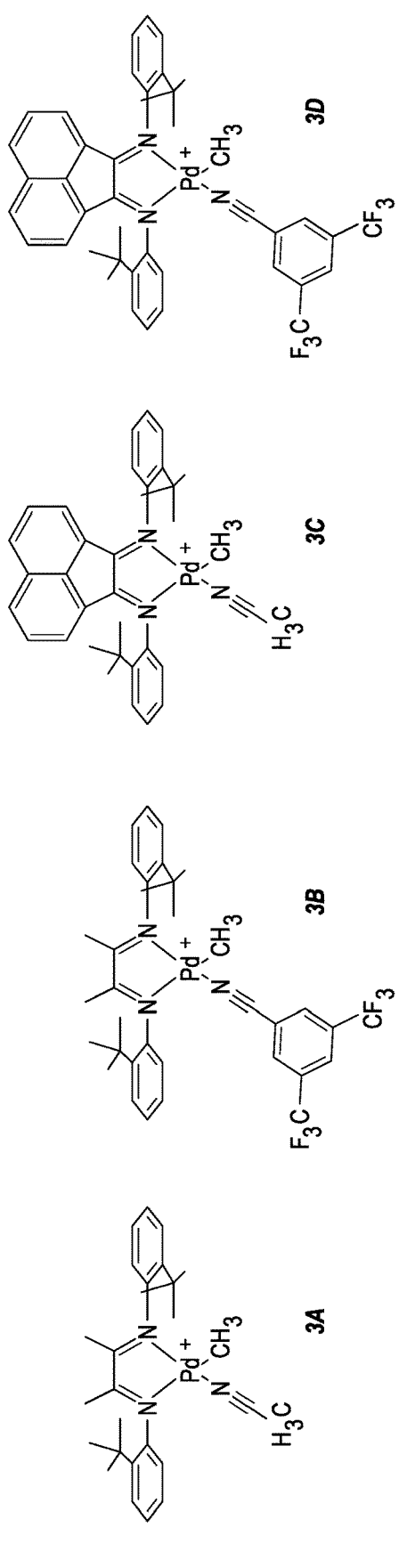
FIG. 1 is a schematic of suitable cationic palladium polymerization catalysts, according to embodiments of this disclosure.

It should be understood at the outset that although an illustrative implementation of one or more exemplary embodiments are provided below, the disclosed compositions, methods, and/or products may be implemented using any number of techniques, whether currently known or in existence. The disclosure should in no way be limited to the illustrative implementations, drawings, and techniques illustrated herein below, including the exemplary designs and implementations illustrated and described herein, but may be modified within the scope of the appended claims along with their full scope of equivalents.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ."

Overview

Herein disclosed is a novel polymerization technique which may be referred to herein as Metal-Organic Insertion/ Light Initiated Radical or 'MILRad' polymerization. MILRad polymerization may be utilized to bridge organometallic insertion polymerization with light initiated radical polymerization using a single metal organic catalyst. It was unexpectedly discovered that light irradiation can be utilized to convert an organometallic catalyst into a photocatalytic system which enables a controlled "ON/OFF" radical polymerization process. This complements the insertion polymerization process that for organometallic catalysts takes place in in the dark. It has been unexpectedly discovered that the catalyst can act reversibly as an insertion catalyst in the dark and can be switched to act as a radical polymerization catalyst in the light. Insertion polymerization of acrylates using organometallic catalysts has been pursued vigorously, underlining that the polymerization of acrylates using the insertion route is ineffective and an alternative process could prove successful. Heretofore, utilizing organometallic catalysts for a controlled radical polymerization has not been possible. According to the method of this disclosure, via activation with light, a suitable organometallic catalyst, as described herein, can be utilized to produce acrylate polymers, in embodiments. The herein-disclosed method enables the production of acrylate polymers with control over a broad molecular weight range reaching from a number average molecular weight ($M_n$) in a range from about 50,000 g/mol to about 500,000 g/mol with exceptional low dispersity values. Some monomers (e.g., hexene) show preference for an insertion polymerization process, while other monomers (e.g., methacrylate) show preference for a radical polymerization process. The herein disclosed method provides for the polymerization of monomers from two different classes using a single catalyst. In embodiments, the polymerization of the monomers from the two different classes can be performed in a one-pot process. In embodiments, therefore, a mixture of a monomer from the class of monomers that show preference for radical polymerization and a monomer from the class of monomers that show preference for insertion polymerization (e.g., a mixture of methacrylate and hexene) can be selectively polymerized from a radical or insertion process, respectively, in the presence of each other, enabling the formation of distinct block copolymer architectures. Thus, in embodiments, multi-block copolymers (e.g., ABABA and BABA) starting either with a monomer from the first class (e.g., functionalized α-olefins, such as acrylates) (A) or the second class (e.g., non-functionalized α-olefins, such as hexenes or ethylene for example) (B), respectively, in a mixture of both monomers can be formed, in one-pot. The herein disclosed method is thus not limited to sequential methodologies (although it can, in embodiments, comprise sequential polymerizations of the monomers from different classes) which rely upon quantitative conversions for block-copolymer synthesis, nor does the herein disclosed method require post-modification, purification, or sequential addition of monomers. In embodiments, the herein disclosed methods provide a one-pot synthesis of distinct block copolymer architectures, due to the spatial and temporal control afforded via the herein disclosed method. In embodiments, the herein disclosed method provides for the formation of distinct, precise block copolymer architectures from two classes of monomers, and provides new avenues for the creation of thermoplastic elastomers in a more practical way and with a higher diversity of structure and functional groups.

Both polymerization methodologies, insertion and radical polymerization, have thus been tailored towards the characteristics of two monomer classes, such as in some embodiments to non-polar monomers and functional polar monomers.

The herein-disclosed MILRad polymerization method can be utilized, in embodiments, to prepare thermoplastic elastomers with a single catalyst one-pot synthesis, via the use of light as a stimulus.

Functionalized and Non-Functionalized α-Olefin Monomers

The novel polymerization method provided herein facilitates the polymerization of vinyl monomers (which are also referred to as 'functionalized α-olefins') together with α-olefins (which are also referred to as 'non-functionalized α-olefins') to form homopolymers and block copolymers using a metal-organic catalyst. In embodiments, homopolymers of functionalized polar monomers or functionalized α-olefins are produced. Such functionalized α-olefins include, without limitation, acrylates, methacrylates, acrylamides, styrenes, vinylethers, acrylonitrile, fluorinated olefins, acrylesters, norbornene, and derivatives thereof. Suitable α-olefins include, without limitation, hexenes, butadienes, ethylenes, propylenes, etc. The herein disclosed method utilizes the presence of an external stimuli (i.e., light) to turn an insertion catalyst into a catalyst capable to perform the radical polymerization of the functionalized α-olefins (e.g., acrylates and/or vinyl monomers) and thus produce homo and/or block copolymers that can be prepared in a "one-pot" method or a sequential multi-pot method simply by switching light "ON" or "OFF".

Polymerization Catalyst

Metal-organic catalysts are one of the most important classes of catalysts utilized to perform insertion polymerization for the production of polyolefins, notably polyethylene and polypropylene. However, most thermoplastic elastomers contain either vinylic or acrylic components in form of block copolymers which are made in step-wise time consuming processes. The inventors identified herein have discovered that, via methods of this disclosure, a metal-organic catalyst can be turned into a photocatalytic system via activation with light, which changes the activity of the polymerization catalyst to enable the polymerization of functionalized α-olefins, such as acrylates, via a radical pathway. Contrary to heretofore known methods, the radical mechanism pathway provided via this disclosure can, in embodiments, provide control over the molecular weight and dispersities of the product polymer, enhancing the practical use of this method. The herein disclosed method comprises the exposure of the metal-organic catalysts with visible light, whereby the catalyst becomes selective towards the polymerization of acrylates (e.g., of functionalized α-olefins) which may be present in a mixture with α-olefins, such as, without limitation hexene. Homopolymers of acrylates can be prepared under light exposure and the control in the targeted molecular weight can be obtained, as shown in the experiments of Appendices A and B. When the light is switched off, the polymerization does not propagate in a radical polymerization pathway, but can propagate via an insertion mechanism when non-functionalized α-olefins are present in the polymerization mixture. Thus, the conversion of the polymerization can be precisely controlled through the light exposure.

As noted hereinabove, the herein disclosed MILRad polymerization method utilizes a polymerization catalyst. The polymerization catalyst can be selected from organometallic catalysts, including metallocene catalysts, that are known or yet to be discovered, and which demonstrate operability for radical polymerization in the presence of light and insertion polymerization in the absence of light. Without wising to be limited by theory, in embodiments, the polymerization catalyst demonstrates the following photocatalytic activity. In embodiments, light activation can generate a radical in the organometallic catalyst. In embodiments, photo-induced electron transfer can occur within a metal ligand complex, through either a metal to ligand charge transfer (3d→π*) transition or a ligand to metal charge transfer can occur, which can be either captured by an electron acceptor or relapse in a reversible fashion. This charge transfer can be exploited to generate and propagate a radical polymerization in the presence of light. In the dark, the catalyst reverts to a traditional coordination-insertion polymerization catalyst. It is to be understood that when 'same' catalyst is mentioned herein, it means the same initial composition or catalyst, although the catalyst is 'different' with respect to its catalytic ability when exposed or not exposed to light, as described herein.

Again, without wishing to be limited by theory, in embodiments, the polymerization catalyst exhibits the ability of a metal ligand complex to function as a photocatalytic system. The labile nature of the metal-carbon bond may serve as the site of a dormant radical, and access to this radical may be achieved photochemically. The use of light can facilitate a reversible radical pathway that provides spatial and temporal control over the radical polymerization. The spatial control is evidenced by the precise arrangement of the copolymer blocks throughout the polymer, while the temporal control is evidenced by the control of the propagation time of the radical and the insertion polymerization by turning the light "ON" or "OFF", respectively.

In general, a suitable organometallic catalyst can perform insertion polymerization for olefins in the absence of light. In embodiments, light irradiation of the polymerization catalyst can generate a radical in the organometallic catalyst. Again without wishing to be limited by theory, photo-induced electron transfer can occur within a metal ligand complex, metal to ligand charge transfer (MLCT) (or a ligand to metal charge transfer LMCT), can be captured or relapse in a reversible fashion. In embodiments, the ligand charge transfer can be exploited to generate and propagate a radical polymerization in the light, and in the dark the catalyst reverts to an insertion catalyst.

In embodiments, the polymerization catalyst exhibits the ability of a metal ligand complex to function as a photocatalytic system. Without wishing to be limited by theory, in such embodiments, the labile nature of the metal-carbon bond serves as the site of a dormant radical, and access to this radical is achieved photochemically. In such embodiments, the use of light may facilitate a reversible radical pathway that provides spatial and temporal control over the radical polymerization.

Figure 1B:
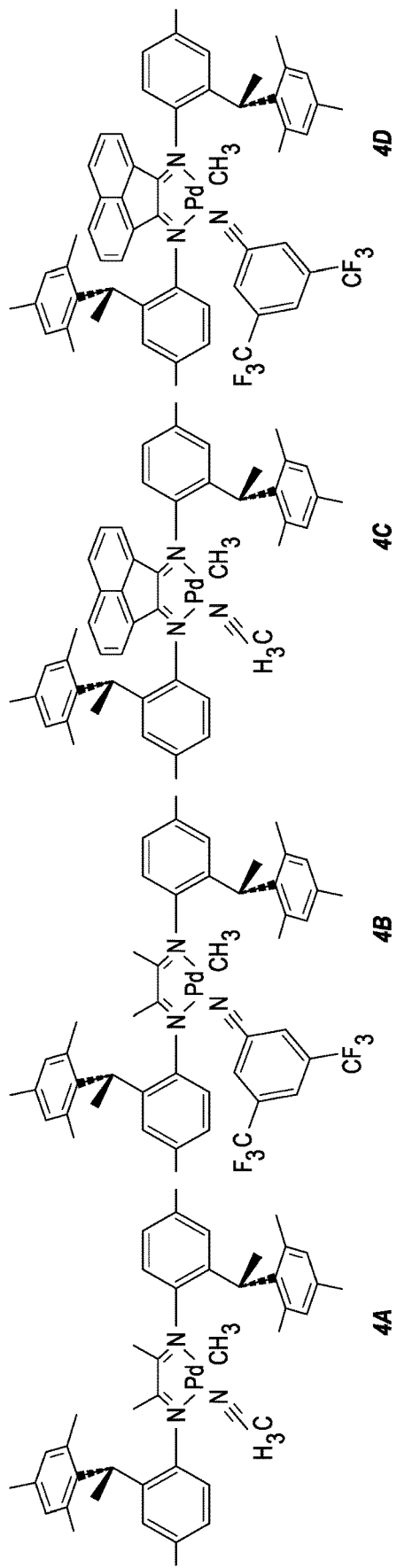
Figure 2:
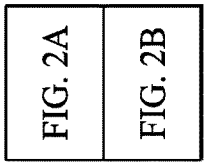
FIG. 2 is a schematic of suitable cationic nickel polymerization catalysts, according to embodiments of this disclosure.
Figure 2:
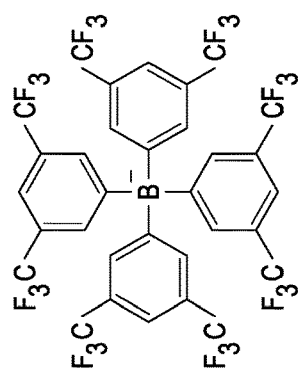
Figure 2:
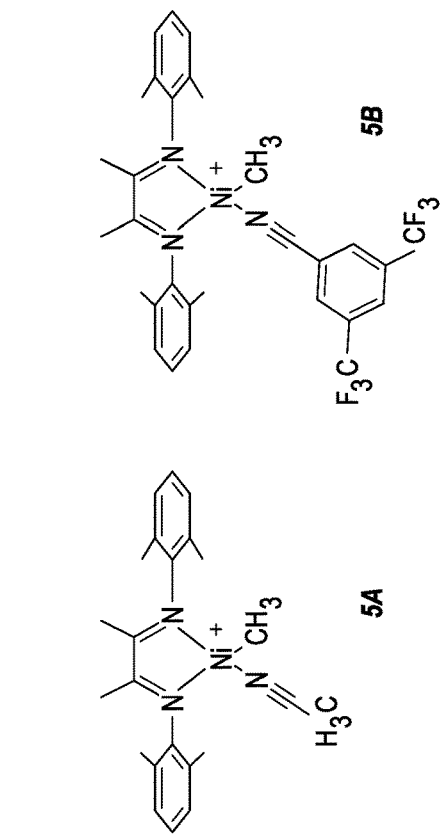
Figure 2:
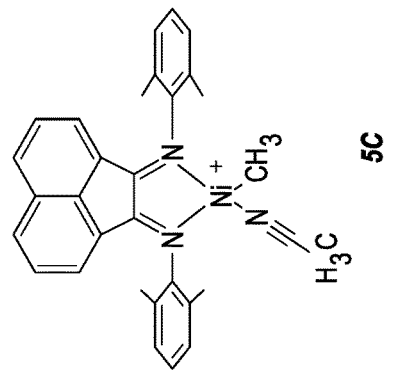
Figure 2:
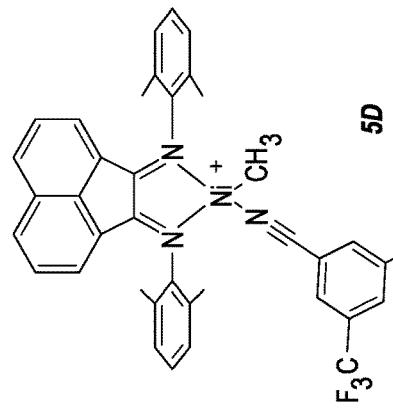
Figure 2:
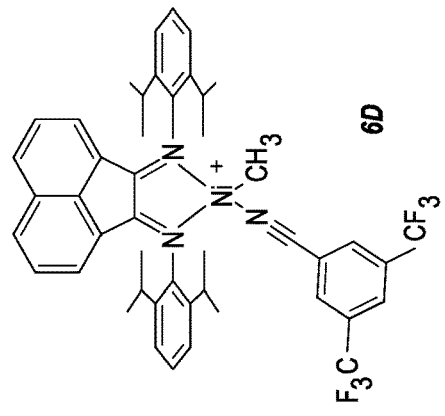
Figure 2:
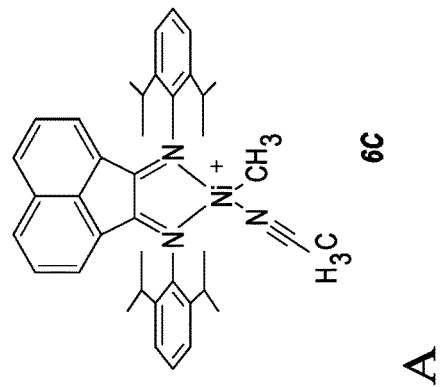
Figure 2:
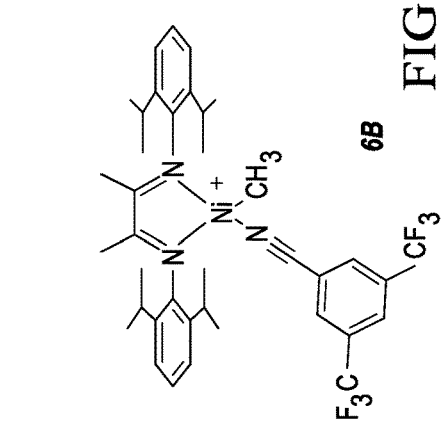
Figure 2:
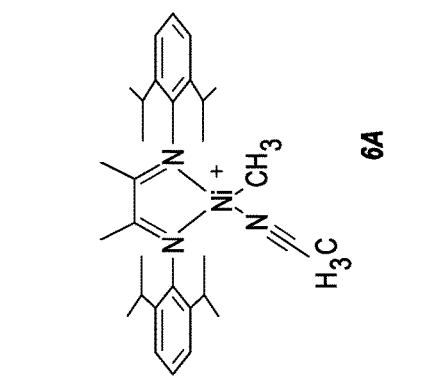
Figure 2B:
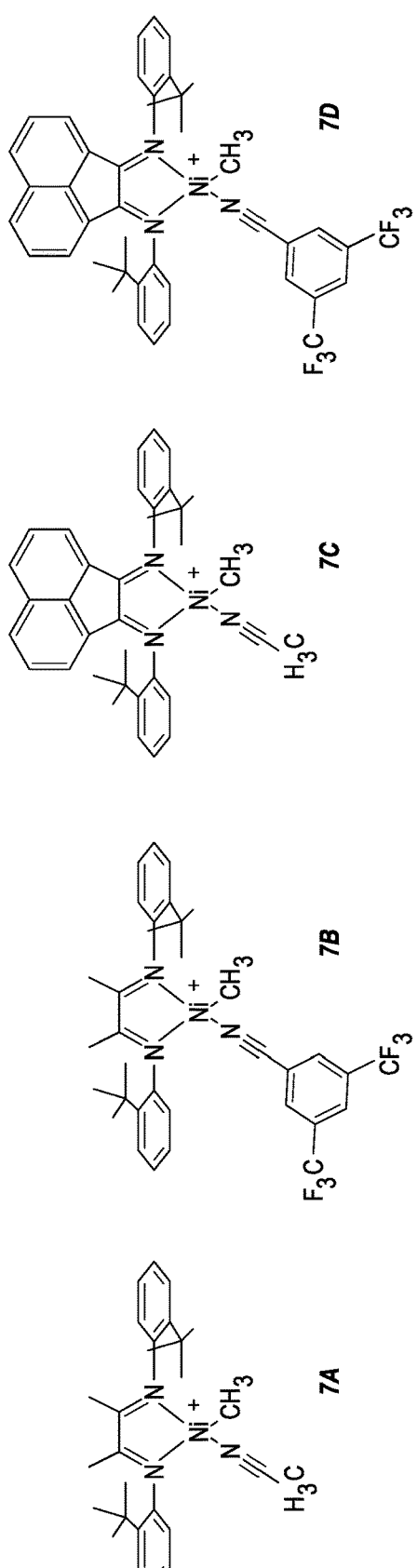
Figure 2B:
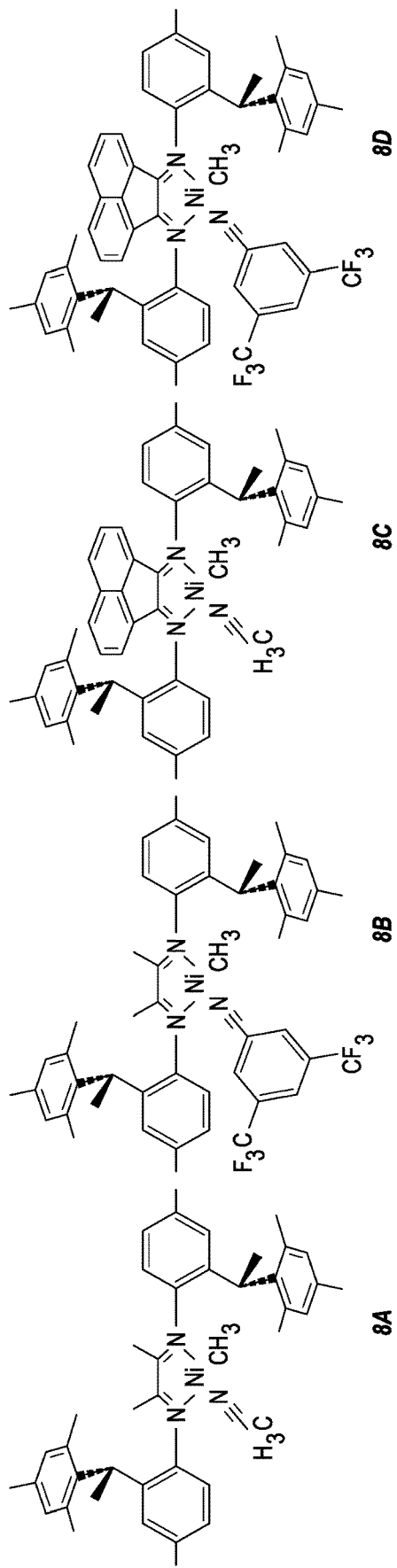

Suitable catalysts are provided in FIGS. 1-3. FIG. 1 and FIG. 2 provide cationic nickel and palladium catalysts with counterion (e.g., tetrakis[3,5-bis(trifluoromethyl)phenyl]-borate (BArF)). In embodiments, the catalyst comprises a cationic palladium catalyst as shown in 1a, 1b, 1c, 1d, 2a, 2b, 2c, 2d, 3a, 3b, 3c, 3d, 4a, 4b, 4c, and/or 4d of FIG. 1. In embodiments, the catalyst comprises a cationic nickel catalyst as shown in 5a, 5b, 5c, 5d, 6a, 6b, 6c, 6d, 7a, 7b, 7c, 7d, 8a, 8b, 8c, and/or 8d of FIG. 2. In embodiments, the polymerization catalyst comprises a nickel, iron, or cobalt catalyst selected from 9a, 10a, 11a, or 12a, depicted in FIG. 3. Suitable anionic counterion (e.g., tetrakis[3,5-bis(trifluoromethyl)phenyl]-borate (BArF)) is shown at the top of FIG. 1 and FIG. 2. Other catalysts and counterions are possible that can be activated by light to perform MILRad polymerization.

According to embodiments of this disclosure, block copolymers can be formed in a single vessel or 'one-pot' process. Alternatively or additionally, block copolymers can also be formed in a sequential apparatus procedure. Without wishing to be limited by theory, the ability to form block copolymers in one-pot provided by embodiments of the herein disclosed method can be attributed to the different reactivity of the non-functionalized α-olefin (e.g., hexene) in the presence of the functionalized α-olefin (e.g., acrylate). The non-functionalized α-olefin (e.g., hexene) does not substantially convert and polymerize in the light in the presence of the functionalized α-olefins (e.g., acrylate). This makes it possible to establish an "ON-OFF" process in which the functionalized α-olefin (e.g., acrylate) polymerizes in the light and the non-functionalized α-olefin (e.g., hexene) polymerizes in the dark. The herein disclosed MILRad polymerization is the only polymerization which is capable of producing block copolymers in a one-pot process, where the two monomers are present in a (homogenous) mixture of the non-functionalized olefin and the functionalized olefin. In contrast to homopolymer reaction according to embodiments of this disclosure, the conversions of the monomers in copolymer applications, slow down, as evidenced by the experiments described in Appendices A and B. However, the herein-disclosed method provides an effective block copolymer process to produce block copolymers starting from functionalized olefin (A), such as acrylates (e.g., AB, ABA and ABAB polymers), as well as block copolymers starting from the non-functionalized olefin (B) (e.g., BA, BAB and BABA polymers). In embodiments, the copolymers can be produced in good yields and/or conversions and/or with low polydispersities (e.g., under 2.0). The sequential vessel approach according to this disclosure provides the advantage of creating blocks from not only two types of monomers but also creating multiblocks from a diverse set of monomers to provide polymers with unique properties. The herein-disclosed method enables, for the first time, the copolymerization of functionalized α-olefin (e.g., acrylates and/or vinyls) together with non-functionalized α-olefin (e.g., ethylenes) so that block copolymers can be generated from this process (sequentially or in mixture). The two classes of monomers (e.g., functionalized and non-functionalized α-olefin) can be polymerized via the herein disclosed method to produce high quality polymers.

Figures 4A, 4B, 4C:
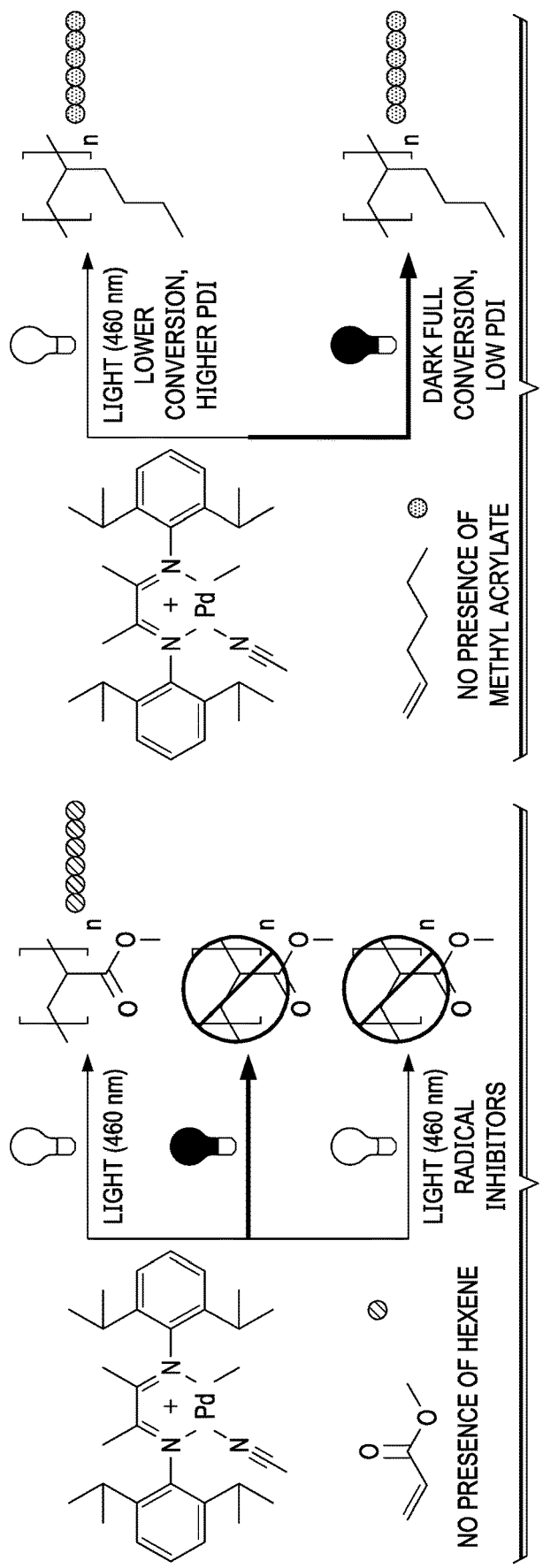
FIG. 4 is a schematic of (A) homopolymerization of a functionalized α-olefin MA, (B) homopolymerization of a non-functionalized α-olefin hexene, and (C) one pot synthesis of homopolymers of functionalized α-olefin MA or non-functionalized α-olefin hexene by irradiation with light, according to embodiments of this disclosure.

FIG. 4 is a schematic of (A) homopolymerization of a functionalized α-olefin, (B) homopolymerization of a non-functionalized α-olefin, and (C) one pot synthesis of homopolymers of functionalized α-olefin or non-functionalized α-olefin by irradiation and/or non-irradiation of the catalyst with light, according to embodiments of this disclosure. Although made with reference to hexene as the non-functionalized α-olefin B and methyl acrylate (MA) as the functionalized α-olefin A and the specific polymerization catalyst depicted, it is to be understood that other functionalized and non-functionalized α-olefins can be utilized, and are within the scope of this disclosure. With reference to panel (A) of FIG. 4, in the presence of light and the cationic palladium catalyst, MA will undergo polymerization. In the dark, there is no formation of the polymethyl acrylate. As evidenced by the experiments provided in Appendices A and B, if radical inhibitors, such as galvinoxyl, are introduced into the reaction, no polymerization of MA is observed even in the presence of light. With reference to panel (B) of FIG. 4, hexene polymerizes in the dark and light using the cationic palladium catalyst. As evidenced by the experiments provided in Appendices A and B, polymerization in the light exhibits lower conversion and higher PDI as compared to the polymerization in the dark. With reference to panel C of FIG. 4, when hexene and MA are polymerized in a one-pot method with both monomers present, only polyhexene is observed when performed in dark conditions; when in the light, only polymethyl acrylate is observed in the reaction.

FIG. 5 is a schematic of (A) the one-pot synthesis of BABA block copolymers, according to embodiments of this disclosure, and (B) the one-pot synthesis of ABAB block copolymers, according to embodiments of this disclosure. As seen in panel (A) of FIG. 5, in the dark, hexene B is polymerized (in the presence of methyl acrylate A) to form polymer B; with the addition of light (e.g., 460 nm), the MA in the polymer mixture is polymerized, to form diblock BA; with the switching off of the light, hexene B in the polymer mixture is again polymerized, to form tri-block BAB; switching on of the light again polymerizes methyl acrylate A in the polymer mixture, to form tetrablock copolymer BABA. Similarly, as in panel (B) of FIG. 5, in the light, MA A (in a mixture comprising hexene B) is polymerized to form polymer A; with the removal of light, hexene B in the mixture is polymerized, to form diblock AB; with the switching on of the light, MA in the mixture is again polymerized, to form tri-block copolymer ABA; switching off of the light again polymerizes hexene B in the mixture, to form tetrablock copolymer ABAB.

Figure 6A:
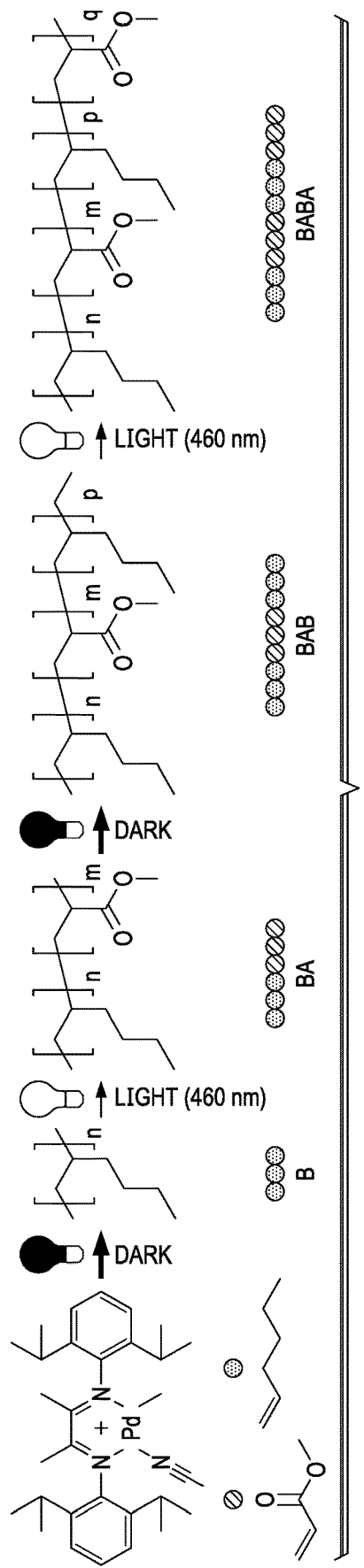
FIG. 6 is a schematic of (A) the sequential synthesis of BAB block copolymers, and (B) the sequential synthesis of ABA block copolymers.
Figure 6B:
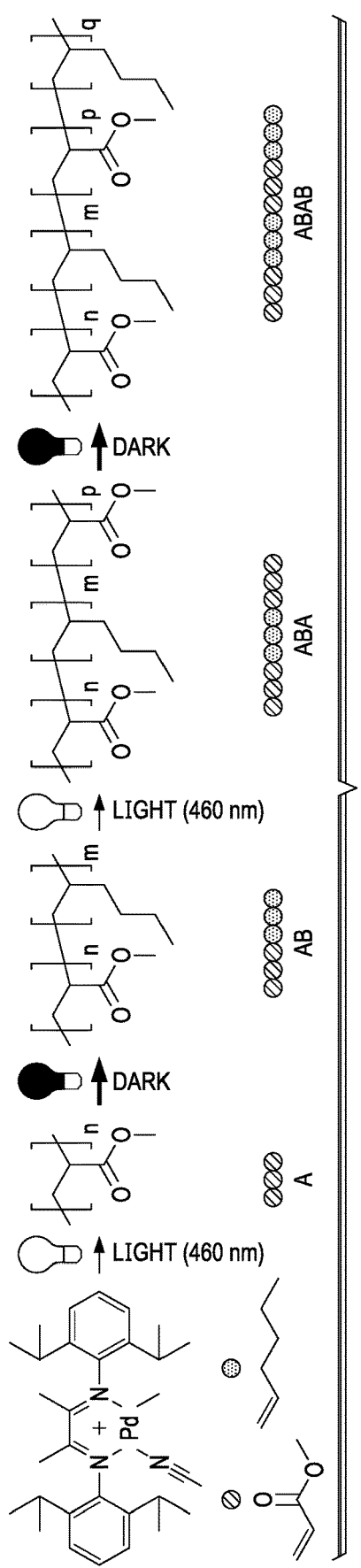
Figures 6, 6C:
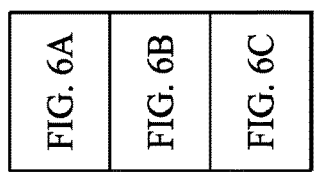

FIG. 6 is a schematic of (A) the sequential synthesis of BAB block copolymers, and (B) the sequential synthesis of ABA block copolymers. As seen in panel (A) of FIG. 6, hexene monomer B (alone) is polymerized in the dark, to produce polymer B; turning on of the light and addition of MA A results in the polymerization of A, to produce di-block BA; turning off of the light and the addition of hexene B results in the polymerization of hexene B, to produce tri-block copolymer BAB. As seen in panel (B) of FIG. 6, methyl acrylate A (alone) is polymerized in the light, to produce polymer A; turning off of the light and addition of hexene B results in the polymerization of B, to produce di-block AB; turning on of the light and the addition of MA A results in the polymerization of MA A, to produce tri-block copolymer ABA.

Figure 7:
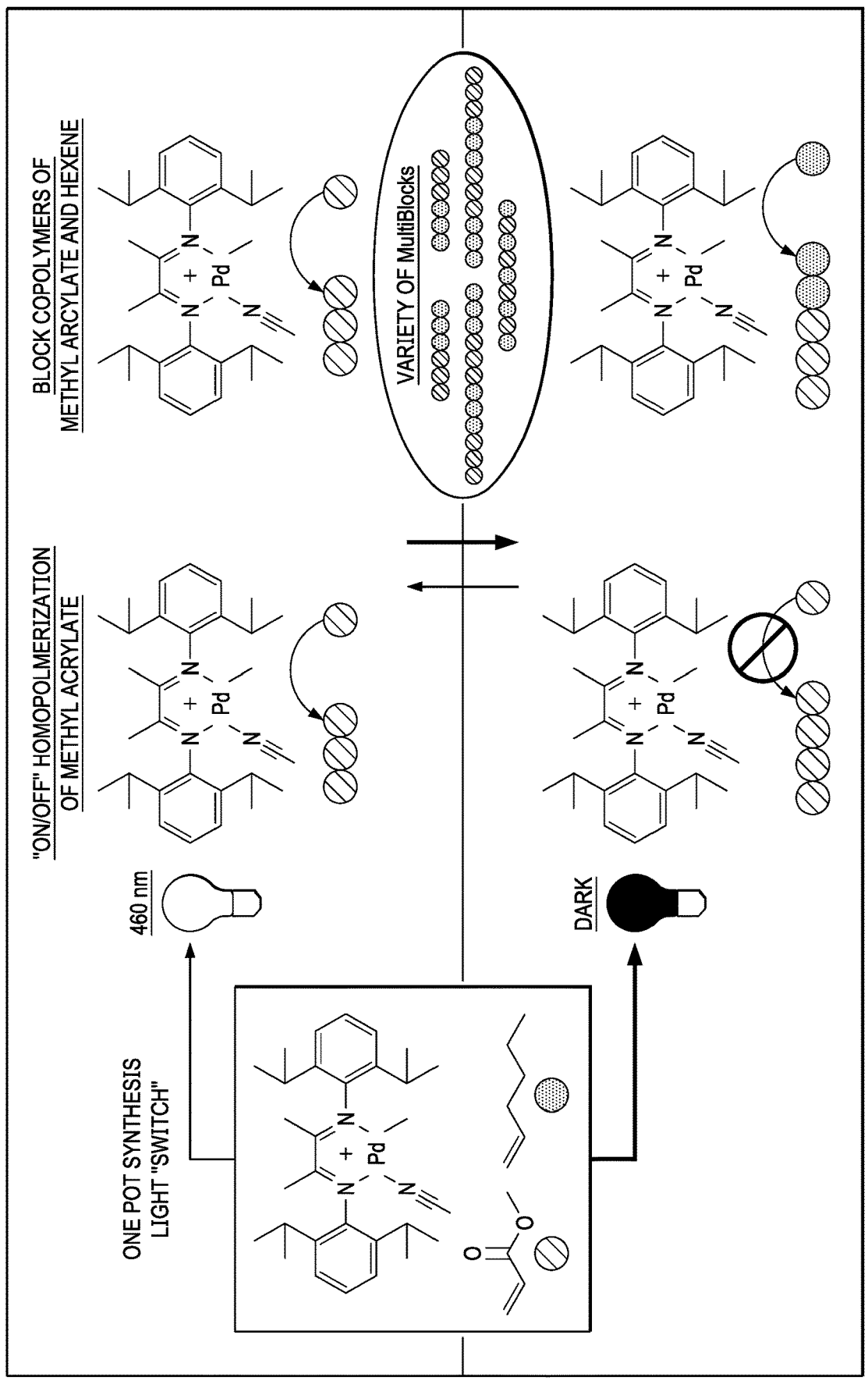
FIG. 7 is a schematic of the one pot synthesis light switch operation according to methods of this disclosure.

FIG. 7 is a schematic of the one pot synthesis light switch operation according to methods of this disclosure. Panel (A) of FIG. 7 shows that, in the presence of light, MA monomer A polymerizes from a mixture of MA monomer A and hexene monomer B, while panel (C) of FIG. 7 shows that, in the dark, MA monomer A, does not polymerize from the monomer mixture. If the MA A polymer of panel (A) is kept in the light, further polymerization of MA monomer in the mixture will occur, as indicated in panel (B) of FIG. 7; if the MA A polymer of panel (A) is put in darkness, polymerization of hexene B will occur. Via various switching "ON" and "OFF" of the light (or vice versa), a variety of multiblock polymers can be formed, a few of which include AB, BA, ABA, BAB, BABABABAB, etc.

Thermoplastic Products Produced Via the Herein Disclosed Method

The herein disclosed method offers access to block copolymers containing functionalized olefins (e.g., acrylates) and non-functionalized olefins (e.g., ethylenes). The functionalized olefins include vinyl monomers, such as, without limitation, styrenes. The product polymer produced via the herein disclosed method can, in embodiments, comprise a thermoplastic polymer. Thermoplastic elastomers may be one of the most important classes of polymers, including numerous consumable plastic materials. Thermoplastic polymers are typically designed to be triblock copolymers, and the material properties are achieved through the different properties of the ethylene or butylene block and the styrene or acrylate block. KRATON™ is one of the most prominent thermoplastic elastomers, but has conventionally been made in a complex three step process. The reason is mainly that heretofore, the two monomer families could only be polymerized at very disparate conditions, such that a one-pot process was impossible and a cumbersome process was needed. The herein disclosed method enables the polymerization of a radical type reaction and an insertion guided process performed by one catalyst using light as tool to switch between the two polymerization mechanisms. This enables, in embodiments, the one-pot or sequential pot production of di-, tri- and multi block copolymers. The herein disclosed method can thus make the class of thermoplastic elastomers more practical in the production thereof and more versatile in the choice of monomers therefor, such as, without limitation, functional monomers and copolymer blocks starting from acrylates or polyolefins.

Typical applications for such thermoplastic polymers or 'thermoplastics' include, for example, food handling and equipment, aircraft, aerospace and defense, oil and gas, medical technology materials, materials handling and conveying, alternative energy. Thermoplastic elastomers have in general an excellent impact resistance, good machinability, easy to paint and glue, good strength and stiffness.

Features and Potential Advantages

The herein-disclosed method utilizes the unexpected change of reactivity of a metal-organic catalyst under the influence of light to perform controlled radical polymerizations and revert back into an insertion catalyst in the absence of light. As noted hereinabove, polymers containing polyolefin and acrylate or styrene segments are highly desirable because of material properties attributable to the organization of these segmented blocks in the bulk. Conventionally, these polymers have been formed in a time consuming, step-wise process in which the polymers are first made separately, modified and finally combined via a chemical reaction. The variation of such (e.g., mostly triblock) copolymers has conventionally been limited because of this tedious and limiting process. With the herein disclosed MILRad method, the synthesis and availability of block copolymers containing functionalized and non-functionalized α-olefins is facilitated. According to embodiments of the herein disclosed MILRad method, thermoplastic elastomers can now be made in a one-pot process instead of using a cumbersome multistep procedure. In embodiments, the herein disclosed method enables the formation of novel thermoplastic elastomers with properties superior to those of traditional thermoplastic elastomers. In embodiments, the herein disclosed one-pot method allows for the formation of ABA multi block polymers having a seemingly infinite variation of molecular weights per block, which has not been possible heretofore. The herein disclosed sequential block copolymer synthesis allows for even more variations of making block copolymers. The process opens up opportunities for the synthesis of distinct and highly controlled block copolymers, which synthesis is not possible with previously-known methods which do not employ the herein disclosed light switching mechanism.

Additionally, MILRad polymerization for triblock copolymers are disclosed that utilize chelated catalysts (including a chelated Palladium as a metal center) and are thus capable of (a) a coordination-insertion mechanism to polymerize olefins; and (b) a light initiated radical mechanism to polymerize vinyl polar monomers as described herein; they are also capable of catalyzing (c) an additional mechanism that either allows for (ring opening metathesis polymerization) ROMP of cyclic olefins and producing a triblock polymer (ABA/ABC) or allows for ROP (ring opening polymerization) of cyclic esters also resulting in a triblock copolymer synthesis; and (d) allows for an additional light initiated radical mechanism, allowing growth of vinyl polar monomers from two chain ends.

MILRad Functionalization of Polyolefins and Post-Polymerization (AB Diblocks and ABA triblocks are also herein disclosed and utilize chelated and non-chelated catalysts that allow for the single installment or double installment of nitroxides and/or zwitterionic alkoxyamines respectively for the functionalization of polyolefins. These polymers in some embodiments are capable of (a) coordination-insertion mechanism to polymerize olefins, (b) a light initiated radical mechanism to install stable nitroxide radicals and/or zwitterionic alkoxyamines at the polyolefin chain ends; and (c) nitroxide mediated polymerization of styrene and methacrylates can be initiated at high temperatures without need of a catalyst from the chain-end of these functionalized polymers, and wherein the employed catalysts include either non-chelated or chelated Palladium as a metal center.

Further, provided herein is a one-pot synthesis of olefinic diblocks containing an in-chain active ester that is produced by an embodiment of the disclosed MILRad polymerization, wherein the presence of an in-chain ester gives rise to the ability to perform Post-Polymerization Modification (PPM) of said ester. Thus, hydrolysis of the activated ester with acids, and aminolysis of the ester with functional amines thus affords polymers with new functional group incorporation including amines, alcohols, acids etc.

These polymers as disclosed herein may be utilized at least as compatibilizers for nylon and also be used in the synthesis of novel thermoplastic elastomers.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

MILRad Polymerization for Diblock Copolymers: (wherein: Keyes, A., et. al, "Light as a Catalytic Switch for Block Copolymer Architectures: Metal-Organic Insertion/Light Initiated Radical (MILRad) Polymerization". Macromolecules 2018, 51, 18, 7224-7232, is incorporated herein in its entirety)

MA Polymerization with Cationic Pd(II) in Blue Light and in the Dark: In one embodiment, the performance of a cationic palladium(II) diimine catalyst in tandem with light and functional α-olefins (FIG. 4) was elucidated. MA was utilized because of the electron deficient nature of the alkene, making it a likely candidate for radical polymerization. UV/Vis measurements were performed for the Pd diimine catalyst, and an absorption maximum was found within the visible light region at 460 nm. This wavelength was applied to irradiate the catalyst for the homopolymerization of MA. The model polymerization of MA under blue light ($\lambda_{max}$=460 nm) was investigated in the presence of [MA]/[Pd]=1175:1 in DCM (2.79 M), resulting in low disparities (<1.68) and reasonable agreement between theoretical and experimental molecular weights (FIG. 8, (A). Kinetic studies showed that the polymerization proceeded after a 20 minute induction period, reaching high conversions of 67% in 320 minutes. To further probe the control of molecular weight, lower (50,000 g/mol) and higher (500,000 g/mol) molecular weights for MA polymers ($DP_n$=235, 588, 1175, 2350, 5880 ([MA]/[Pd]=235, 588, 1175, 2350, 5880: 1))(FIG. 8, (A) were targeted. The theoretical molecular weights were in agreement with the experimental values measured by GPC. The control of molecular weight and kinetics showed characteristics of a living radical polymerization. To illustrate the selectivity for MA polymerization in the light, control reactions were performed in the dark, in the presence of a radical inhibitor (gavinoxyly) and in the absence of catalyst. All controls showed no polymerization of the MA, thus photoactivation through blue light enables the catalyst to facilitate a radical polymerization process.

"ON/OFF" Polymerization of MA Using Cationic Pd(II): Two dark (OFF) and three light cycles (ON) were used to demonstrate temporal control and reversible activation and deactivation of the palladium catalyst. As depicted in FIG. 8 (C), there is linear growth for conversion of the MA during all periods of irradiation (ON). The first irradiation cycle (ON) showed a short incubation period, with no conversion detected in the first twenty minutes. No conversion is observed in the dark cycles (OFF) and the polymerization immediately stops, which is attributed to rapid deactivation of the catalyst. The presence of blue light (ON) and absence of light (OFF) results in a reversible activation or deactivation of the radical polymerization pathway, which supported the hypothesis that light is a stimulus for the inherent photocatalytic properties of organometallic catalysts. This remarkable control with light motivated us to investigate the formation of block copolymer architectures.

MA/Hexene Polymerization in the Presence of One Another: A polymerization with a 1:1 molar ratio of MA and hexene in DCM in the presence and absence of light was performed. In the light, only MA polymerized with 40% conversion reaching a molecular weight of 28,000 g/mol and a dispersity of 1.34 in 4 hours and 5% hexene incorporation confirmed by $^1$H NMR studies (Table 1).

TABLE 1

Polymerization of methyl acrylate and 1-hexene under light and dark conditions

| Entry | Hexene (mL) | MA (mL) | DCM (mL) | Pd Cat. (mg) | Temp (Celsius) | Time hours | $M_{n, th.}$[b] g/mol | $M_{n, GPC}$[c] g/mol | $M_{w, GPC}$[c] g/mol | Đ ($M_w/M_n$) | Conv. (%) HEX | Conv. (%) MA |
|---|---|---|---|---|---|---|---|---|---|---|---|---|
| 1 | 1 | 1 | 6 | 27 | 25 | 4 | 50 | 28,000 | 37,000 | 1.34 | 5 | 40 |
| 2[a] | 1 | 1 | 6 | 27 | 25 | 6 | 50 | 90,000 | 141,000 | 1.56 | 30 | 8 |

[a]Polymerization carried out in the absence of light.
[b]Theoretical molecular weight was calculated based on 100% conversion of monomer from the following equation: $M_{n, th}$ = [M]$_0$/[Pd] × MW$^M$, where [M]$_0$, [Pd], and MW$^M$ correspond to initial monomer concentration, initial Pd catalyst concentration, and molar mass of the monomer respectively.
[c]Molecular weight and polydispersity index were determined by GPC analysis with samples run in THF at 40° C. calibrated to poly(methyl methacrylate) standards.
[d]Monomer conversion was determined by using $^1$H NMR spectroscopy.

The rate of MA polymerization in the presence of hexene is decreased by 54% compared to MA in the absence of hexene. MA in the presence of hexene has an improved dispersity (1.4) than MA in the absence of hexene (1.8). The 5% incorporation of hexene is attributed to a higher affinity to coordinate with palladium during the induction period when the radical is being formed, resulting in minimal hexene incorporation. The radical polymerization pathway is the exclusive polymerization process in the light regardless of the present hexene once the radical polymerization is initiated (Table 1, above). This incorporation of hexene was later understood to only occur in the first irradiation cycle, due to the incubation period, and all subsequent light cycles showed no incorporation of hexene. In the dark, only hexene polymerized with negligible incorporation (<8%) of MA confirmed by $^1$H NMR studies). This result is in accordance with reported studies that show the incorporation of MA in the presence of hexene is not occurring throughout the chain, rather it is found to be incorporated at the chain ends. Therefore, this mechanism will not pose an impediment for forming block copolymer architectures. Hexene polymerized in the dark in the presence of MA showed the expected polymerization rates and conversions. As the amount of MA increases, the rate of polymerization of hexene decreases, and for a 1:1 molar ratio, 30% conversion after 6 hours is commonly obtained. Hence, temporal and spatial control over MA polymerizations in the light, and hexene polymerization in the dark was demonstrated. It is to note that this level of selectivity for hexene is only achieved in a mixture of both monomers (FIG. 4 (C)).

Figure 9:
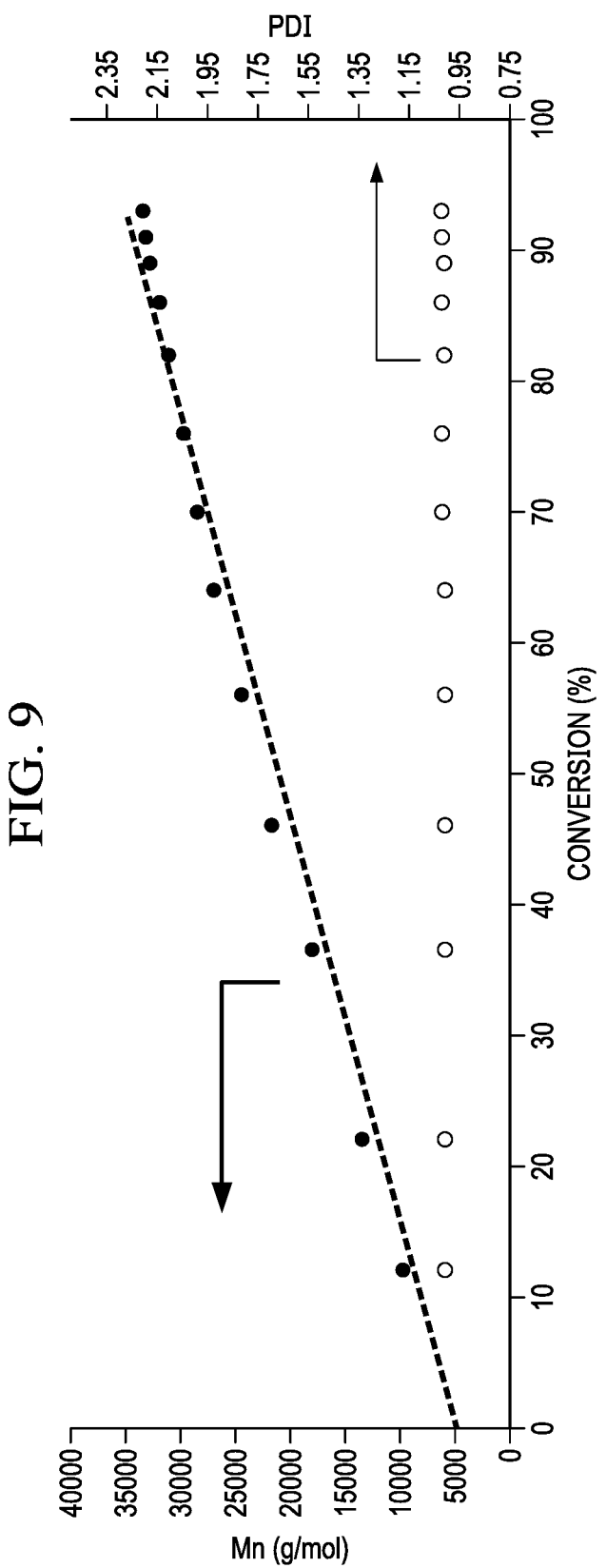
FIG. 9 is a graph depicting conversion versus molecular weight for the polymerization of methyl acrylate in the light.

Hexene Polymerization with Cationic Pd(II) in Blue Light and in the Dark Experiments polymerizing only hexene in the presence of light resulted in polymers of low conversion and high dispersity (FIG. 4 (B)). In the dark, hexene converted quantitatively during 300 minutes, performed in experimental conditions which were chosen to be much more concentrated than conditions used for α-olefin polymerizations with this catalyst, but were equivalent to conditions established for the polymerization of MA. The dispersities were exceptionally narrow (1.02) at low and high conversions (FIG. 9).

Sequential Addition of Block Copolymers (AB, ABA) and (BA, BAB). The robust nature of the herein disclosed reactions were further probed by synthesizing block copolymers via two synthetic strategies. For the first approach, block copolymers were constructed by means of sequential addition (FIG. 6), with a step-wise addition of monomer. Recent efforts in sequential block copolymer synthesis with living free radical polymerization methods have the goal to drive the polymerization to high conversions, facilitated by the exceptional chain end fidelity to create well defined blocks. Herein, the outer stimulus imposes an additional control mechanism to produce highly controlled blocks. In this sense, an embodiment of the polymerization method herein disclosed is not bound by the need to reach nearly quantitative conversions for each block, because the light switch allows for spatial control in a monomer mixture with the ability to selectively polymerize one monomer over the other. To investigate and illustrate the advantageous features of the MILRad polymerization towards the formation of block copolymer architectures via the sequential monomer addition method, it was planned to form an ABA and BAB block copolymer. In this strategy, chosen reaction conditions targeted for 50,000 g/mol for each block. This molecular weight in the lower molecular weight range was investigated for the homopolymers (FIG. 8). For the production of the ABA block copolymer (FIG. 6 (B), Table 2), MA was added to a reaction mixture of DCM and catalyst with [MA]/[Pd]= 1:0.0009 and irradiated for 12 hours with blue light, yielding a polymer of molecular weight of 53,600 g/mol, at high conversion (86%) with a reasonable dispersity of 1.98 and a $DP_n$=505.

TABLE 2

Sequential ABA block copolymer synthesis

| Reaction | Hexene (mL) | MA (mL) | DCM (mL) | Pd Cat. (mg) | Temp (Celsius) | Time hours | $M_{n, th.}{}^a$ g/mol | $M_{n, GPC}{}^b$ g/mol | $M_{w, GPC}{}^b$ g/mol | Đ ($M_w/M_n$) | Conv.$^c$ (%) HEX | Conv.$^c$ (%) MA |
|---|---|---|---|---|---|---|---|---|---|---|---|---|
| A | 0 | 1 | 6 | 27 | 25 | 12 | 50,000 | 53,600 | 107,400 | 1.98 | 0 | 86 |
| AB$^d$ | 1 | — | — | — | 25 | 12 | 50,000 | 57,300 | 102,600 | 1.79 | 10 | 0 |
| ABA | — | 1 | — | — | 25 | 12 | 50,000 | 61,000 | 114,000 | 1.87 | 0 | 18 |

$^a$Theoretical molecular weight was calculated based on 100% conversion of monomer from the following equation: $M_{n, th} = [M]_0/[Pd] \times MW^M$, where [M]$_0$, [Pd], and MW$^M$ correspond to initial monomer concentration, initial Pd catalyst concentration, and molar mass of the monomer respectively.
$^b$Molecular weight and polydispersity index ($M_w/M_n$) were determined by GPC analysis with samples run in THF at 40° C. calibrated to poly (methyl methacrylate) standards.
$^c$Monomer conversion was determined by using $^1$H NMR spectroscopy.
$^d$Polymerization was carried out in the absence of light.

It is to note that the high dispersity is attributed to the high conversion of the MA, and lower conversions, for example 52% of MA are regularly leading to lower dispersities of 1.3 (FIG. 8A). After the light cycle, hexene was then added to the reaction mixture with [Hex]/[Pd]=1:0.0009 and left to polymerize in the dark for 12 hours. The resulting AB diblock showed an anticipated incorporation of hexene (10% conversion) with a shift towards higher molecular weight of 57,300 g/mol and a narrowing polydispersity compared to the A block (1.79) with a $DP_n$=59. For the last block, another addition of MA with [MA]/[Pd]=1:0.0009 was introduced and the reaction was polymerized in the light for another 12 hours.

MA showed a lower conversion in the second irradiation cycle (18%) and the ABA block was found to shift towards a higher molecular weight of 61,000 g/mol with a $DP_n$=121. No conversion of hexene was observed in this light cycle. The slower rate of MA polymerization was expected since a considerable amount of hexene was not converted in the second block, and was present as monomer in the light cycle polymerizing the MA block.

For the construction of the BAB block copolymer (FIG. 6 (A), Table 3), polymerization of hexene was conducted in the dark with [Hexene]/[Pd]=1:0.0009. After 120 minutes, a molecular weight of 29,300 g/mol and narrow dispersity (1.01) corresponding to a $DP_n$=588 was obtained with a quantitative conversion of the hexene (FIG. 6 (C). After the addition of MA and 12 hour irradiation with blue light, [MA]/[Pd]=1:0.0009, a shift towards a higher molecular weight of 46,100 g/mol with a $DP_n$=358 was witnessed and dispersity of 1.39 obtained after 61% conversion of MA.

Another equivalent of hexene was injected into the mixture and another 12 hour dark cycle had produced a triblock (BAB) copolymer with a molecular weight of 46,700 g/mol and with a $DP_n$=59 with an overall dispersity of the BAB triblock of 1.40. No conversion of MA was observed in the dark cycle.

TABLE 3

Sequential BAB block copolymer synthesis

| Reaction | Hexene (mL) | MA (mL) | DCM (mL) | Pd Cat. (mg) | Temp (Celsius) | Time hours | $M_{n,th}$[a] g/mol | $M_{n,GPC}$[b] g/mol | $M_{w,GPC}$[b] g/mol | Đ ($M_w/M_n$) | Conv.[c] (%) HEX | Conv.[c] (%) MA |
|---|---|---|---|---|---|---|---|---|---|---|---|---|
| B[d] | 1 | 0 | 6 | 27 | 25 | 2 | 50,000 | 29,300 | 29,700 | 1.01 | 100 | 0 |
| BA | — | 1 | — | — | 25 | 12 | 50,000 | 46,100 | 64,300 | 1.39 | 0 | 61 |
| BAB[d] | 1 | — | — | — | 25 | 12 | 50,000 | 46,700 | 65,500 | 1.40 | 5 | 0 |

[a]Theoretical molecular weight was calculated based on 100% of monomer from the following equation: $M_{n,th} = [M]_0/[Pd] \times MW^M$, where $[M]_0$, [Pd], and $MW^M$ correspond to initial monomer concentration, initial Pd catalyst concentration, and molar mass of the monomer respectively.
[b]Molecular weight and polydispersity index ($M_w/M_n$) were determined by GPC analysis with samples run in THF at 40° C. calibrated to poly (methyl methacrylate) standards.
[c]Monomer conversion was determined by using $^1$H NMR spectroscopy.
[d]Polymerization was conducted in the absence of light.

One-Pot Synthesis of Block Copolymers (AB, ABA, ABAB) and (BA, BAB, BABA). In some embodiments, MILRad polymerization is not constrained to step-wise addition methodologies, and can encompass a much more practical one-pot approach in a mixture of monomers at the start of the reaction, due to the spatial and temporal control afforded through light. The blocks constructed by the sequential approach gave insight into the possibility of synthesizing blocks precluding the need for quantitative conversions of individual blocks. Similar to the previous set of experiments, one-pot methods were utilized to polymerize the block copolymers seen in FIG. 5. Starting with the one-pot synthetic strategy in the light, MA and hexene were mixed in a 1:2 fashion, and then injected into a solution of degassed DCM and Pd catalyst irradiated with blue light with [MA]/[Hexene]/[Pd]=1:2:0.0013 forming the A block. After 10 hours of irradiation, $^1$H-NMR and GPC data were collected and showed 32% conversion of MA forming the first A block with a molecular weight of 16,500 g/mol and dispersity of 1.83 and DP of 125. 9% conversion of hexene was revealed from $^1$H-NMR measurements. This small incorporation of hexene was expected in the first irradiation cycle, as the activation of the catalyst to a radical pathway with blue light follows an induction period of 20 minutes before a radical polymerization is initiated (FIG. 8 (C). During this time, the catalyst can still act as an insertion catalyst, and allowed for the minor incorporation of hexene into the first block, forming a small hexene block with a $DP_n$=38. A detailed $^{13}$C-NMR analysis confirmed that the incorporated hexene is corresponding to a polyhexene block generated in the induction period. Peaks at 32.7 ppm and between 36-38 ppm are characteristic of a hexene-hexene connectivity and is not observed in MA-hexene alternating copolymers. Other significant peaks at 176.0 ppm confirm the block formation with the signal for the downshifted carbonyl group and the presence of the methine carbon at 33.4 ppm connecting the short hexene block with the following MA block copolymer.

TABLE 4

One pot ABAB block copolymer synthesis:

| Reaction | Hexene (mL) | MA (mL) | DCM (mL) | Pd Cat. (mg) | Temp (Celsius) | Time hours | $M_{n,th}$[a] g/mol | $M_{n,GPC}$[b] g/mol | $M_{w,GPC}$[b] g/mol | Đ ($M_w/M_n$) | Conv.[c] (%) HEX | Conv.[c] (%) MA |
|---|---|---|---|---|---|---|---|---|---|---|---|---|
| A | 1.33 | 0.67 | 6 | 27 | 25 | 10 | 16.75 | 16,500 | 30,200 | 1.83 | 9 | 32 |
| AB[d] | — | — | — | — | 25 | 12 | 33.25 | 18,700 | 32,300 | 1.73 | 8 | 0 |
| ABA | — | — | — | — | 25 | 14 | 16.75 | 19,900 | 35,500 | 1.79 | 0 | 7 |
| ABAB[d] | — | — | — | — | 25 | 12 | 33.25 | 21,200 | 36,900 | 1.69 | 5 | 0 |

[a]Theoretical molecular weight was calculated based on 100% conversion of monomer from the following equation: $M_{n,th} = [M]_0/[Pd] \times MW^M$, where $[M]_0$, [Pd], and $MW^M$ correspond to initial monomer concentration, initial Pd catalyst concentration, and molar mass of the monomer respectively.
[b]Molecular weight and polydispersity index ($M_w/M_n$) were determined by GPC analysis with samples run in THF at 40° C. calibrated to poly (methyl methacrylate) standards.
[c]Monomer conversion was determined by using $^1$H NMR spectroscopy.
[d]Polymerization was conducted in the absence of light.

With this analysis the labeled A block copolymer (Table 4) has a BA block copolymer composition and is further identified as bA block by $^{13}$C-NMR spectra. Following the light cycle, a 12 hour dark cycle produced the AB diblock copolymer. $^1$H-NMR and GPC data showed a molecular weight of 18,700 g/mol and a dispersity of 1.73 and $DP_n$=63 with 8% conversion of the hexene. No conversion of acrylate was observed, indicating a pure hexene block was formed (Table 4). After the dark cycle, a 14 hour light cycle yielded a triblock (ABA). $^1$H-NMR and GPC data showed an increased molecular weight of $M_n$=19,900 with a dispersity of 1.79 and $DP_n$=27 with a 7% conversion of MA.

A final dark cycle was performed for 12 hours yielding the last block in the tetrablock copolymer (ABAB) synthesis. $^1$H-NMR and GPC data showed the final molecular weight of 21,200 g/mol with a dispersity of 1.69 and $DP_n$=39 with 5% conversion of hexene. After completion of the ABAB block synthesis, it was intended to compare multiblocks synthesized using alternate light and dark cycles forming BABA blocks. Using the one-pot synthetic strategy, MA and hexene were mixed in a 1:2 fashion, and then injected into a solution of degassed DCM and Pd catalyst in the dark with [MA]/[Hexene]/[Pd]=1:2:0.0013. After 12 hours, the $^1$H-NMR analysis data showed 32% conversion of hexene and GPC data showed a molecular weight of 18,000 g/mol, dispersity of 1.22 and $DP_n$=251. Less than 3% conversion of MA was witnessed in the dark cycle (Table 5), as expected from previous studies where the negligible amount of MA incorporation in the dark is attributed to the strongly oxophilic nature of the palladium catalyst to incorporate MA into the end of polymer chains.

third block to the polymer (BAB) with a conversion of 5% as evidenced by $^1$H-NMR. GPC data showed a molecular weight increase to 24,400 g/mol with a dispersity of 1.82, and $DP_n$=39. This decrease of the $DP_n$ for the second hexene (B) block was expected, due to a lower concentration of hexene in the second B block formation. For the final light cycle, forming the BABA block, a 14 hour irradiation period was utilized, which again produced an increase of MA to the polymer chain, with 9% conversion evidenced by $^1$H-NMR. The lower conversion of the MA block is attributed to consumption of monomer during the formation of previous blocks. GPC analysis showed an increase to the final molecular weight of 26,400 g/mol and a dispersity of 1.79 (FIG. 4 (C), Table 5).

These experiments detailed herein, thus disclose a single metal-organic catalyst capable of performing two polymerization techniques facilitated by blue light irradiation, and allows for the sequential and one-pot synthesis of multiblock copolymer architectures. The palladium(II) diimine catalyst serves as a model for transforming the catalytic activities of metal-organic catalysts, and will serve as precedent for the exploration of new and known catalysts capable of MILRad polymerization. Following this work, desirable monomer combinations will be tested for access to well-known and unexplored thermoplastic elastomers. Sequential and one-pot processes will be further refined, yielding two valued approaches for block copolymers demanding these complementary techniques. For the sequential approach, access to multiblock copolymers comprised of two monomers was displayed, which has the potential for the development of multiblock copolymers composed of multiple monomer

TABLE 5

One-pot BABA block copolymer synthesis.

| Reaction | Hexene (mL) | MA (mL) | DCM (mL) | Pd Cat. (mg) | Temp (Celsius) | Time hours | $M_{n, th}$.$^a$ g/mol | $M_{n, GPC}$$^b$ g/mol | $M_{w, GPC}$$^b$ g/mol | Đ ($M_w/M_n$) | Conv.$^c$ (%) HEX | Conv.$^c$ (%) MA |
|---|---|---|---|---|---|---|---|---|---|---|---|---|
| B$^d$ | 1.33 | 0.67 | 6 | 27 | 25 | 12 | 100 | 18,000 | 22,100 | 1.22 | 32 | 3 |
| BA | — | — | — | — | 25 | 10 | 100 | 23,700 | 41,100 | 1.73 | 0 | 36 |
| BAB$^d$ | — | — | — | — | 25 | 12 | 100 | 24,400 | 44,500 | 1.82 | 5 | 0 |
| BABA | — | — | — | — | 25 | 14 | 100 | 26,400 | 47,200 | 1.79 | 0 | 9 |

$^a$Theoretical molecular weight was calculated based on 100% conversion of monomer from the following equation: $M_{n, th}$ = [M]$_0$/[Pd] × MW$^M$, where [M]$_0$, [Pd], and MW$^M$ correspond to initial monomer concentration, initial Pd catalyst concentration, and molar mass of the monomer respectively.
$^b$Molecular weight and polydispersity index ($M_w/M_n$) were determined by GPC analysis with samples run in THF at 40° C. calibrated to poly (methyl methacrylate) standards.
$^c$Monomer conversion was determined by using $^1$H NMR spectroscopy.
$^d$Polymerization was conducted in the absence of light.

Figure 10:
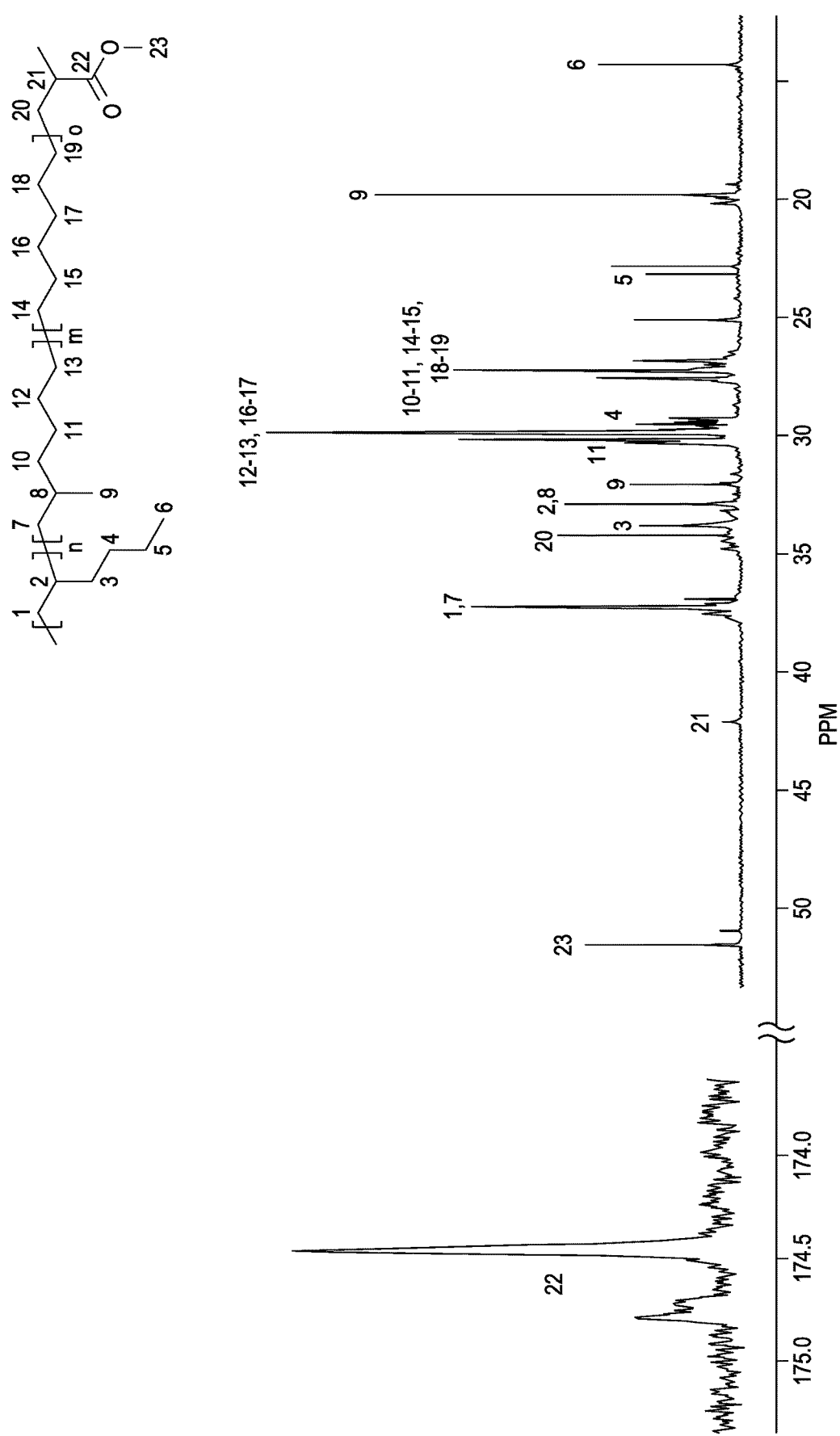
FIG. 10 depicts a $^{13}$C (400 MHz, CDCl$_3$) NMR spectra of one-pot synthesis of the B block with MA end group in the dark with detailed labelling.
Figure 11:
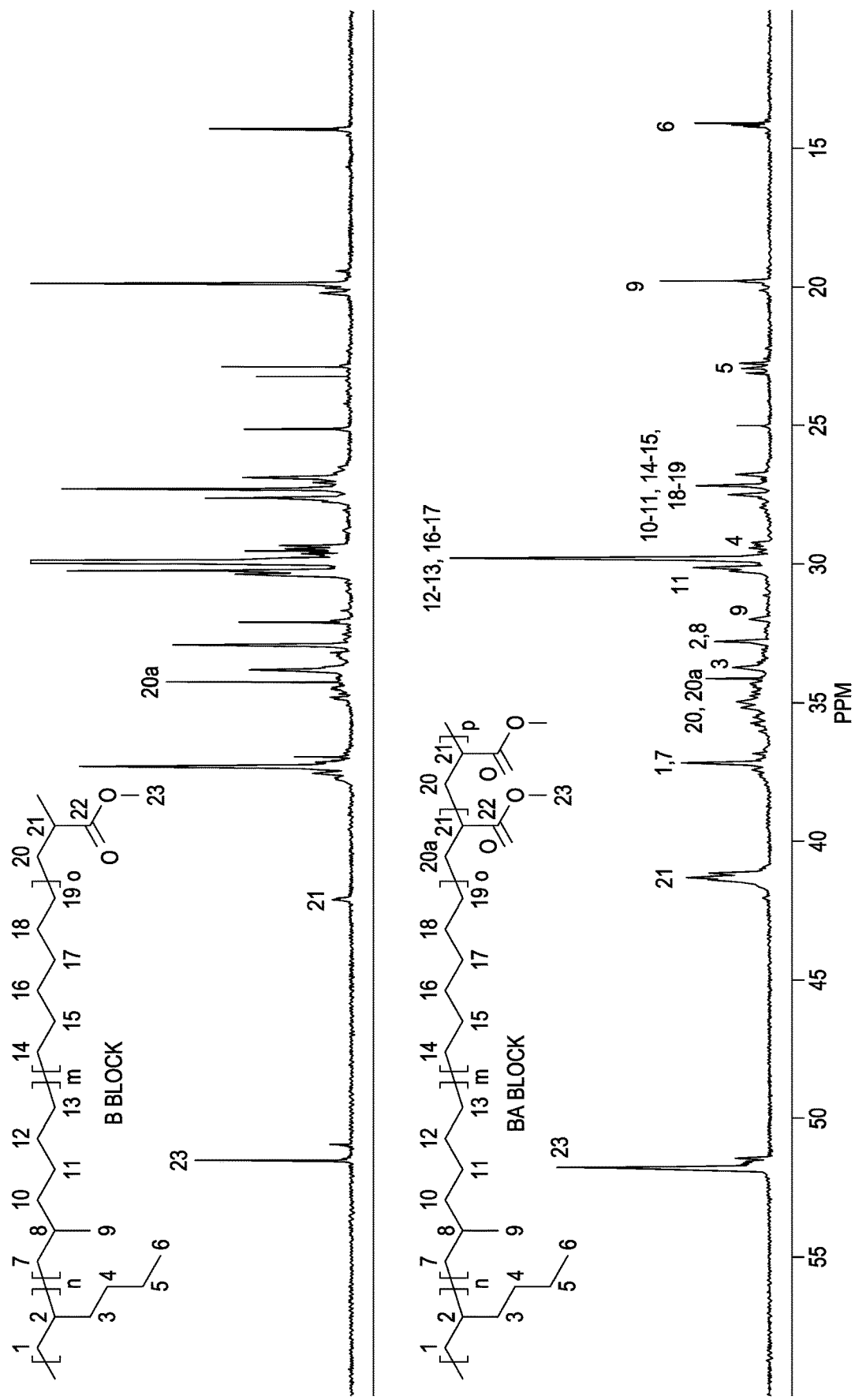
FIG. 11 depicts a $^{13}$C (400 MHz, CDCl$_3$) NMR spectra of one-pot synthesis of the B block with MA end group in the dark (Top) and BA block with MA polymerization in the light with detailed labelling (Bottom).

Further $^{13}$C-NMR studies confirmed that the MA is incorporated as a chain end functionality to the hexene block, confirming reports for the higher affinity of the methyl acrylate to offer five β-hydrogens resulting in a facile elimination and with the methyl acrylate as end group. Peaks at 32.7 ppm and between 36-38 ppm revealed the hexene-hexene connectivity and could also detect the methyl acrylate as an end group functionality with peaks at 34.2, 42.0, 51.5 and 174.5 ppm (FIG. 10, and FIG. 11). After formation of the hexene block (B), blue light was switched on. After irradiation of the reaction for 12 hours, a shift towards higher molecular weight was observed for the isolated BA block (FIG. 8 (C), Table 5). GPC data showed a molecular weight increase to 23,700 g/mol with a dispersity of 1.73, $DP_n$=141 and $^1$H-NMR showed a 36% conversion of the MA. No conversion of hexene was detected during the light cycle as evident by $^1$H-NMR (Figure S22). The second 12 hour cycle in the dark polymerized hexene which added a classes. In the one-pot process, it is herein disclosed for the first time a technique that uses a single catalyst to develop distinct block copolymers with temporal and spatial control governed by a single stimulus. This illustrates the exceptional catalytic efficiency and lifetime provided by the MILRad polymerization technique, with the ability to switch reversibly from insertion and radical polymerizations. Thus, example 1 demonstrates that in some embodiments as described herein, that a new polymerization technique has been developed to bridge organometallic insertion polymerization with light initiated radical polymerization involving a single catalyst. Radical polymerization of MA is demonstrated utilizing a Pd diimine catalyst with characteristics of a living polymerization, with molecular weight control reaching from $M_n$≈50,000 g/mol to $M_n$≈300,000 g/mol and low dispersity values (1.34-1.68). It was thus discovered that light irradiation turned the Pd diimine catalyst into a photocatalytic system, in which the radical polymerization pathway is directed by an "ON/OFF" process. With this, the catalyst can perform a radical polymerization in the light and revert to an insertion catalyst in the absence of light. Remarkably, selective polymerization of MA and hexene were performed in the presence of each other, which led to the development of block copolymer architectures. Employing a sequential addition of monomers afforded a set of di-(AB, BA) and triblock (ABA, BAB) copolymers, starting with either MA (A) or hexene (B) in light and dark cycles respectively. This illustrates the fidelity of MILRad polymerization to successfully propagate two types of monomers in one polymer chain growing from one catalytic site, controlled by light and dark cycles. A much needed one-pot process was developed, in which the two monomer classes were mixed together and distinct block copolymer architectures were accomplished by switching between light and dark cycles, affording di-(AB, BA) tri-(ABA, BAB) and tetrablock (ABAB, BABA) copolymers with low dispersities (<1.79). This is the first example of producing multiblock copolymer architectures utilizing an outer stimulus to control the propagation of one monomer over the other. The newly discovered MILRad polymerization opens up new avenues to prepare polymers generated from functional and non-functional olefins such as acrylates and hexene in a facile process.

Example 2

MILRad Polymerization for Diblock Copolymers: exemplifying the polymerization non-polar monomers and functional polar monomers (wherein: Keyes, A., et. al, "Metal-Organic Insertion Light Initiated Radical (MILRad) Polymerization: Photo-initiated Radical Polymerization of Vinyl Polar Monomers with Various Palladium Diimine Catalysts", Polym. Chem., 2019, Advance Article, DOI: 10.1039/C8PY01554F In an embodiment of MILRad polymerization, disclosed herein, it has demonstrated that a Pd-diimine catalyst can perform both insertion and radical polymerizations, the latter controlled by blue light irradiation. This photocatalytic switch allows the catalyst to initiate a radical polymerization following insertion polymerization yielding block copolymers of methylacrylate and hexene chosen as model monomers. This development sparked interest towards the polymerization of a wider range of polar monomers, a class which until now had not been compatible with diimine Pd-catalysts. It was also investigated if changes in the structure of diimine Pd-catalysts have an impact on the polymerization of monomers, affect the control over the polymerization, or if selectivity could be afforded through functionalization of ligands.

Embodiments herein explore the scope of MILRad polymerization for widely used functional olefins with multiple catalysts. The catalysts were varied to produce a range of MILRad candidates that were tested with several monomer classes to show the versatility of this technique. Computational studies were further performed to give insight into the electronic transitions of all catalysts and understand the necessary components promoting radical polymerization.

MLCT transitions were found to arise from the excitation in the visible light spectrum (360-380 nm). Utilizable catalysts and monomer classes have been expanded herein, while also identifying MLCT transitions which are now understood to play a role in facilitating radical polymerization. From this disclosure, a range of new polymer architectures are elucidated employing the newly accessed monomers.

Figure 12A:
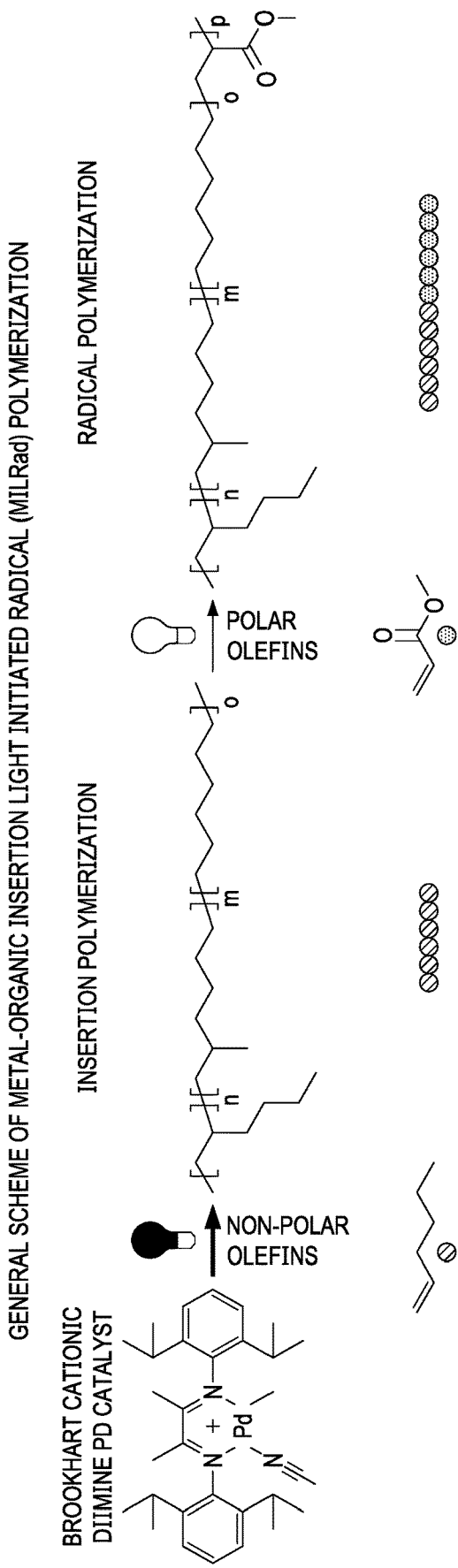
FIG. 12 (A) depicts an embodiment of a general scheme of metal-organic insertion light initiated radical polymerization, (B) depicts the expansion of the scope of polar monomers capable of radical polymerization, with the selection of new and known insertion Pd diimine catalysts, (c) depicts structures of embodiments of momomers, and (D) depicts the heatmap for the successful polymerization (green/light shading) and unsuccessful polymerization (red/dark shading) of all monomers screened against catalysts as disclosed herein.
Figure 12B:
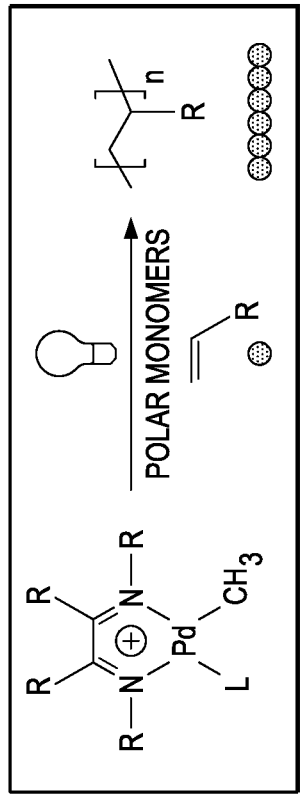
Figure 12B:
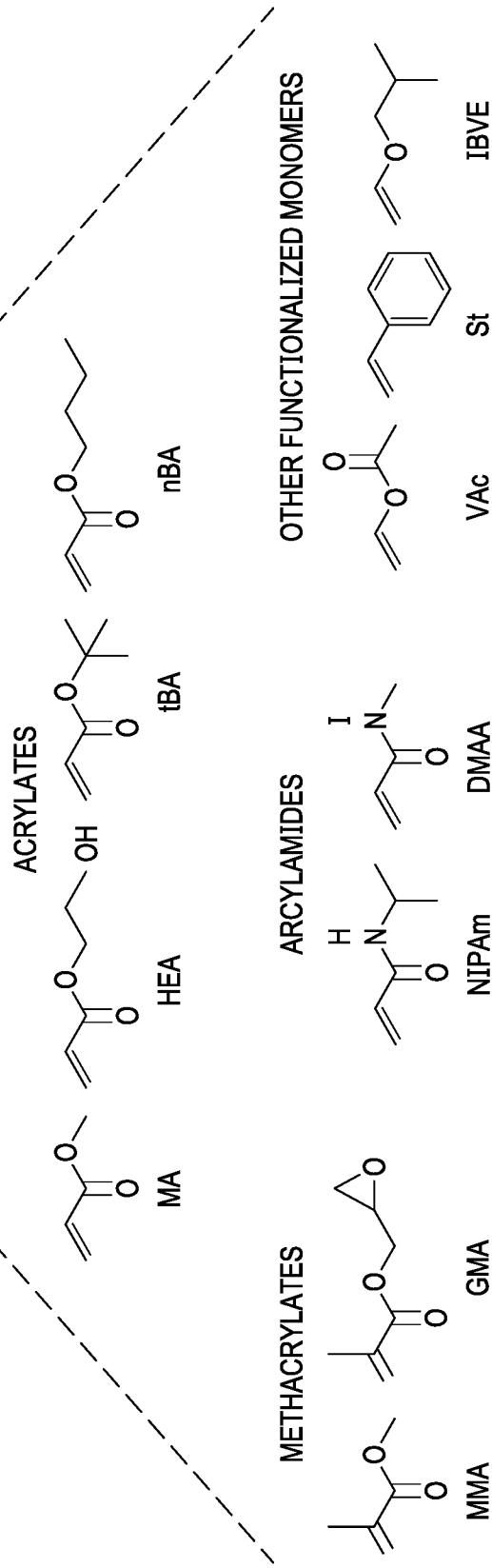
Figure 13A:
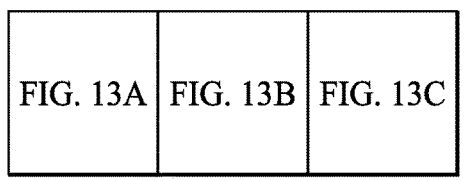
FIG. 13 depicts the calculated HOMO/LUMO energy diagram of complexes 1A, 1B 2A, 2C, 2D and 3C. The most prominent MOs involved with transitions under the low energy band and their diagrams are shown.
Figure 13A:
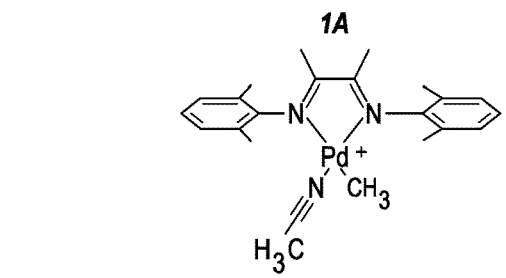
Figure 13A:
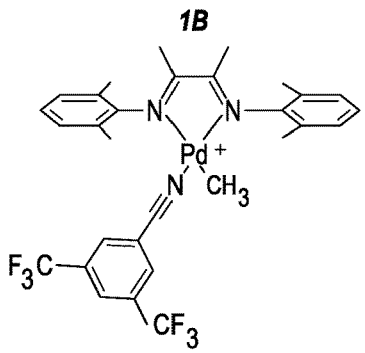
Figure 13A:
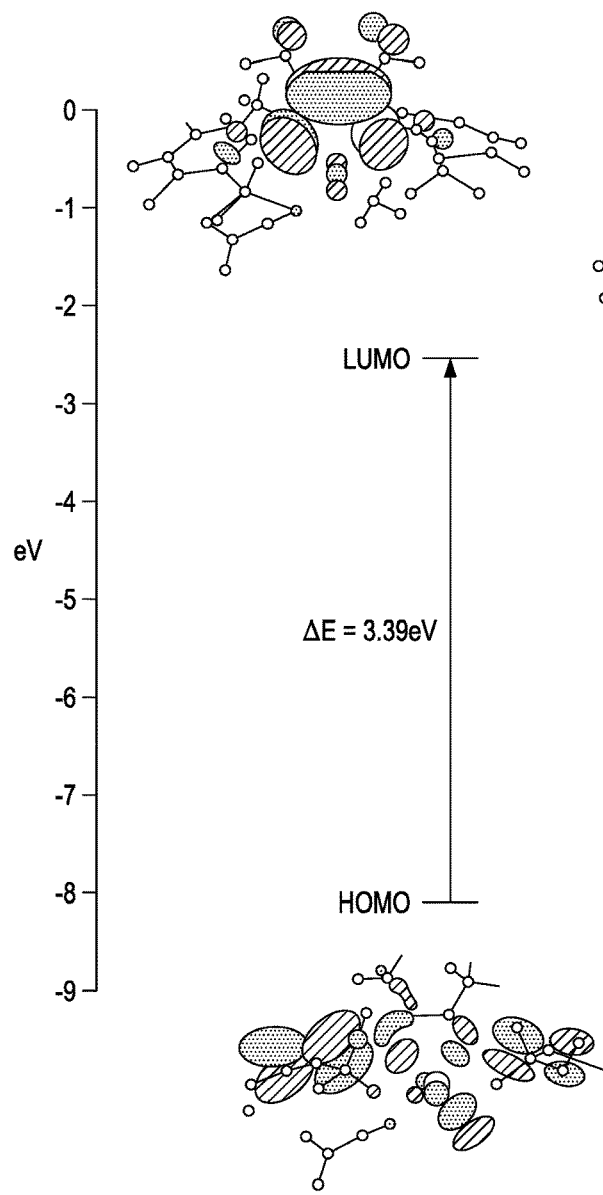
Figure 13A:
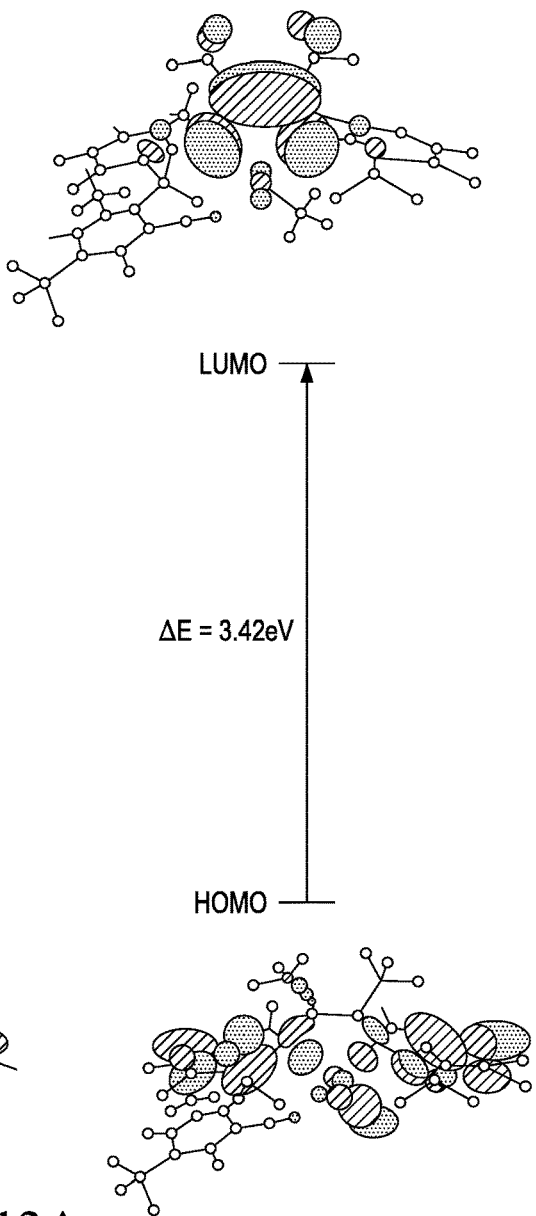
Figure 13B:
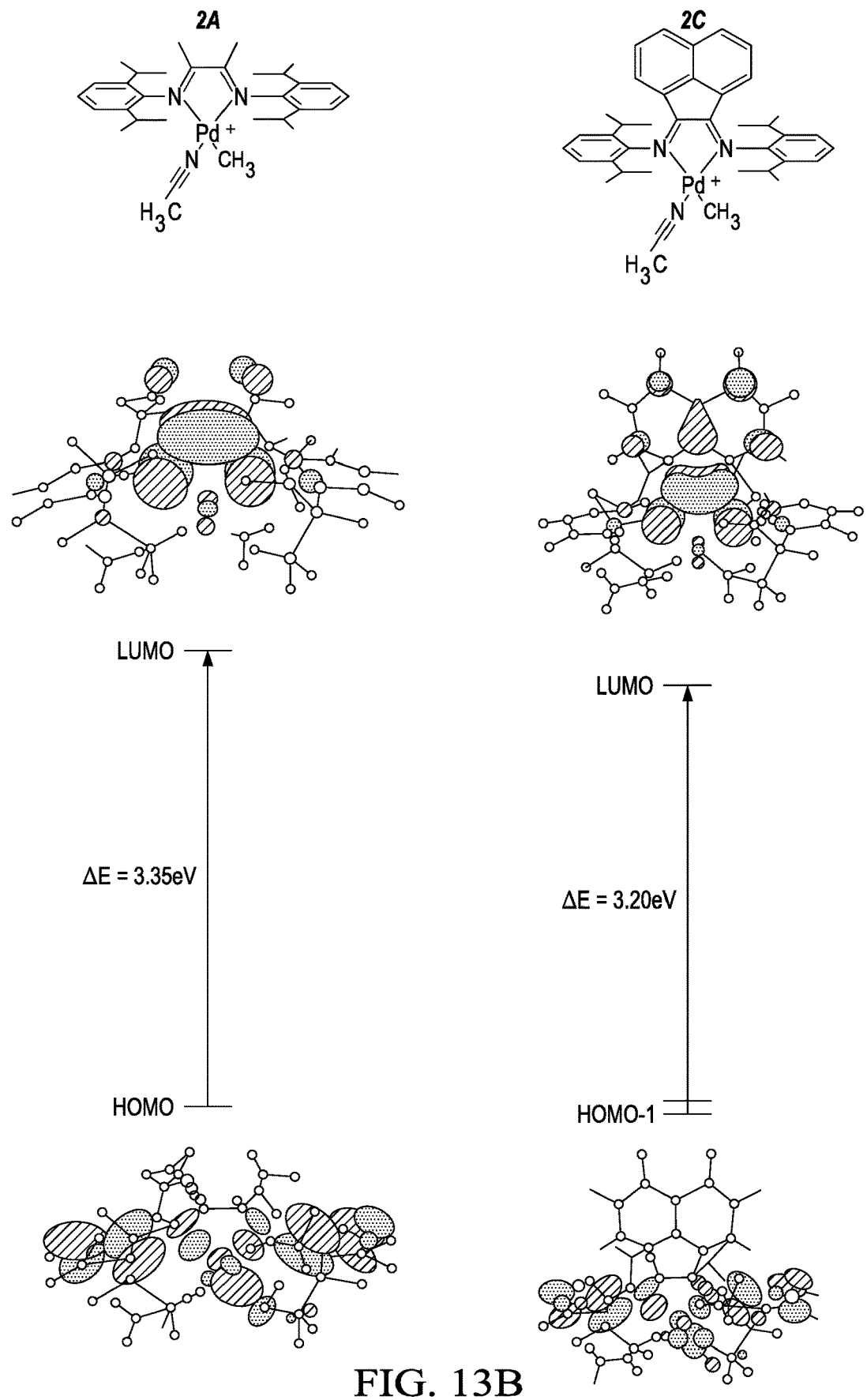
Figure 13C:
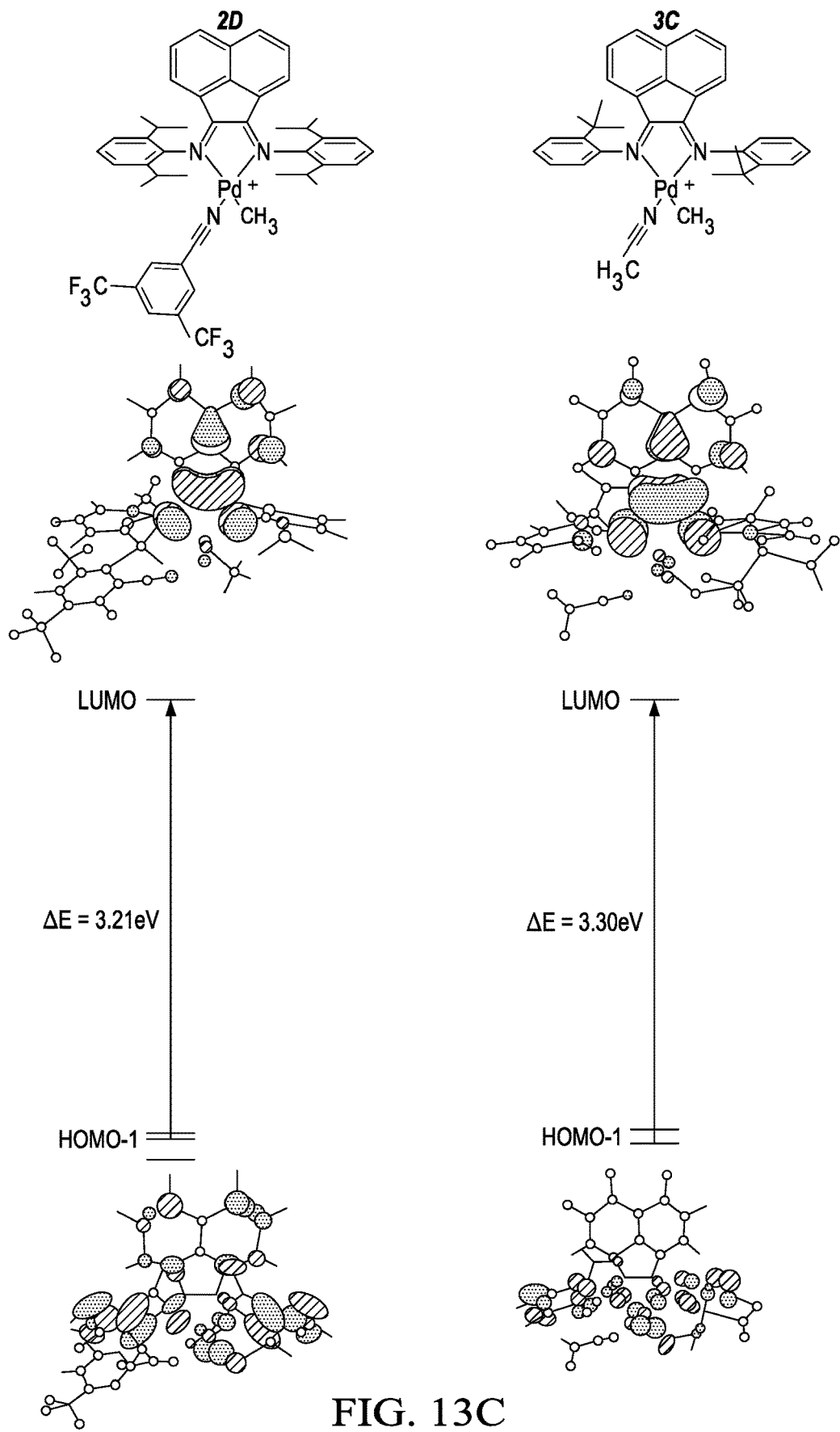

Herein, diimine catalysts have been used to explore the monomer scope of the MILRad Process. Catalysts (1D, 2A-D, 3A) are well suited for insertion polymerization and synthesized new derivatives (1A-C, 3B-D, 4C-D) (FIG. 1) to explore their radical polymerization capabilities while varying the diimine backbone, ancillary ligands and n-aryl substituents. Furthermore, a series of functionalized polar monomers (FIG. 12) were screened against all catalysts, thus providing MILRad polymerization with a toolkit of monomers that are capable of polymerizing in a completely orthogonal manner. This study establishes polar monomers that, in combination with non-polar monomers, meet the criteria for MILRad polymerization to produce a series of functionalized block copolymers. Methyl acrylate was first tested with all the catalysts synthesized (FIG. 1) and showed polymer formation in all cases of light irradiation (Table 7).

Catalyst 1D exhibited a more controlled radical polymerization for MA, with an improved PDI of 1.63 in contrast to 2A, the catalyst of previous studies (Table 6, Table 7). No polymerization was witnessed in the dark for all catalysts.

TABLE 6

Radical Polymerization of Highlighted Monomer and Catalyst Pairs

| Monomer | Catalysts | Molar Ratio$^a$ [M]:[Cat] | Reaction Time$^b$ (Hours) | $M_{n\ GPC}^{c}$ (kg/mol) | $M_{w\ GPC}^{c}$ (kg/mol) | Đ$^c$ ($M_w/M_n$) | α$^d$ (%) | DP$^e$ |
|---|---|---|---|---|---|---|---|---|
| MA | 1D | 1162:1 | 16 | 92 | 162 | 1.63 | 63 | 732 |
| HEA-MA | 3C | 1175:1 | 16 | 168 | 295 | 1.75 | 57 | 569 |
| tBA | 2C | 780:1 | 16 | 160 | 320 | 1.99 | 49 | 382 |
| nBA | 3A | 780:1 | 16 | 120 | 198 | 1.65 | 63 | 491 |
| MMA | 2S | 999:1 | 24 | 87 | 151 | 1.74 | 27 | 270 |
| GMA | 4C | 704:1 | 16 | 34 | 56 | 1.42 | 74 | 521 |
| NiPAM | 3C | 1009:1 | 24 | 245 | 396 | 1.62 | 19 | 167 |
| DMA | 1A | 880:1 | 24 | 250 | 413 | 1.65 | 29 | 293 |
| VAc | — | 1162:1 | 16 | — | — | — | — | — |
| St | 1C | 960:1 | 24 | 36 | 61 | 1.70 | 26 | 250 |
| IBVE | 1C | 999:1 | 16 | 20 | 27 | 1.39 | 99 | 989 |

$^a$Catalyst to monomer ratio.
$^b$Theoretical molecular weight for all reactions targeted for 100 kg/mol.
$^c$Molecular weight and polydispersity index ($M_w/M_n$) were determined by GPC analysis calibrated with polymethyl methacrylate standards.
$^d$Monomer conversion was determined by $^1$H NMR spectroscopy.
$^e$Degree of polymerization.

2-hydroxyethyl acrylate (HEA) was copolymerized with methyl acrylate in a 1:4 molar ratio demonstrating the ability of MILRad to create complex polymers with functionalities, i.e. hydroxyl units. All catalysts copolymerized the monomers in the light yielding different compositions, and no polymerization was seen in the dark (Table 9).

Catalyst 3C Exhibited the Best Control (Table 6).

Tert-butyl acrylate (tBA) polymerized with all catalysts in the light, and no conversion was seen in the dark. This monomer produced the largest range in molecular weights (49-1510 kg/mol), PDIs (1.78-6.94), and conversions (14-86%). Catalysts 2C exhibited the best control, with a PDI of 1.99 and reasonable molecular weight targeting and conversion (Table 6, Table 11). In contrast, n-butyl acrylate showed much higher control in molecular weight targeting, PDIs, and conversions comparable to methyl acrylate and catalyst 3A exhibited the best control (Table 6, Table 13).

Methyl methacrylates showed slower reaction rates compared to acrylates. The conversion for all reactions of MMA were less than that of the MA, with a difference of 27% and 78% respectively. This is consistent with the lower Kp of methacrylates (~1 magnitude lower) compared to acrylates. However, MMA can reach high conversions of 70% when reacted for 3 days. MMA did not polymerize in the dark with any of the catalysts, and PDI's never exceeded 2.0 with catalyst 2A exhibiting the best control (Table 6, Table 15).

Glycidyl methacrylate (GMA) showed similar rates of reaction and control in polymerization compared to MMA. All reactions polymerized in the light, and not the dark. No opening of the epoxide ring was observed for the majority of the catalysts, yet the 2 series of catalysts showed bimodal GPC traces in part to opening of the epoxide. Catalyst 4C was selected as the most appropriate catalyst for GMA (Table 6, Table 17). The ability to maintain the integrity of the epoxide during a radical polymerization is of great value for post-polymerization modification. For dimethyl acrylamide (DMAA) no catalysts formed polymers in the dark. In the light, catalysts 1C, 1D, 2C, and 2D showed no polymerization of DMAA. This behavior is attributed to the difference in the steric demand for these catalysts. The other catalysts which polymerized in the light resulted in polymers reaching high molecular weights and reasonable control over the dispersity and conversion (Table 6, Table 19). For n-isopropyl acrylamide (NIPAm) no polymers formed in the dark. Similar to DMAA, catalysts 1C, 1D, 2C, and 2D did not polymerize in addition to 1A and 1B. The other catalysts which polymerized in the light resulted in polymers reaching high molecular weights and reasonable control over the dispersity and conversion (Table 6, Table 21).

For vinyl acetate (VAc), there was no polymerization in the dark nor the light for all catalysts tested (Table 6, Table 23). For styrene (St), two catalysts exhibited selective polymerization in the light and not in the dark (1B and 2C) with low conversions (Table 6, Table 25). Five other catalysts yielded polymers both in the light and the dark. Polymerization in the dark yielded low molecular weight polymers with low conversion, in line with previously reported literature on the insertion polymerization of styrene. The other seven catalysts yielded no polymer in either setting.

Isobutyl vinyl ether (IBVE) was found to polymerize in a cationic pathway with all catalysts in the light and dark (Table 6, Table 27). Cationic palladium has been reported to polymerize IBVE in a cationic fashion. In summary, the screening process revealed that acrylate, methacrylate and acrylamide monomers all display complete selectivity to polymerize in the light under a radical pathway. This selectivity is desired for future development of block copolymers, where insertion and radical polymerization can be separated from one another using light as a switchable stimulus. For the non (meth)acrylic monomers, a selective radical pathway was not observed, suggesting that the acrylic motif plays a crucial role in the MILRad Process.

DFT and TD-DFT Calculations. Computational studies were conducted at the M06-2X/6-31+G(d,p) level to identify key features between the catalysts believed to facilitate the radical polymerizations in this study. The molecular orbital (MO) energy diagram, shown in FIG. 13, displays the compositions of the highest occupied MOs and the LUMO of six catalysts, and shows the transitions from the HOMO or HOMO-1 orbitals and LUMO for all six catalysts. Loss of electron density in the metal-carbon a-bond and gain of electron density in the ligand π-systems indicated MLCT transitions observable in all catalysts. It was elucidated that irradiation with blue light led to the loss of the methyl group in the 2A Pd-diimine catalyst and was attributed to the homolysis of the metal-carbon bond. The MLCT transitions observed in this work illustrate a shift in electron density from the metal-carbon a-bond to the ligand π frame, which is expected to decrease the strength of the metal-carbon bond and promote the radical polymerization. The calculated energies from 360-380 nm further support that MLCT transitions leads to photolabile metal-carbon bonds which are responsible for the radical polymerization in these photocatalytic systems. In conclusion, results of the theoretical calculations reveal a MLCT that occurs between a metal-carbon bond and diimine backbone. The transition from MOs with metal-carbon bonding character to MOs associated with the n-frame of the diimine ligand underline structural features of the catalysts which allows for radical polymerization upon visible light irradiation. These results indicate that multiple palladium catalysts are capable of MILRad polymerization which is understood to access the radical pathway through MLCT transitions. Furthermore, all catalysts' capacities for radical polymerization was captured for an extensive range of monomer classes, many of which strictly polymerize in a radical pathway and not an insertion pathway necessary for MILRad block copolymer synthesis, such as the acrylates, methacrylates, and acrylamides. This work sets the stage for the development of new catalysts and for facile synthesis of polymer architectures made possible through MILRad polymerization.

Materials

Calcium hydride powder ($CaH_2 \geq 90\%$), diethyl ether anhydrous ($\geq 99.7\%$), and acetonitrile ACS reagent ($\geq 99.5\%$) 2,3-butanedione (97%), 2,6-dimethylaniline (($\geq 99\%$), and 2-tert-butylaniline (98%) were all purchased from Sigma-Aldrich and used as received. Acenaphthenequinone, and 2,6-Diisopropylaniline (90%) were purchased from Oakwood Chemical and used as received. Trifluoromethanesulfonic acid (98%), xylenes, ACS ($\geq 98.5\%$), 2,4,6-Trimethylstyrene (95%), and p-Toluidine ($\geq 99\%$) were purchased from Alfa Aesar and used as received. Formic acid (98-100%) was purchased from Millipore Sigma, and used as received. Methanol (99%), Methylene chloride (DCM, 99.9%), and pentane (99.5%) were purchased from Fischer Scientific. Sodium tetrakis[3,5-bis(trifluoromethyl)phenyl]-borate ($NaBAr'_4$, 97%) and 3,5-bistrifluoromethylbenzonitrile (97%) was purchased from Matrix Scientific and used as received. Chloromethyl(1,5-cyclooctadiene) palladium (II) (99%) was purchased from Stream Chemicals, Inc and used as received. All monomers and solvents were degassed by three freeze-pump-thaw cycles under nitrogen gas. 2-Hydroxyethyl acrylate (HEA) (Sigma-Aldrich, 96%) was purified before use by first dissolving the monomer in water (25% by volume), then adding hydroquinone (0.2%) to inhibit thermal polymerization. The solution was extracted with hexane (25 times) to remove diacrylate, and the aqueous solution was then salted (250 g/L NaCl). HEA was then separated from the aqueous phase by multiple ether extraction (6 times) to remove acrylic acid. Hydroquinone (0.2%) was added to the ether solution. $MgSO_4$ (20% wt/v) was used to remove traces of water before evaporation of the ether phase. The purified monomer was subsequently distilled under pressure and degassed immediately prior to use. n-Butyl acrylate (99%), t-butyl acrylate (99%), glycidyl methacrylate (99%), styrene (99%) and dimethyl acrylamide (99%) were purchased from Sigma Aldrich, dried over $CaH_2$, distilled under vacuum, and degassed immediately before use. Methyl acrylate, methyl methacrylate, vinyl acetate, and isobutyl vinyl ether (Sigma Aldrich, 99%) was distilled over $CaH_2$, and degassed immediately prior to use. N,N'-isopropyl acrylamide (Sigma 99%) was used as received.

Instrumentation

Nuclear Magnetic Resonance (NMR) spectra were acquired at room temperature on a JEOL ECA 400 (400 MHz), ECA-500 (500 MHz), or ECA-600 (600 MHz) NMR spectrometer. Chemical shifts are measured relative to residual solvent peaks as an internal standard set to δ 5.32 and δ 54.00 ($CD_2Cl_2$), and δ 7.26 and δ 77.23 ($CDCl_3$) for $^1H$ and $^{13}C$ respectively. Gel permeation chromatography (GPC) was performed using a Tosoh high performance GPC system HLC-8320 equipped with an auto injector, a dual differential refractive index detector and TSKgel G series columns connected in series (7.8×300 mm TSKgel G5000Hxl, TSKgel G4000Hxl, TSKgel G3000Hxl). GPC analysis was carried out in HPLC grade tetrahydrofuran with a flow rate of 1.0 mL/min at 40° C. Molecular weights ($M_n$ and $M_w$) and molecular weight distributions (D) were calculated from poly(methyl methacrylate) (PMMA) standards with molecular weights of 800 to $2.2 \times 10^6$ g mol$^{-1}$ provided by Polymer Standard Service (PSS). UV-Vis spectra were recorded using Agilent Carey 60 UV—vis spectrophotometer. Samples were housed in 1 cm quartz cuvettes with septum-sealed screw cap. Geometries for catalyst 1A, 1B, 2A, 2C, 2D and 3C were optimized at the M06-2X/6-31+G(d,p) level in implicit dichloromethane solvation, employing the polarized continuum model (PCM). Vibrational frequency analyses verified the nature of the stationary points (see details in the ESI). Vertical excitation energies were computed using time-dependent density functional theory (TD-DFT) at the same level of theory. Molecular orbitals were plotted using VMD[3]. All calculations were performed employing Gaussian 09.

Experimental Methods

General Synthesis for 2,3-Substituted Dimine Ligands

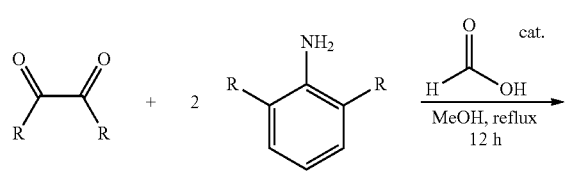

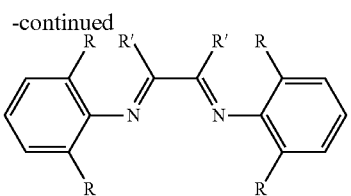

To a solution of the substituted aniline (2.10 equiv) in methanol or ethanol was added the selected di-ketone (1.00 equiv). Formic acid was then added as a catalyst. After heating to reflux for 12-24 hours, the reaction mixture was cooled to room temperature, concentrated under reduced pressure and cooled to −20° C. overnight. The resulting solid residue was recrystallized from cold ethanol, washed with cold methanol, and then dried in vacuo to afford the desired title compound as a yellow or red solid.

N,N'-Bis(2,6-dimethylaniline) butane-2,3-diimine

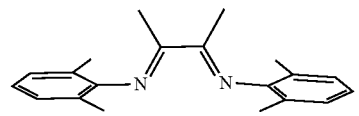 [SMILES: CC(=N\c1c(C)cccc1C)/C(C)=N/c1c(C)cccc1C]

The general procedure for ligand synthesis was used with 2,3-butanedione (3.50 g, 40.66 mmol), 2,6-dimethylaniline (6.75 ml, 54.9 mmol), 1.25 ml of formic acid and 150 ml of methanol in a 250 ml round bottom flask. Yield 85% (10.2 g). $^1$H NMR (CDCl$_3$, 400 MHz, ppm): δ 7.10 (m, 4H), 7.02 (m, 2H), 2.33 (s, 6H), 2.05 (s, 12H). $^{13}$C NMR (100 MHz, CDCl$_3$, ppm) δ 147.9, 127.5, 124.1, 122.8, 17.3, 15.4. This compound is known in the prior art.

N,N'-Bis(2,6-dimethylphenyl)acenaphthylene-1,2-diimine

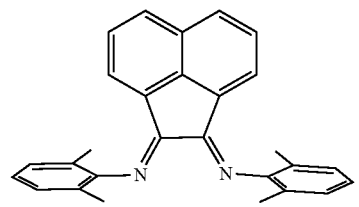 [SMILES: Cc1cccc(C)c1/N=C1/C(=N/c2c(C)cccc2C)c2cccc3cccc1c23]

General procedure for ligands have been used with acenaphthenequinone (5.0 g, 27.4 mmol), 2,6-dimethylaniline (6.75 ml, 54.9 mmol), 1.25 ml of formic acid and 150 ml of methanol in a 250 ml round bottom flask. During reflux, the solution turned from yellow to red. The reaction was cooled to room temperature and excess solvent removed under reduced pressure and the residue subjected to vacuum for 6 hours. After washing with cold (−78° C.) hexane, the product extracted with room temperature hexane (3×100 ml), reduced to minimum volume and cooled to (−35° C.). Formation of orange/red crystals observed, and the product vacuum filtered, giving a 50% yield (5.3 g, 15.8 mmol). $^1$H NMR (400 MHz, CD$_2$Cl$_2$): δ 7.92 (d, J=8.7 Hz, 2H), 7.38 (t, J=7.8 Hz, 2H), 7.07-7.19 (m, 6H), 6.69 (d, J=7.3 Hz, 2H), 2.11 (s, 12H). $^{13}$C NMR (100 MHz, CDCl$_3$, ppm) δ 161.81, 148.9, 141.4, 132.4, 129.9, 129.4, 128.7, 128.4, 125.1, 124.0, 122.9, 17.9. This compound is known.

N,N'-Bis(2,6-diisopropylphenyl)butane-2,3-diimine

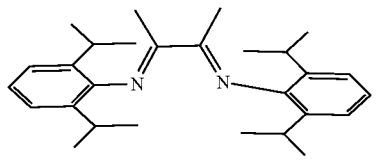 [SMILES: CC(=N\c1c(C(C)C)cccc1C(C)C)/C(C)=N/c1c(C(C)C)cccc1C(C)C]

The general procedure for ligand synthesis was used with 2,3-butanedione (3.50 g, 40.66 mmol), 2,6-diisopropylaniline (15.1 g, 85.4 mmol), 1.25 ml of formic acid and 150 ml of methanol in a 250 ml round bottom flask. Yield 82% (13.5 g). $^1$H NMR (400 MHz, CD$_2$Cl$_2$): δ 7.18 (m, 4H), 7.10 (m, 2H), 2.73 (sp, J=6.6 Hz, 4H), 2.07 (s, 6H), 1.22 (d, J=5.9 Hz, 6H), 1.20 (d, J=5.9 Hz, 6H), 1.18 (d, J=5.9 Hz, 6H), 1.16 (d, J=5.9, 6H). $^{13}$C NMR (100 MHz, CDCl$_3$, ppm) δ 168.6, 146.8, 135.6, 124.2, 123.5, 28.9, 23.3, 22.9. This compound is known.

N,N'-Bis(2,6-diisopropylphenyl)butane-2,3-diimine

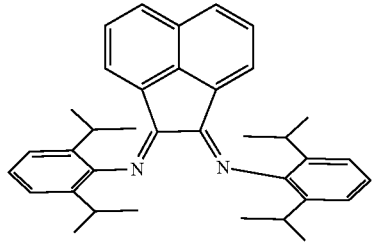 [SMILES: CC(C)c1cccc(C(C)C)c1/N=C1/C(=N/c2c(C(C)C)cccc2C(C)C)c2cccc3cccc1c23]

The general procedure for ligand synthesis was used with acenaphthenequinone (5.0 g, 27.4 mmol), 2,6-diisopropylaniline (10.5 g, 59.2 mmol), 1.25 ml formic acid and 150 ml of methanol in a 250 ml round bottom flask. Yield 90% (12.5 g). $^1$H NMR (400 MHz, CD$_2$Cl$_2$): δ 7.90 (d, J=8.2 Hz, 2H), 7.37 (t, J=7.6 Hz, 2H), 7.22-7.30 (m, 6H), 6.66 (d, J=6.9 Hz, 2H), 3.00-2.93 (m, 4H), 1.21 (d, J=6.4 Hz, 12H), 0.99 (d, J=6.9 Hz, 12H). $^{13}$C NMR (100 MHz, CDCl$_3$, ppm) δ 161.9, 147.6, 141.0, 135.6, 135.6, 131.3, 129.7, 129.0, 128.0, 124.4, 123.6, 123.5, 28.8, 23.6, 23.3. This compound is known.

N,N'-Bis(2-(tert-butyl)phenyl)butane-2,3-diimine

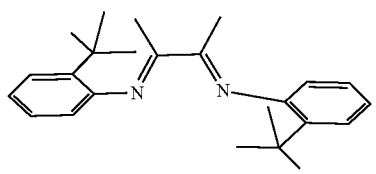 [SMILES: CC(=N\c1ccccc1C(C)(C)C)/C(C)=N/c1ccccc1C(C)(C)C]

The general procedure for ligand synthesis was used with 2,3-butanedione (3.50 g, 40.66 mmol), 2-tert-butylaniline (13 g, 87.1 mmol), 1.25 ml of formic acid and 150 ml of methanol in a 250 ml round bottom flask. Yield 80% (11.3 g). $^1$H NMR (400 MHz, CDCl$_3$): δ 7.41 (d, J=7.3 Hz, 2H), 7.18 (d, J=6.9 Hz, 2H), 7.08 (d, J=7.3 Hz, 2H), 6.50 (d, J=6.9 Hz, 2H), 2.18 (s, 6H), 1.33 (s, 18H). $^{13}$C NMR (100 MHz, CDCl$_3$, ppm) δ 168.7, 146.8, 135.6, 124.2, 123.5, 28.9, 23.3, 22.9. This compound is known.

N,N'-Bis(2-(tert-butyl)phenyl)acenaphthylene-1,2-diimine

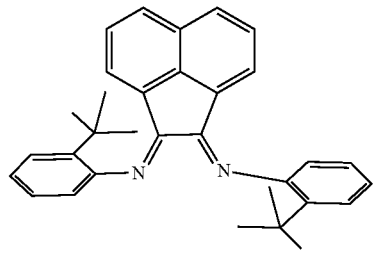 [SMILES: CC(C)(C)c1ccccc1/N=C1/C(=N/c2ccccc2C(C)(C)C)c2cccc3cccc1c23]

The general procedure for ligand synthesis was used with acenaphthenequinone (5.0 g, 27.4 mmol), 2-tert-butylaniline (8.5 g, 57.0 mmol), 1.25 ml formic acid and 150 ml of methanol in a 250 ml round bottom flask. Yield 89% (10.8 g). $^1$H NMR (400 MHz, CD$_2$Cl$_2$): δ 7.90 (d, J=8.2 Hz, 2H), 7.56 (d, J=7.6 Hz, 2H), 7.37 (dd, J=7.6, 7.6 Hz, 2H), 7.22-7.27 (m, 4H), 6.93 (d, J=6.9 Hz, 2H), 6.85 (d, J=6.9 Hz, 2H), 1.37 (s, 18H). $^{13}$C NMR (100 MHz, CDCl$_3$, ppm) δ 159.9, 150.6, 141.8, 139.3, 131.2, 129.1, 128.8, 127.7, 126.83, 126.75, 124.6, 123.9, 119.0, 35.5, 29.8. This compound is known.

N,N'-Bis(rac-4-methyl-2-(sec-(2,4,6-trimethylphenethyl)phenyl)acenaphthylene-1,2-diimine

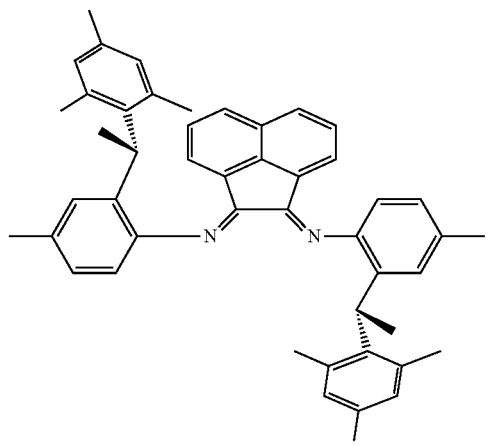

Synthesis of rac-4-methyl-2-sec-(2,4,6-trimethylphenethyl))aniline. The procedure was adopted from literature.[5] p-Toluidine (3.08 g, 28.7 mmol) and 2,4,6-trimethylstyrene (3.09 mL, 19.1 mmol) in xylenes (5 mL) were combined in a 25 ml round bottom flask. Then the flask is closed with septum and sealed by a wire. CF$_3$SO$_3$H (0.34 mL, 3.8 mmol) was added to the solution and the solution was heated at 160° C. for overnight. The solution concentrated under vacuum, and column chromatography (90:10 hexanes:

EtOAc) was used to purify the residue. 3.45 g (13.5 mmol) of a colorless solid was collected by chromatography (77% yield). $^1$H NMR (400 MHz, CDCl$_3$): δ 7.16 (s, 1H), 6.84 (d, J=7.8 Hz, 1H), 6.78 (s, 2H), 6.46 (d, J=7.8 Hz, 1H), 4.34 (q, J=7.3 Hz, 1H), 3.14 (s, 2H), 2.29 (s, 3H), 2.21 (s, 3H), 2.14 (s, 6H), 1.60 (d, J=7.3 Hz, 3H). The procedure for diimine synthesis was adopted from literature. In a round bottom flask acenaphthenequinone (1.2 g, 6.8 mmol), rac-4-methyl-2-(sec-(2,4,6-trimethylphenethyl))aniline (3.45 g, 13.6 mmol), glacial acetic acid (15.5 mL), and toluene (8 mL) were combined and sealed with septum. The solution was heated to 100° C. for 3 h and the color changed to orange/red. After observation of solid particles in the solution, the solution is filtered by vacuum filtration and washed with hexanes (40 ml) and methanol (40 ml). After drying under vacuum the reaction gave 3.5 g of a yellow solid product. Yield (80%). $^1$H NMR (400 MHz, CDCl$_3$): δ 7.59 (d, J=8.0 Hz, 2H), 7.45 (s, 2H), 7.16 (d, J=6.9 Hz, 2H), 7.08 (t, J=7.7 Hz, 2H), 6.87 (d, J=8.0 Hz, 2H), 6.66 (d, J=6.9 Hz, 2H), 5.95 (br s, 2H), 5.34 (br s, 2H), 4.57 (q, J=7.4 Hz, 2H), 2.50 (s, 6H), 2.40 (br s, 6H), 1.68 (br s, 6H), 1.55 (d, J=7.4 Hz, 9H), 0.94 (s, 6H). $^{13}$C NMR (100 MHz, CDCl$_3$, ppm) δ 160.4, 148.2, 140.4, 138.4, 136.9, 134.1, 133.3, 132.1, 129.9, 129.6, 129.1, 128.8, 127.3, 127.2, 126.2, 122.7, 117.7, 36.1, 22.0, 21.3, 20.8 (br), 19.2, 16.3. This compound is known.

General Method for the Synthesis of 2,3-Substituted Diimine Pd(Me)(Cl) Complexes

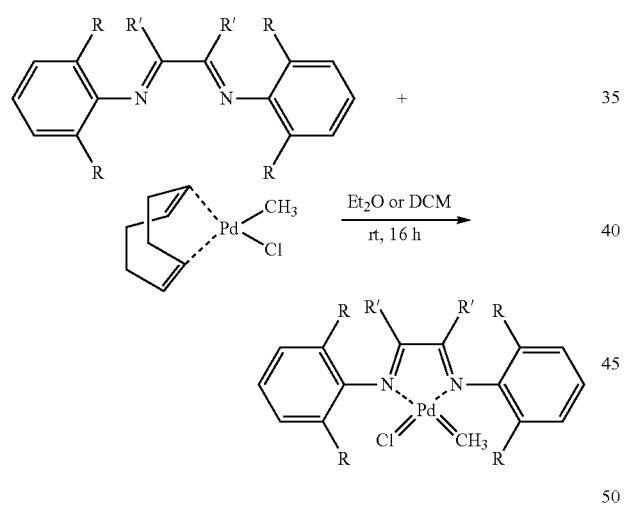

Briefly, diethyl ether or dichloromethane (10 ml) was added to a flame-dried 25 ml round bottom flask containing chloro(1,5-cyclooctadiene)methylpalladium(II) (1 equiv) and a slight excess of 2,3-diimine ligand (1.05 equiv). In diethyl ether, the formation of a yellow-orange, orange or red precipitate was observed within a few minutes upon mixing. In dichloromethane, a color change to deep red was observed over the course of the reaction. For reactions carried out in diethyl ether, the reaction mixture was stirred overnight and the diethyl ether and free cyclooctadiene were then removed via filtration. The solid product was washed twice with 10-20 mL of cold diethyl ether, then dried overnight in vacuo. For reactions in dichloromethane, the product was isolated by direct precipitation of the reaction mixture into pentanes, followed by filtration and washing. The product was then dried en vacuo. The resulting products were then characterized by NMR spectroscopy.

(Ar—N═C(Me)—C(Me)═N—Ar)Pd(Me)(Cl)
(Ar=2,6-dimethylphenyl)

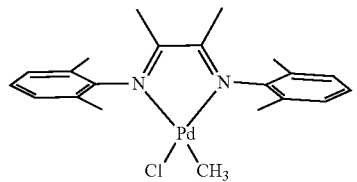

Using the above general procedure bis(2,6-dimethylaniline)-butane-2,3-diimine (315 mg 1.08 mmol, 1.06 equiv), and chloro(1,5 cyclooctadiene)methylpalladium(II) (270 mg, 1.02 mmol, 1 equiv) were combined with 10 ml of degassed DCM in a 25 ml flamed dried round bottom flask. The reaction mixture was stirred overnight. The reaction mixture was then directly added in a dropwise manner to the 150 ml of pentane to precipitate the product. The product was then collected by vacuum filtration and dried overnight in vacuo resulting 400 mg of the desired product. Yield 90%. $^1$H NMR (400 MHz, CDCl$_3$, ppm): δ 7.08-7.20 (m, 6H), 2.22 (s, 13H), 2.00 (s, 3H), 1.96 (s, 3H), 0.25 (s, 3H). $^{13}$C NMR (150 MHz, CD$_2$Cl$_2$, ppm) δ 175.1, 170.4, 142.4, 142.8, 139.2, 138.7, 128.8, 127.0, 124.9, 123.6, 29.5, 28.9, 24.8, 29.7, 23.8, 23.8, 21.2, 20.2, 5.6 ppm.

(Ar—N═C(An)—C(An)═N—Ar)Pd(Me)(Cl)
(Ar=2,4-dimethylphenyl; An=acenaphthene)

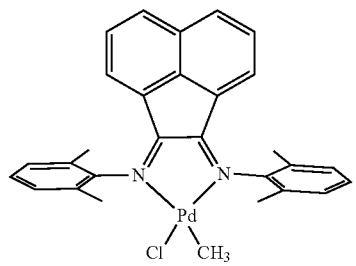

Using the above general procedure bis(2,6-dimethylphenyl)acenaphthylene-1,2-diimine (415 mg 1.07 mmol, 1.05 equiv), and chloro(1,5 cyclooctadiene)methylpalladium(II) (270 mg, 1.02 mmol, 1 equiv) were combined with 10 ml of degassed DCM in a 25 ml flamed dried round bottom flask. The reaction mixture was stirred overnight. The reaction mixture was then directly added in a dropwise manner to the 150 ml of pentane to precipitate the product. The product was then collected by vacuum filtration and dried overnight in vacuo resulting 470 mg of the desired product. Yield 85%. $^1$H NMR (400 MHz, CDCl$_3$, ppm): δ 8.06 (dd, J=16.3, 8.3 Hz, 2H), 7.44 (dd, J=19.4, 7.8 Hz, 2H), 7.29-7.23 (m, 6H), 6.73 (d, J=7.1 Hz, 1H), 6.54 (d, J=7.4 Hz, 1H), 2.29 (d, J=6.6 Hz, 12H), 0.57 (s, 3H).

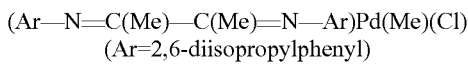

(Ar—N═C(Me)—C(Me)═N—Ar)Pd(Me)(Cl)
(Ar=2,6-diisopropylphenyl)

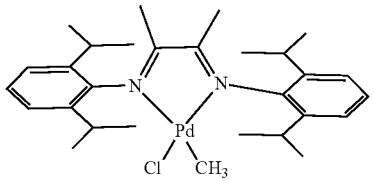

Using the above general procedure bis(2,6-diisopropylaniline)-butane-2,3-diimine (435 mg 1.08 mmol, 1.05 equiv), and chloro(1,5 cyclooctadiene)methylpalladium(II) (270 mg, 1.02 mmol, 1 equiv) were combined with 10 ml of diethyl ether in a 25 ml flamed dried round bottom flask. The product was then collected by vacuum filtration and dried overnight in vacuo resulting 520 mg of the desired product. Yield 90%. $^1$H NMR (400 MHz, CDCl$_3$, ppm): δ 7.36-7.26 (m, 6H), 3.08 (sep, J=6.60 Hz, 2H), 3.02 (sep, J=6.93 Hz, 2H), 2.06 (s, 3H), 2.05 (s, 3H), 1.42 (d, J=7.31 Hz, 6H), 1.37 (d, J=7.31 Hz, 6H), 1.20 (d, J=6.99 Hz, 6H), 1.19 (d, J=6.99 Hz, 6H), 0.39 (s, 3H). $^{13}$C NMR (150 MHz, CD$_2$Cl$_2$, ppm) δ 175.8, 170.4, 142.4, 142.2, 139.1, 138.5, 128.1, 127.3, 124.4, 123.7, 29.4, 28.9, 24.1, 29.9, 23.6, 23.4, 21.6, 20.2, 5.6.

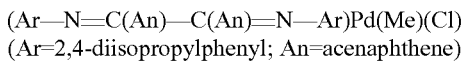

(Ar—N═C(An)—C(An)═N—Ar)Pd(Me)(Cl)
(Ar=2,4-diisopropylphenyl; An=acenaphthene)

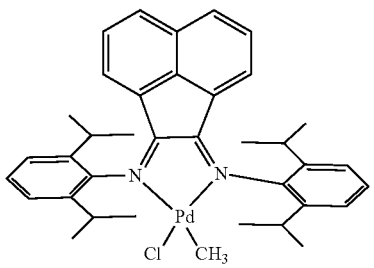

Using the above general procedure bis(2,6-diisopropylphenyl)acenaphthylene-1,2-diimine (535 mg 1.07 mmol, 1.05 equiv), and chloro(1,5 cyclooctadiene)methylpalladium(II) (270 mg, 1.02 mmol, 1 equiv) were combined with 15 ml of degassed DCM in a 25 ml flamed dried round bottom flask. The reaction mixture was stirred overnight. The reaction mixture was then directly added in a dropwise manner to the 150 ml of pentane to precipitate the product. The product was then collected by vacuum filtration and dried overnight in vacuo resulting 600 mg of the desired product. Yield 90%. $^1$H NMR (400 MHz, CDCl$_3$, ppm): δ 8.14-8.20 (m, 2H), 7.42-7.59 (m, 12H), 6.95 (d, J=7.3 Hz, 1H), 6.54 (d, J=7.3 Hz, 1H), 3.17-3.30 (m, 4H), 1.96 (d, J=20.6 Hz, 3H), 1.64 (s, 5H), 1.37-1.55 (m, 11H), 0.96-1.13 (m, 11H), 0.83 (s, 3H)$^{13}$C NMR (150 MHz, CD$_2$Cl$_2$, ppm) δ 175.08, 170.44, 142.44, 142.28, 139.12, 138.57, 128.18, 127.30, 124.49, 123.76, 29.45, 28.99, 24.08, 29.97, 23.68, 23.48, 21.62, 20.20.

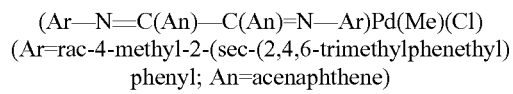

(Ar—N═C(An)—C(An)═N—Ar)Pd(Me)(Cl)
(Ar=rac-4-methyl-2-(sec-(2,4,6-trimethylphenethyl)phenyl; An=acenaphthene)

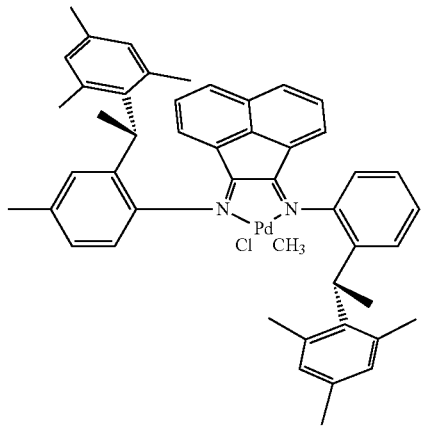

Using the above general procedure bis(rac-4-methyl-2-(sec-(2,4,6-trimethylphenethyl)phenyl)acenaphthylene-1,2-diimine. (700 mg, 1.07 mmol, 1.05 equiv), and chloro(1,5 cyclooctadiene)methylpalladium(II) (270 mg, 1.02 mmol, 1 equiv) were combined with 20 ml of degassed DCM in a 25 ml flamed dried round bottom flask. The reaction mixture was stirred overnight. The reaction mixture was then directly added in a dropwise manner to the 150 ml of pentane to precipitate the product. The product was then collected by vacuum filtration and dried overnight in vacuo resulting 660 mg of the desired product. Yield 80%. $^1$H NMR (400 MHz, CDCl$_3$, ppm): 7.82 (dd, J=14.2, 8.2 Hz, 2H), 7.59 (s, 1H), 7.54 (s, 1H), 7.34 (d, J=7.8 Hz, 1H), 7.29 (d, J=7.8 Hz, 1H), 7.22-7.25 (m, 1H), 7.20 (t, J=7.1 Hz, 1H), 7.02 (d, J=7.8 Hz, 1H), 6.99 (d, J=7.8 Hz, 1H), 6.82 (d, J=6.9 Hz, 1H), 6.56 (d, J=7.3 Hz, 1H), 6.12 (s, 1H), 6.06 (s, 1H), 5.22 (s, 1H), 5.17 (s, 1H), 5.01 (q, J=7.3 Hz, 1H), 4.70 (q, J=7.3 Hz, 1H), 3.21 (s, 3H), 3.14 (s, 3H), 2.54 (s, 6H), 1.54-1.60 (multiple br s, 12H), 0.91 (s, 3H), 0.86 (s, 3H), 0.54 (s, 3H).

General Procedure for the Synthesis of Cationic Pd(II) α-Diimine Complexes with Acetonitrile Ligand

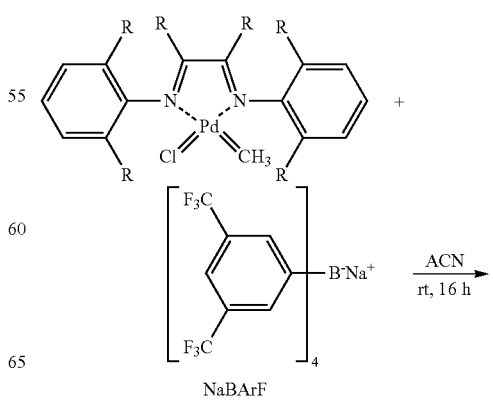

-continued

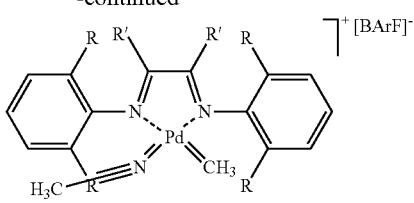

At room temperature, dichloromethane and acetonitrile was added to a flamed-dried flask containing sodium tetrakis [3,5-bis(trifluoromethyl)phenyl]borate (NaBAr'$_4$) and (Ar—N=C(Me)—C(Me)=N—Ar)Pd(Me)(Cl). As the reaction progressed, precipitation of sodium chloride (NaCl) was observed. After stirring overnight, NaCl was removed from the reaction mixture via filtration, and the solvent was evaporated. The solid was dissolved in a small amount of dichloromethane and filtered again with a 0.45 μm PTFE syringe filter. The filtrate was added dropwise to pentane to precipitate the desired product. The resulting solid was filtered, washed with pentane, and dried in vacuo to give the desired product as a solid compound. All cationic α-diimine Pd(II) complexes contained the $[B(3,5-C_6H_3(CF_3)_2)_4]^-$ counterion. Spectral data was similar for each complex. $^1$H NMR (400 MHz, CD$_2$Cl$_2$) 7.73 (s, 8H), 7.57 (s, 4H); $^{13}$C NMR (100 MHz, CD$_2$Cl$_2$) ppm 162.3 (q, $J_{CB}$=49.8 Hz, 4C), 135.4 (8C), 129.3 (q, $J_{CF}$=30.3 Hz, 8C), 125.2 (q, $J_{CF}$=272.7 Hz, 8C), 117.9 (4C). The NMR data for the BAr'$_4$ counterion matched those previously reported.

(Ar—N=C(Me)—C(Me)=N—Ar)Pd(Me)(CH$_3$CN)]$^+$[B(3,5-C$_6$H$_3$(CF$_3$)$_2$)$_4$]$^-$ (Ar=2,6-dimethylphenyl)

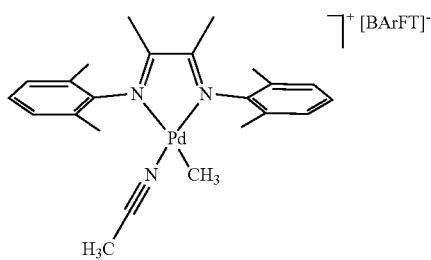

Catalyst 1A. Using the general procedure (Ar—N=C(Me)—C(Me)=N—Ar)Pd(Me)(Cl) (Ar=2,6-dimethylphenyl) (150 mg, 0.334 mmol, 1 equiv), NaBAr'F (310 mg, 0.350 mmol, 1.05 equiv), acetonitrile (5 ml) and dichloromethane (5 ml) were combined. The product was isolated as a yellow solid (350 mg, 80% yield). $^1$H NMR (400 MHz, CD$_2$Cl$_2$): δ 7.14-7.22 (m, 6H), 2.23 (s, 6H), 2.17 (s, 6H), 2.16 (s, 3H), 2.14 (s, 3H), 1.78 (s, 3H), 0.38 (s, 3H). $^{13}$C NMR (100 MHz, CD$_2$Cl$_2$) ppm 180.3, 172.4, 162.3, 143.1, 135.4, 129.4, 129.2, 128.6, 128.4, 127.9, 127.6, 125.2, 20.4, 19.4, 18.2, 18.0, 5.2, 2.5 ppm.

(Ar—N=C(An)—C(An)=N—Ar)Pd(Me)(CH$_3$CN)]$^+$[B(3,5-C$_6$H$_3$(CF$_3$)$_2$)$_4$]$^-$ (Ar=2,4-dimethylphenyl; An=acenaphthene)

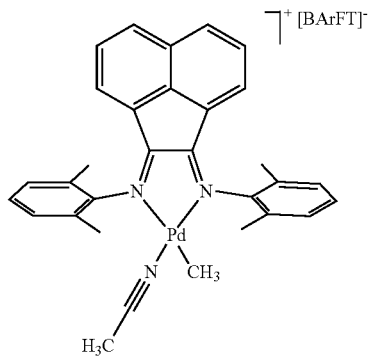

Catalyst 1C. Using the general procedure (Ar—N=C(An)—C(An)=N—Ar)Pd(Me)(Cl) (Ar=2,6-dimethylphenyl) (190 mg, 0.348 mmol, 1 equiv), NaBAr'F (325 mg, 0.367 mmol, 1.05 equiv), acetonitrile (5 ml) and dichloromethane (5 ml) were combined. The product was isolated as an orange-yellow solid (400 mg, 81% yield). $^1$H NMR (400 MHz, CD$_2$Cl$_2$): δ 8.23 (s, 2H), 7.60 (s, 4H), 7.19-7.25 (m, 6H), 2.28 (s, 6H), 2.20 (s, 6H), 2.19 (s, 3H), 0.57 (s, 3H). $^{13}$C NMR (100 MHz, CD$_2$Cl$_2$) ppm 180.9, 173.2, 143.5, 143.0, 133.7, 129.6, 129.5, 128.8, 128.4, 128.2, 128.0, 119.6, 111.4, 22.9, 20.5, 19.5, 18.2, 18.1, 14.4, 6.87 ppm.

(Ar—N=C(Me)—C(Me)=N—Ar)Pd(Me)(CH$_3$CN)]$^+$[B(3,5-C$_6$H$_3$(CF$_3$)$_2$)$_4$]$^-$ (Ar=2,6-diisopropylphenyl)

Catalyst 2A. Using the general procedure (Ar—N=C(Me)—C(Me)=N—Ar)Pd(Me)(Cl) (Ar=2,6-diisopropylphenyl) (150 mg, 0.267 mmol, 1 equiv), NaBAr'$_4$ (250 mg, 0.282 mmol, 1.05 equiv), and acetonitrile (10 ml) were combined. The product was isolated as a yellow solid (350 mg, 91% yield). $^1$H NMR (400 MHz, CD$_2$Cl$_2$): δ 7.41-7.32 (m, 6H), 2.89 (sep, J=6.93 Hz, 2H), 2.85 (sep, J=6.93 Hz, 2H), 2.22 (s, 6H), 1.79 (s, 3H), 1.37 (d, J=6.94 Hz, 6H), 1.32 (d, J=6.94 Hz, 6H), 1.24 (d, J=6.94 Hz, 6H), 1.20 (d, J=6.94 Hz, 6H), 0.50 (s, 3H). $^{13}$C NMR (100 MHz, CD$_2$Cl$_2$) δ 180.2, 172.5, 140.8, 140.7, 138.7, 138.0, 135.4, 129.5, 128.8, 127.9, 125.1, 124.8, 29.7, 29.4, 24.0, 23.9, 23.6, 23.2, 22.0, 20.4, 6.6, 3.2. This compound is known.

(Ar—N═C(An)—C(An)═N—Ar)Pd(Me)(CH$_3$CN)]$^+$[B(3,5-C$_6$H$_3$(CF$_3$)$_2$)$_4$]$^-$ (Ar=2,4-diisopropylphenyl; An=acenaphthene)

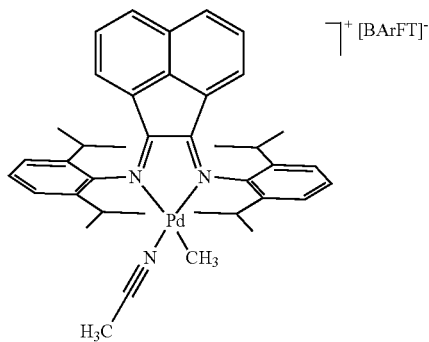

Catalyst 2C. Using the general procedure (Ar—N═C(An)—C(An)═N—Ar)Pd(Me)(Cl) (Ar=2,6-diisopropylphenyl) (280 mg, 0.426 mmol, 1 equiv), NaBAr'F (400 mg, 0.451 mmol, 1.05 equiv), acetonitrile (6 ml) and dichloromethane (6 ml) were combined. The product was isolated as an orange-yellow solid (550 mg, 85% yield). $^1$H NMR (400 MHz, CD$_2$Cl$_2$): δ 8.15 (dd, J=8.5, 8.5 Hz, 2H), 7.42-7.58 (m, 8H), 6.95 (d, J=7.1 Hz, 1H), 6.54 (d, J=7.3 Hz, 1H), 3.18-3.32 (m, 4H), 1.92 (s, 3H), 1.43 (d, J=6.9 Hz, 6H), 1.38 (d, J=6.9 Hz, 6H), 1.07 (d, J=6.9 Hz, 6H), 0.97 (d, J=6.9 Hz, 6H), 0.84 (s, 3H). $^{13}$C NMR (100 MHz, CD$_2$Cl$_2$) δ 176.8, 169.8, 146.4, 141.2, 140.5, 139.7, 138.6, 133.7, 133.0, 132.0, 129.7, 129.8, 126.8, 126.2, 125.8, 125.6, 121.9, 29.8, 29.6, 24.2, 23.9, 23.7, 23.3, 8.0, 2.8. This compound is known.

(Ar—N═C(An)—C(An)═N—Ar)Pd(Me)(CH$_3$CN)]$^+$[B(3,5-C$_6$H$_3$(CF$_3$)$_2$)$_4$]$^-$ (Ar=2-tert-butylphenyl)

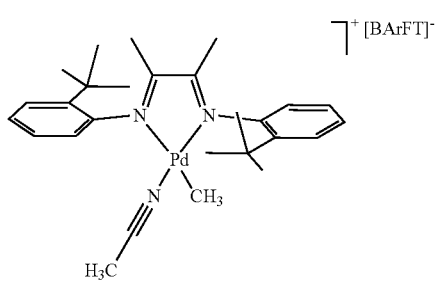

Catalyst 3A. To a flamed-dried round bottom flask equipped with a stirbar and argon balloon, was added chloro(1,5-cyclooctadiene)methylpalladium(II) (180 mg, 0.679 mmol, 1.0 equiv) and sodium tetrakis[3,5-bis(trifluoromethyl)phenyl]borate (602 mg, 0.679 mmol, 1.0 equiv). After cooling the flask in an acetonitrile/dry-ice bath (−40° C.), 25 mL of dichloromethane and 25 mL of acetonitrile were added slowly. The reaction was allowed to warm up to −20° C., at which time stirring was stopped and the precipitate was allowed to settle. The reaction was then cannula filtered into another round bottom flask cooled in an ice-bath, and containing a suspension of N,N'-bis(2-(tert-butyl)phenyl)butane-2,3-diimine (237 mg, 0.680, 1.0 equiv) in 20 mL of acetonitrile. The reaction was stirred at room temperature overnight, and the solvents were removed under vacuum to give a yellow oil. The oil was diluted with 8 mL of dichloromethane and filtered into a stirring solution of pentanes. After allowing the product to settle, the solution was decanted and the precipitate washed with pentanes followed by removal of residual solvents in vacuo. The product was isolated as a yellow powder (750 mg, 80% yield). Two isomers were observed in the NMR in a ratio of 8.6:1. $^1$H NMR (400 MHz, CD$_2$Cl$_2$): δ (major isomer) 7.54-7.62 (m, 2H), 7.26-7.42 (m, 4H), 6.65-6.75 (m, 2H), 2.24 (s, 3H), 2.21 (s, 3H), 1.76 (s, 3H), 1.48 (s, 9H), 1.46 (s, 9H), 0.59 (s, 3H). $^{13}$C NMR (100 MHz, CD$_2$Cl$_2$) δ 180.3, 172.8, 145.3, 144.5, 140.7, 140.2, 130.0, 128.8, 128.2, 128.1, 123.1, 121.4, 121.1, 36.7, 36.2, 32.1, 31.4, 23.0, 21.3, 7.0, 2.4 ppm. This compound is known.

(Ar—N═C(An)—C(An)═N—Ar)Pd(Me)(CH$_3$CN)]$^+$[B(3,5-C$_6$H$_3$(CF$_3$)$_2$)$_4$]$^-$ (Ar=2 tert-butylphenyl; An=acenaphthene)

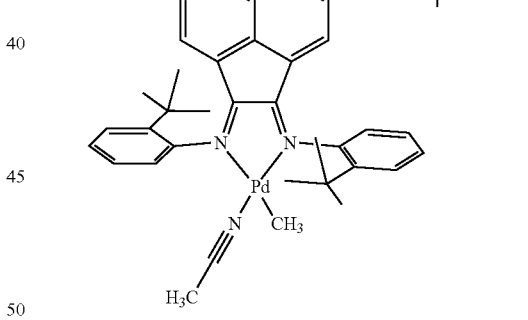

Catalyst 3C. Using a procedure similar to that describe above for the preparation of complex (Ar—N═C(An)—C(An)═N—Ar)Pd(Me)(CH$_3$CN)]$^+$[B(3,5-C$_6$H$_3$(CF$_3$)$_2$)$_4$]$^-$ (Ar=2-tert-butylphenyl), (COD)PdMeCl (180 mg, 0.679 mmol, 1 equiv), NaBAr'$_4$ (602 mg, 0.679 mmol, 1 equiv), and N,N'-Bis(2-(tert-butyl)phenyl) acenaphthylene-1,2-diimine (302 mg, 0.679 mmol, 1 equiv) were combined. The product was isolated as an orange solid (790 mg, 79% yield). $^1$H NMR (400 MHz, CD$_2$Cl$_2$): δ 8.12 (dd, J=8.4, 8.4 Hz, 2H), 7.43-7.53 (m, 6H), 7.03-7.14 (m, 2H), 6.82 (d, J=7.3 Hz, 1H), 6.42 (d, J=7.3 Hz, 1H), 1.90 (s, 3H), 1.50 (s, 9H), 1.48 (s, 9H), 0.91 (s, 3H). $^{13}$C NMR (100 MHz, CD$_2$Cl$_2$) δ 176.1, 169.1, 145.2, 143.9, 140.9, 140.7, 132.9, 132.2, 129.7, 128.2, 127.9, 127.0, 126.4, 126.0, 125.2, 122.9, 36.4, 35.9, 31.9, 31.9, 31.0, 7.5, 2.3 ppm.

(Ar—N═C(An)—C(An)═N—Ar)Pd(Me)
(CH₃CN)]⁺[B(3,5-C₆H₃(CF₃)₂)₄]⁻ (4-methyl-2-(sec-
(2,4,6-trimethylphenethyl)phenyl;
An=acenaphthene)

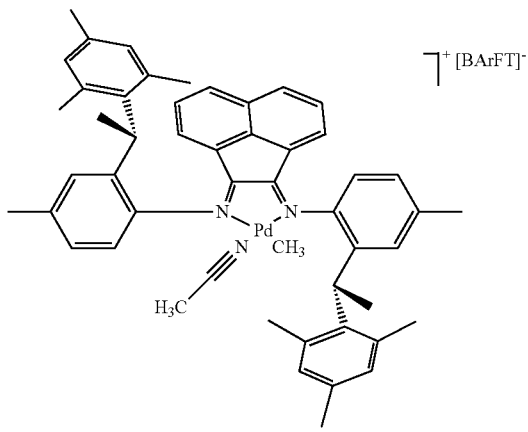

Catalyst 4C. Using the general procedure (Ar—N═C(An)—C(An)═N—Ar)Pd(Me)(Cl) (4-methyl-2-(sec-(2,4,6-trimethylphenethyl)phenyl; An=acenaphthene) (450 mg, 0.556 mmol, 1 equiv), NaBAr′₄ (500 mg, 0.564 mmol, 1.0 equiv), acetonitrile (6 ml) and dichloromethane (9 ml) were combined. The product was isolated as an yellow solid (740 mg, 71% yield). ¹H NMR (400 MHz, CD₂Cl₂): δ 7.89-7.94 (m, 2H), 7.61 (d, J=8.2 Hz, 2H), 7.29-7.38 (m, 4H), 7.06 (d, J=7.5 Hz, 1H), 7.00 (d, J=7.8 Hz, 1H), 6.92 (d, J=7.3 Hz, 1H), 6.60 (d, J=7.3 Hz, 1H), 6.13 (s, 2H), 5.29 (s, 2H), 4.69-4.74 (m, 1H), 4.51 (q, J=6.9 Hz, 1H), 3.09 (d, J=11.4 Hz, 6H), 2.52 (d, J=6.9 Hz, 6H), 1.91 (s, 3H), 1.53-1.68 (m, 12H), 0.97 (s, 3H), 0.93 (s, 3H), 0.69 (s, 3H). ¹³C NMR (100 MHz, CD₂Cl₂) δ 176.2, 168.7, 145.4, 141.7, 141.3, 138.2, 137.9, 137.5, 137.4, 136.1, 135.9, 135.8, 135.4, 135.1, 134.6, 131.7, 131.0, 130.8, 130.5, 130.1, 129.6, 128.5, 128.1, 127.6, 127.6, 125.1, 125.1, 124.5, 124.2, 121.2, 120.5, 119.7, 36.9, 36.7, 22.7, 21.3, 21.1, 20.7, 19.1, 19.0, 16.2, 5.4, 2.3 ppm.

General Synthesis of Cationic Pd(II) α-Diimine Complexes with Benzonitrile Ligand

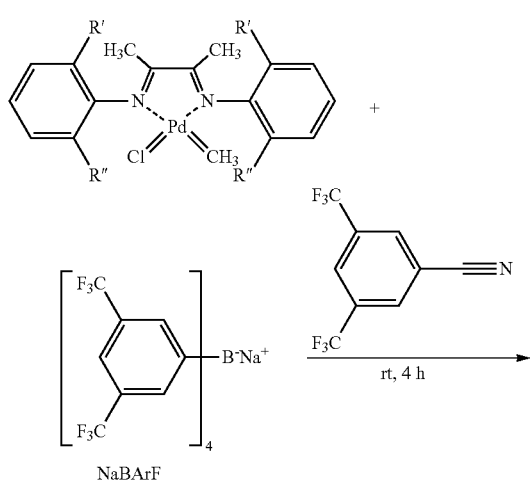

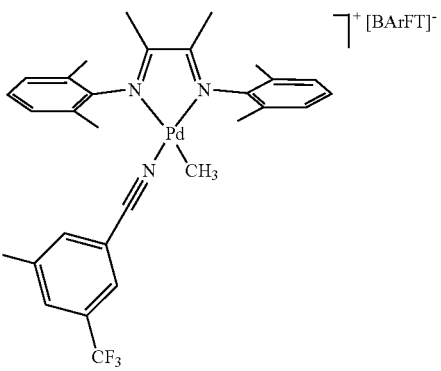

At room temperature, dichloromethane and bis(trifluoromethyl)benzonitrile was added to a flamed-dried flask containing sodium tetrakis[3,5-bis(trifluoromethyl)phenyl] borate (NaBAr′F) and (Ar—N═C(Me)—C(Me)═N—Ar)Pd(Me)(Cl). As the reaction progressed, precipitation of sodium chloride (NaCl) was observed. After stirring for 4 h, NaCl was removed from the reaction mixture via filtration, and the solvent was evaporated.

The solid was dissolved in a small amount of dichloromethane and filtered again with a 0.45 μm PTFE syringe filter. The filtrate was added dropwise to pentane to precipitate the desired product. The resulting solid was filtered, washed with pentane, and dried in vacuo to give the desired product as a solid compound. All cationic a-diimine Pd(II) complexes contained the [B(3,5-C₆H₃(CF₃)₂)₄]⁻ counterion. Spectral data was similar for each complex. ¹H NMR (400 MHz, CD₂Cl₂) 7.73 (s, 8H), 7.57 (s, 4H); ¹³C NMR (100 MHz, CD₂Cl₂) ppm 162.3 (q, $J_{CB}$=49.8 Hz, 4C), 135.4 (8C), 129.3 (q, $J_{CF}$=30.3 Hz, 8C), 125.2 (q, $J_{CF}$=272.7 Hz, 8C), 117.9 (4C). The NMR data for the BAr′₄ counterion matched those previously reported.

(Ar—N═C(Me)—C(Me)═N—Ar)Pd(Me)
(NCAr′)]⁺[B(3,5-C₆H₃(CF₃)₂)₄]⁻ (Ar=2,6-dimethylphenyl; Ar′=3,5-C₆H₃(CF₃)₂, An=acenaphthene)

Catalyst 1B. Using the general procedure (Ar—N═C(Me)—C(Me)═N—Ar)Pd(Me)(Cl) (Ar=2,6-dimethylphenyl) (150 mg, 0.334 mmol, 1 equiv), NaBAr′F (310 mg, 0.350 mmol, 1.05 equiv), bis(trifluoromethyl)benzonitrile (200 mg, 0.836 mmol, 2.5 equiv) and dichloromethane (15 ml) were combined. The product was isolated as a yellow solid (400 mg, 79% yield). ¹H NMR (400 MHz, CD₂Cl₂): δ 7.14-7.22 (m, 6H), 2.23 (s, 6H), 2.17 (s, 6H), 2.16 (s, 3H), 2.14 (s, 3H), 0.38 (s, 3H). $^{13}$C NMR (100 MHz, CD$_2$Cl$_2$) ppm 180.3, 172.4, 162.3, 143.1, 135.4, 129.4, 129.2, 128.6, 128.4, 127.9, 127.6, 125.2, 20.4, 19.4, 18.2, 18.0, 5.2, 2.5 ppm.

(Ar—N═C(An)—C(An)═N—Ar)Pd(Me)(NCAr')]$^+$[B(3,5-C$_6$H$_3$(CF$_3$)$_2$)$_4$]$^-$ (Ar=2,6-dimethylphenyl; Ar'=3,5-C$_6$H$_3$(CF$_3$)$_2$, An=acenaphthene)

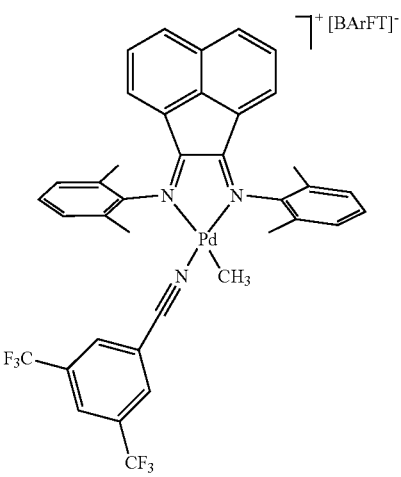

Catalyst 1D. Using the general procedure (Ar—N═C(An)—C(An)═N—Ar)Pd(Me)(Cl) (Ar=2,6-dimethylphenyl) (190 mg, 0.348 mmol, 1 equiv), NaBAr'F (325 mg, 0.367 mmol, 1.05 equiv), bis(trifluoromethyl)benzonitrile (225 mg, 0.941 mmol, 2.5 equiv) and dichloromethane (15 ml) were combined.

The product was isolated as an orange-yellow solid (400 mg, 81% yield). $^1$H NMR (400 MHz, CD$_2$Cl$_2$): δ 8.23 (s, 2H), 7.60 (s, 4H), 7.19-7.25 (m, 6H), 2.28 (s, 6H), 2.20 (s, 6H), 2.19 (s, 3H), 0.57 (s, 3H). $^{13}$C NMR (100 MHz, CD$_2$Cl$_2$) ppm 180.9, 173.2, 143.5, 143.0, 133.7, 129.6, 129.5, 128.8, 128.4, 128.2, 128.0, 119.6, 111.4, 22.9, 20.5, 19.5, 18.2, 18.1, 14.4, 6.87 ppm. This compound is known.

(Ar—N═C(Me)—C(Me)═N—Ar)Pd(Me)(NCAr')]$^+$[B(3,5-C$_6$H$_3$(CF$_3$)$_2$)$_4$]$^-$ (Ar=2,6-diisopropylphenyl; Ar'=3,5-C$_6$H$_3$(CF$_3$)$_2$,)

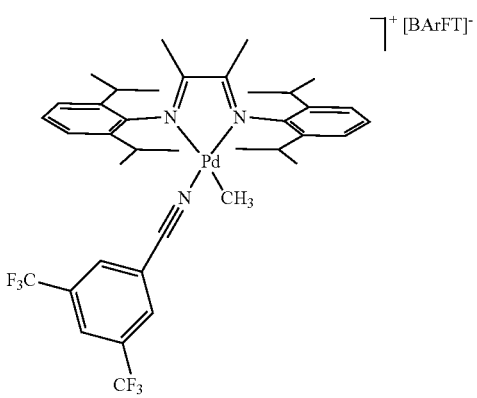

Catalyst 2B. Using the general procedure (Ar—N═C(An)—C(An)═N—Ar)Pd(Me)(Cl) (Ar=2,6-diisopropylphenyl) (280 mg, 0.426 mmol, 1 equiv), NaBAr'F (400 mg, 0.451 mmol, 1.05 equiv), bis(trifluoromethyl)benzonitrile (225 mg, 0.941 mmol, 2.5 equiv) and dichloromethane (6 ml) were combined.

The product was isolated as an orange-yellow solid (550 mg, 85% yield). $^1$H NMR (400 MHz, CD$_2$Cl$_2$): δ 8.15 (dd, J=8.5, 8.5 Hz, 2H), 7.42-7.58 (m, 8H), 6.95 (d, J=7.1 Hz, 1H), 6.54 (d, J=7.3 Hz, 1H), 3.18-3.32 (m, 4H), 1.92 (s, 3H), 1.43 (d, J=6.9 Hz, 6H), 1.38 (d, J=6.9 Hz, 6H), 1.07 (d, J=6.9 Hz, 6H), 0.97 (d, J=6.9 Hz, 6H), 0.84 (s, 3H). $^{13}$C NMR (100 MHz, CD$_2$Cl$_2$) δ 176.8, 169.8, 146.4, 141.2, 140.5, 139.7, 138.6, 133.7, 133.0, 132.0, 129.7, 129.8, 126.8, 126.2, 125.8, 125.6, 121.9, 29.8, 29.6, 24.2, 23.9, 23.7, 23.3, 8.0, 2.8 ppm.

(Ar—N═C(An)—C(An)═N—Ar)Pd(Me)(NCAr')]$^+$[B(3,5-C$_6$H$_3$(CF$_3$)$_2$)$_4$]$^-$ (Ar=2,4-diisopropylphenyl; Ar'=3,5-C$_6$H$_3$(CF$_3$)$_2$; An=acenaphthene)

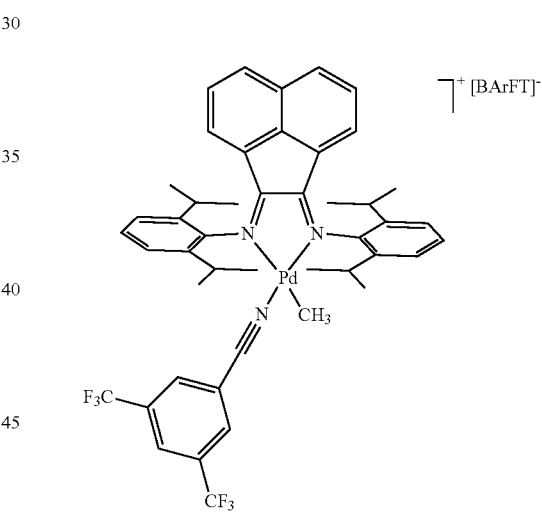

Catalyst 2D. Using the general procedure (Ar—N═C(An)—C(An)═N—Ar)Pd(Me)(Cl) (Ar=2,6-diisopropylphenyl) (280 mg, 0.426 mmol, 1 equiv), NaBAr'F (400 mg, 0.451 mmol, 1.05 equiv), bis(trifluoromethyl)benzonitrile (280 mg, 1.17 mmol) and dichloromethane (15 ml) were combined.

The product was isolated as a yellow solid (500 mg, 68% yield). $^1$H NMR (400 MHz, CD$_2$Cl$_2$): δ 8.26 (s, 1H), 8.18 (t, J=7.4 Hz, 2H), 7.49-7.61 (m, 12H), 6.98 (d, J=7.3 Hz, 1H), 6.59 (d, J=7.3 Hz, 1H), 3.36 (td, J=13.4, 6.6 Hz, 1H), 3.23 (td, J=13.5, 6.6 Hz, 1H), 1.41 (d, J=6.6 Hz, 12H), 1.09 (d, J=6.6 Hz, 6H), 1.01 (s, 3H), 0.99 (d, J=6.9 Hz, 6H). $^{13}$C NMR (100 MHz, CD$_2$Cl$_2$) δ 177.0, 170.1, 146.3, 140.8, 139.2, 138.5, 133.9, 133.5, 133.02, 132.8, 131.5, 129.3, 126.5, 125.4, 125.1, 124.8, 120.5, 120.3, 110.9, 29.3, 29.2, 23.7, 23.5, 23.16, 22.8, 8.8 ppm.

(Ar—N=C(An)—C(An)=N—Ar)Pd(Me)(NCAr')]⁺[B(3,5-C₆H₃(CF₃)₂)₄]⁻ (Ar=2 tert-butylphenyl: Ar'=3,5-C₆H₃(CF₃)₂)

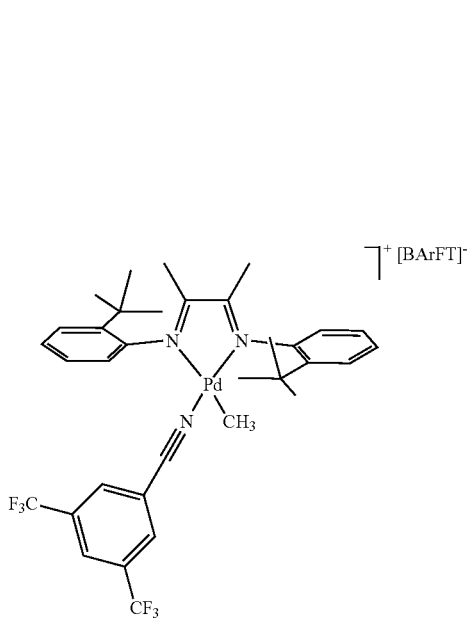

Catalyst 3B. To a flamed-dried round bottom flask equipped with a stirbar and argon balloon, was added chloro(1,5-cyclooctadiene)methylpalladium(II) (180 mg, 0.679 mmol, 1.0 equiv), sodium tetrakis[3,5-bis(trifluoromethyl)phenyl]borate (602 mg, 0.679 mmol, 1.0 equiv) and bis(trifluoromethyl)benzonitrile (170 mg, 0.711 mmol). After cooling the flask in an acetonitrile/dry-ice bath (−40° C.), 25 mL of dichloromethane was added slowly. The reaction was allowed to warm up to −20° C., at which time stirring was stopped and the precipitate was allowed to settle.

The reaction was then cannula filtered into another round bottom flask cooled in an ice-bath, and containing a suspension of N,N'-bis(2-(tert-butyl)phenyl)butane-2,3-diimine (237 mg, 0.680, 1.0 equiv) in 20 mL of diethyl ether. The reaction was stirred at room temperature overnight, and the solvents were removed under vacuum to give a yellow oil. The oil was diluted with 8 mL of dichloromethane and filtered into a stirring solution of pentanes. After allowing the product to settle, the solution was decanted, and the precipitate washed with pentanes followed by removal of residual solvents in vacuo.

The product was isolated as a dark yellow powder (791 mg, 74% yield). Two isomers were observed in the NMR in a ratio of 6:1. ¹H NMR (400 MHz, CD₂Cl₂): δ (major isomer) 8.20 (s, 1H), 7.59 (d, J=11.2 Hz, 2H), 7.32-7.44 (m, 4H), 7.00 (d, J=7.8 Hz, 1H), 6.80 (d, J=6.9 Hz, 1H), 2.65 (s, 3H), 2.29 (s, 3H), 1.42-1.53 (m, 12H), 1.40 (m, 9H). ¹³C NMR (100 MHz, CD₂Cl₂) δ 180.3, 172.8, 145.3, 144.5, 140.7, 140.2, 130.0, 128.8, 128.2, 128.1, 123.1, 121.4, 121.1, 36.7, 36.2, 32.1, 31.4, 23.0, 21.3, 7.0, 2.4 ppm.

(Ar—N=C(An)—C(An)=N—Ar)Pd(Me)(NCAr')]⁺[B(3,5-C₆H₃(CF₃)₂)₄]⁻ (Ar=2 tert-butylphenyl; Ar'=3,5-C₆H₃(CF₃)₂; An=acenaphthene)

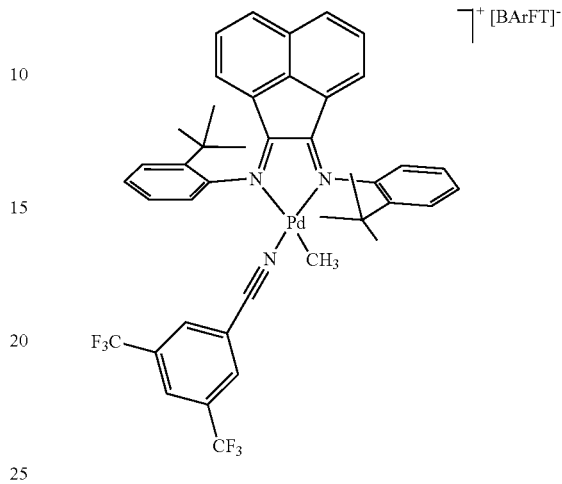

Catalyst 3D. Using a procedure similar to that describe above for the preparation of complex (Ar—N=C(An)—C(An)=N—Ar)Pd(Me)(CH₃CN)]⁺[B(3,5-C₆H₃(CF₃)₂)₄]⁻ (Ar=2-tert-butylphenyl), (COD)PdMeCl (180 mg, 0.679 mmol, 1 equiv), NaBAr'₄ (602 mg, 0.679 mmol, 1 equiv), bis(trifluoromethyl)benzonitrile (237 mg, 0.991 mmol, 1.5 equiv) and N,N'-Bis(2-(tert-butyl)phenyl) acenaphthylene-1,2-diimine (302 mg, 0.679 mmol, 1 equiv) were combined. The product was isolated as an orange-yellow solid (750 mg, 66% yield). ¹H NMR (400 MHz, CD₂Cl₂): δ 8.22 (s, 1H), 8.1 (m, 2H), 7.77-7.69 (m, 2H), 7.52-7.44 (m, 4H), 7.21 (d, J=7.8 Hz, 1H), 7.17 (s, 1H), 7.04 (d, J=7.8 Hz, 2H), 6.81 (d, J=7.3 Hz, 1H), 6.66 (d, J=11.9 Hz, 1H), 6.43 (d, J=7.3 Hz, 1H), 1.53 (s, 9H), 1.40 (s, 9H) 1.33 (s, 3H). ¹³C NMR (100 MHz, CD₂Cl₂) δ 176.1, 169.1, 145.2, 143.9, 140.9, 140.7, 132.9, 132.2, 129.7, 128.2, 127.9, 127.0, 126.4, 126.0, 125.2, 122.9, 36.4, 35.9, 31.9, 31.9, 31.0, 7.5, 2.3 ppm.

(Ar—N=C(An)—C(An)=N—Ar)Pd(Me)(NCAr')]⁺[B(3,5-C₆H₃(CF₃)₂)₄]⁻ (4-methyl-2-(sec-(2,4,6-trimethylphenethyl)phenyl; Ar'=3,5-C₆H₃(CF₃)₂; An=acenaphthene)

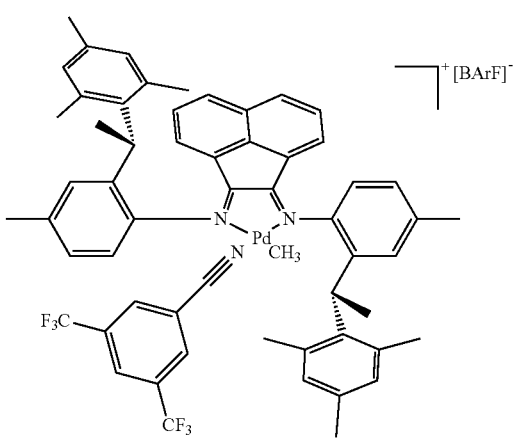

Catalyst 4D. Using the general procedure (Ar—N═C(An)—C(An)═N—Ar)Pd(Me)(Cl) (4-methyl-2-(sec-(2,4,6-trimethylphenethyl)phenyl; An=acenaphthene) (450 mg, 0.556 mmol, 1 equiv), NaBAr'$_4$ (500 mg, 0.564 mmol, 1.0 equiv), bis(trifluoromethyl)benzonitrile (160 mg, 0.669 mmol, 1.2 equiv) and dichloromethane (16 ml) were combined. The product was isolated as a yellow solid (650 mg, 62% yield). $^1$H NMR (400 MHz, CD$_2$Cl$_2$): δ 8.27 (s, 1H), 7.94 (t, J=8.8 Hz, 2H), 7.74 (s, 2H), 7.65 (s, 1H), 7.60 (s, 1H), 7.41 (d, J=8.0 Hz, 2H), 7.35 (d, J=8.0 Hz, 1H), 7.31 (d, J=8.9 Hz, 1H), 7.16 (d, J=8.0 Hz, 1H), 7.04 (d, J=7.8 Hz, 1H), 6.90 (d, J=7.1 Hz, 1H), 6.68-6.58 (1H), 6.15 (d, J=7.3 Hz, 2H), 5.28 (s, 2H), 4.78 (q, J=7.1 Hz, 1H), 4.54 (q, J=7.0 Hz, 1H), 3.13 (s, 3H), 3.11 (s, 3H), 2.55 (s, 3H), 2.47 (s, 3H), 1.60-1.64 (m, 12H), 1.53 (s, 3H), 0.95 (s, 3H), 0.88 (d, J=8.0 Hz, 6H). $^{13}$C NMR (100 MHz, CD$_2$Cl$_2$) δ 176.6, 169.3, 145.7, 142.0, 141.2, 138.2, 137.9, 137.9, 137.5, 135.8, 135.5, 135.3, 134.3, 133.7, 133.5, 133.0, 132.0, 131.3, 130.9, 130.7, 130.6, 130.1, 129.8, 127.7, 125.3, 124.9, 124.3, 121.2, 120.5, 118.9, 111.2, 53.9, 53.7, 53.4, 53.1, 52.9, 36.8, 36.6, 22.8, 22.3, 21.2, 20.7, 19.1, 19.0, 16.3, 16.2, 13.8, 7.0 ppm.

Photopolymerization Reaction Setup

Reactions were carried out in flamed dried 4-dram vials equipped with magnetic stir bars and sealed with rubber septum stoppers. The reaction mixtures were irradiated with Sunnet RGB blue led light ($\lambda_{max}$=460, 3600 lumens, 40 W) purchased from Amazon. All reactions were hung from a glass crystallization dish from the same height and distance from the light source using aluminum wire. A stream of dry air and a temperature probe was used to keep the temperature of the reactor at 25° C. Reactions were covered in aluminum foil to prevent pre-exposure of light prior to reactions.

General Procedure for the Photocontrolled Polymerization Using a-Diimine Pd(II) Catalyst In a typical reaction, a quantitative amount of catalyst was measured out in a glove box to give molar ratios (included in the tables below) with respect to freshly distilled monomer. Once the catalyst was weighed out, it was transferred to a flame dried 4-dram vial which had been purged with nitrogen gas. The vials with the catalysts were then transferred to a glove bag under nitrogen air to conduct the polymerization. Freshly distilled DCM (6 mL) was used to fully dissolve the catalyst, then monomer was added to the reaction mixture and resealed with a rubber septum. All reaction vials were initially wrapped with aluminum foil to prevent pre-exposure to light. The reactions were then removed from the glove bag, and then wrapped with aluminum wire and hung from a glass crystallization dish (Figure S6). Reactions conducted in the light had the aluminum covering removed and were then irradiated under blue LED light ($\lambda_{max}$=~460 nm) for a period of 16 or 24 hours at room temperature. Reactions conducted in the dark had the aluminum covering kept on and were reacted for 16 or 24 hours at room temperature. After reactions were complete, GPC samples were prepared from aliquots of the reaction mixture to measure number-average molecular weight ($M_{n,\ GPC}$) and polydispersities ($M_w/M_n$). $^1$H-NMR samples were prepared to measure monomer conversion.

Polymerization of Methyl Acrylate

Using the general procedure reported above, the homopolymerization of methyl acrylate in the light and in the dark was explored. Table 7 and 8 show the reaction conditions and results for MA polymerization with different catalyst. A typical $^1$H NMR for poly(methyl acrylate) includes the following peaks: $^1$H NMR (400 MHz, CDCl$_3$): δ 3.63 (br s, 3H), 2.27 (br s, 1H), 1.91 (br s, 1H), 1.65 (br s, 1H), 1.46 (br s, 1H).

TABLE 7

Methyl Acrylate (MA) polymerization in light

| Entry | Catalyst | Monomer (mL) | Pd Cat. (mg) | DCM (mL) | [MA]:[Pd]$^a$ | Temp (Celsius) | Time hours | $M_{n,\ th.}^b$ kg/mol | $M_{n,\ GPC}^c$ kg/mol | $M_{w,\ GPC}^c$ kg/mol | Đ ($M_w/M_n$) | α$^d$ (%) | DP |
|---|---|---|---|---|---|---|---|---|---|---|---|---|---|
| 1 | 1a | 2 | 25 | 6 | 1162:1 | 25 | 24 | 100 | 89 | 180 | 2.02 | 59 | 686 |
| 2 | 1b | 2 | 29 | 6 | 1162:1 | 25 | 24 | 100 | 112 | 203 | 1.81 | 64 | 744 |
| 3 | 1c | 2 | 27 | 6 | 1162:1 | 25 | 24 | 100 | 92 | 177 | 1.92 | 47 | 546 |
| 4 | 1d | 2 | 31 | 6 | 1162:1 | 25 | 24 | 100 | 92 | 162 | 1.63 | 63 | 732 |
| 5 | 2a | 2 | 27 | 6 | 1162:1 | 25 | 24 | 100 | 149 | 260 | 1.74 | 78 | 906 |
| 6 | 2b | 2 | 31 | 6 | 1162:1 | 25 | 24 | 100 | 133 | 256 | 1.91 | 69 | 802 |
| 7 | 2c | 2 | 29 | 6 | 1162:1 | 25 | 24 | 100 | 77 | 137 | 1.78 | 66 | 767 |
| 8 | 2d | 2 | 33 | 6 | 1162:1 | 25 | 24 | 100 | 62 | 107 | 1.72 | 63 | 732 |
| 9 | 3a | 2 | 26 | 6 | 1162:1 | 25 | 24 | 100 | 120 | 207 | 1.73 | 72 | 837 |
| 10 | 3b | 2 | 30 | 6 | 1162:1 | 25 | 24 | 100 | 113 | 203 | 1.80 | 77 | 895 |
| 11 | 3c | 2 | 28 | 6 | 1162:1 | 25 | 24 | 100 | 88 | 156 | 1.77 | 65 | 755 |
| 12 | 3d | 2 | 32 | 6 | 1162:1 | 25 | 24 | 100 | 93 | 171 | 1.84 | 71 | 825 |
| 13 | 4c | 2 | 32 | 6 | 1162:1 | 25 | 24 | 100 | 117 | 199 | 1.70 | 66 | 767 |
| 14 | 4d | 2 | 35 | 6 | 1162:1 | 25 | 24 | 100 | 122 | 217 | 1.78 | 62 | 720 |

TABLE 8

Methyl Acrylate (MA) polymerization in dark

| Entry | Catalyst | Monomer (mL) | Pd Cat. (mg) | DCM (mL) | [MA]:[Pd]$^a$ | Temp (Celsius) | Time hours | $M_{n,\ th.}^b$ kg/mol | $M_{n,\ GPC}^c$ kg/mol | $M_{w,\ GPC}^c$ kg/mol | Đ ($M_w/M_n$) | α$^d$ (%) | DP |
|---|---|---|---|---|---|---|---|---|---|---|---|---|---|
| 1 | 1a | 2 | 25 | 6 | 1162:1 | 25 | 24 | 100 | — | — | — | 0 | 0 |
| 2 | 1b | 2 | 29 | 6 | 1162:1 | 25 | 24 | 100 | — | — | — | 0 | 0 |
| 3 | 1c | 2 | 27 | 6 | 1162:1 | 25 | 24 | 100 | — | — | — | 0 | 0 |
| 4 | 1d | 2 | 31 | 6 | 1162:1 | 25 | 24 | 100 | — | — | — | 0 | 0 |

TABLE 8-continued

Methyl Acrylate (MA) polymerization in dark

| Entry | Catalyst | Monomer (mL) | Pd Cat. (mg) | DCM (mL) | [MA]:[Pd]$^a$ | Temp (Celsius) | Time hours | $M_{n, th.}$$^b$ kg/mol | $M_{n, GPC}$$^c$ kg/mol | $M_{w, GPC}$$^c$ kg/mol | Đ ($M_w/M_n$) | $\alpha^d$ (%) | DP |
|---|---|---|---|---|---|---|---|---|---|---|---|---|---|
| 5  | 2a | 2 | 27 | 6 | 1162:1 | 25 | 24 | 100 | — | — | — | 0 | 0 |
| 6  | 2b | 2 | 31 | 6 | 1162:1 | 25 | 24 | 100 | — | — | — | 0 | 0 |
| 7  | 2c | 2 | 29 | 6 | 1162:1 | 25 | 24 | 100 | — | — | — | 0 | 0 |
| 8  | 2d | 2 | 33 | 6 | 1162:1 | 25 | 24 | 100 | — | — | — | 0 | 0 |
| 9  | 3a | 2 | 26 | 6 | 1162:1 | 25 | 24 | 100 | — | — | — | 0 | 0 |
| 10 | 3b | 2 | 30 | 6 | 1162:1 | 25 | 24 | 100 | — | — | — | 0 | 0 |
| 11 | 3c | 2 | 28 | 6 | 1162:1 | 25 | 24 | 100 | — | — | — | 0 | 0 |
| 12 | 3d | 2 | 32 | 6 | 1162:1 | 25 | 24 | 100 | — | — | — | 0 | 0 |
| 13 | 4c | 2 | 32 | 6 | 1162:1 | 25 | 24 | 100 | — | — | — | 0 | 0 |
| 14 | 4d | 2 | 35 | 6 | 1162:1 | 25 | 24 | 100 | — | — | — | 0 | 0 |

Copolymerization of Methyl Acrylate and 2-Hydroxyethyl Acrylate

Using the above general procedure, the copolymerization of methyl acrylate with 2-hydroxyethyl acrylate (HEA) in the light and in the dark, was explored. Table 9 and 10 show the reaction conditions and results for MA-HEA polymerization with different Pd(II) catalyst. A typical $^1$H NMR for poly(MA-co-HEA) includes the following peaks: $^1$H NMR (400 MHz, CDCl$_3$): δ 3.63 (br s, 3H), 2.27 (br s, 1H), 1.91 (br s, 1H), 1.65 (br s, 1H), 1.46 (br s, 1H).

TABLE 9

Methyl Acrylate (MA) and 2-hydroxy ethyl acrylate copolymerization in light

| Entry | Catalyst | Monomer (mL) HEA | Monomer (mL) MA | Pd Cat. (mg) | DCM (mL) | [MA]:[Pd]$^a$ | Temp (Celsius) | Time hours | $M_{n, th.}$$^b$ kg/mol | $M_{n, GPC}$$^c$ kg/mol | $M_{w, GPC}$$^c$ kg/mol | Đ ($M_w/M_n$) | $\alpha^d$ (%) HEA | $\alpha^d$ (%) MA | DP |
|---|---|---|---|---|---|---|---|---|---|---|---|---|---|---|---|
| 1  | 1a | 0.5 | 1.6 | 25 | 6 | 1175:1 | 25 | 16 | 100 | 34  | 64  | 1.90 | 35 | 7  | 136 |
| 2  | 1b | 0.5 | 1.6 | 29 | 6 | 1175:1 | 25 | 16 | 100 | 125 | 267 | 2.13 | 43 | 12 | 214 |
| 3  | 1c | 0.5 | 1.6 | 27 | 6 | 1175:1 | 25 | 16 | 100 | 146 | 262 | 1.80 | 36 | 1  | 85  |
| 4  | 1d | 0.5 | 1.6 | 31 | 6 | 1175:1 | 25 | 16 | 100 | 30  | 74  | 2.46 | 14 | 7  | 99  |
| 5  | 2a | 0.5 | 1.6 | 27 | 6 | 1175:1 | 25 | 16 | 100 | 118 | 236 | 2.00 | 94 | 78 | 959 |
| 6  | 2b | 0.5 | 1.6 | 31 | 6 | 1175:1 | 25 | 16 | 100 | 340 | 671 | 1.97 | 92 | 73 | 902 |
| 7  | 2c | 0.5 | 1.6 | 29 | 6 | 1175:1 | 25 | 16 | 100 | 150 | 316 | 2.11 | 81 | 61 | 764 |
| 8  | 2d | 0.5 | 1.6 | 33 | 6 | 1175:1 | 25 | 16 | 100 | 203 | 402 | 1.98 | 65 | 37 | 500 |
| 9  | 3a | 0.5 | 1.6 | 26 | 6 | 1175:1 | 25 | 16 | 100 | 239 | 485 | 2.03 | 80 | 59 | 742 |
| 10 | 3b | 0.5 | 1.6 | 30 | 6 | 1175:1 | 25 | 16 | 100 | 190 | 355 | 1.87 | 74 | 56 | 700 |
| 11 | 3c | 0.5 | 1.6 | 28 | 6 | 1175:1 | 25 | 16 | 100 | 168 | 295 | 1.75 | 70 | 43 | 569 |
| 12 | 3d | 0.5 | 1.6 | 32 | 6 | 1175:1 | 25 | 16 | 100 | 370 | 653 | 1.76 | 37 | 9  | 171 |
| 13 | 4c | 0.5 | 1.6 | 32 | 6 | 1175:1 | 25 | 16 | 100 | 290 | 640 | 2.20 | 94 | 66 | 841 |
| 14 | 4d | 0.5 | 1.6 | 35 | 6 | 1175:1 | 25 | 16 | 100 | 323 | 719 | 2.22 | 84 | 61 | 770 |

TABLE 10

Methyl Acrylate (MA) and 2-hydroxy ethyl acrylate copolymerization in dark

| Entry | Catalyst | Monomer (mL) HEA | Monomer (mL) MA | Pd Cat. (mg) | DCM (mL) | [MA]:[Pd]$^a$ | Temp (Celsius) | Time hours | $M_{n, th.}$$^b$ kg/mol | $M_{n, GPC}$$^c$ kg/mol | $M_{w, GPC}$$^c$ kg/mol | Đ ($M_w/M_n$) | $\alpha^d$ (%) HEA | $\alpha^d$ (%) MA | DP |
|---|---|---|---|---|---|---|---|---|---|---|---|---|---|---|---|
| 1  | 1a | 0.5 | 1.6 | 25 | 6 | 1175:1 | 25 | 16 | 100 | — | — | — | 0 | 0 | 0 |
| 2  | 1b | 0.5 | 1.6 | 29 | 6 | 1175:1 | 25 | 16 | 100 | — | — | — | 0 | 0 | 0 |
| 3  | 1c | 0.5 | 1.6 | 27 | 6 | 1175:1 | 25 | 16 | 100 | — | — | — | 0 | 0 | 0 |
| 4  | 1d | 0.5 | 1.6 | 31 | 6 | 1175:1 | 25 | 16 | 100 | — | — | — | 0 | 0 | 0 |
| 5  | 2a | 0.5 | 1.6 | 27 | 6 | 1175:1 | 25 | 16 | 100 | — | — | — | 0 | 0 | 0 |
| 6  | 2b | 0.5 | 1.6 | 31 | 6 | 1175:1 | 25 | 16 | 100 | — | — | — | 0 | 0 | 0 |
| 7  | 2c | 0.5 | 1.6 | 29 | 6 | 1175:1 | 25 | 16 | 100 | — | — | — | 0 | 0 | 0 |
| 8  | 2d | 0.5 | 1.6 | 33 | 6 | 1175:1 | 25 | 16 | 100 | — | — | — | 0 | 0 | 0 |
| 9  | 3a | 0.5 | 1.6 | 26 | 6 | 1175:1 | 25 | 16 | 100 | — | — | — | 0 | 0 | 0 |
| 10 | 3b | 0.5 | 1.6 | 30 | 6 | 1175:1 | 25 | 16 | 100 | — | — | — | 0 | 0 | 0 |
| 11 | 3c | 0.5 | 1.6 | 28 | 6 | 1175:1 | 25 | 16 | 100 | — | — | — | 0 | 0 | 0 |
| 12 | 3d | 0.5 | 1.6 | 32 | 6 | 1175:1 | 25 | 16 | 100 | — | — | — | 0 | 0 | 0 |

TABLE 10-continued

Methyl Acrylate (MA) and 2-hydroxy ethyl acrylate copolymerization in dark

| Entry | Catalyst | Monomer (mL) HEA | Monomer (mL) MA | Pd Cat. (mg) | DCM (mL) | [MA]:[Pd]$^a$ | Temp (Celsius) | Time hours | $M_{n, th.}^{b}$ kg/mol | $M_{n, GPC}^{c}$ kg/mol | $M_{w, GPC}^{c}$ kg/mol | Đ ($M_w/M_n$) | $\alpha^d$ (%) HEA | $\alpha^d$ (%) MA | DP |
|---|---|---|---|---|---|---|---|---|---|---|---|---|---|---|---|
| 13 | 4c | 0.5 | 1.6 | 32 | 6 | 1175:1 | 25 | 16 | 100 | — | — | — | 0 | 0 | 0 |
| 14 | 4d | 0.5 | 1.6 | 35 | 6 | 1175:1 | 25 | 16 | 100 | — | — | — | 0 | 0 | 0 |

$^a$Experimental conditions: solvent, dichloromethane (DCM); light source, blue LED light ($\lambda_{max}$ = 460 nm).
$^b$Theoretical molecular weight was calculated based on 100% conversion of monomer from the following equation: $M_{n, th} = [M]_0/[Pd] \times MW^M$, where $[M]_0$, [Pd], and $MW^M$ correspond to initial monomer concentration, initial Pd catalyst concentration, and molar mass of the monomer respectively.
$^c$Molecular weight and polydispersity index were determined by GPC analysis with samples run in THF at 40° C. calibrated to poly (methyl methacrylate) standards.
$^d$Monomer conversion was determined by using $^1$H NMR spectroscopy.

Polymerization of Tert-Butyl Acrylate

Using the above general procedure, the homopolymerization of tert-butyl acrylate (tBA) in the light and in the dark was explored. Tables 11 and 12 show the reaction conditions and results for tBA polymerization with different catalyst. A typical $^1$H NMR for poly(tBA) includes the following peaks: $^1$H NMR (400 MHz, CDCl$_3$): δ 2.30-2.10 (br s, 1H), 1.60-1.20 (br m, 11H).

TABLE 11 tert-Butyl Acrylate (tBA) polymerization in light

| Entry | Catalyst | Monomer (mL) | Pd Cat. (mg) | DCM (mL) | [MA]:[Pd]$^a$ | Temp (Celsius) | Time hours | $M_{n, th.}^{b}$ kg/mol | $M_{n, GPC}^{c}$ kg/mol | $M_{w, GPC}^{c}$ kg/mol | Đ ($M_w/M_n$) | $\alpha^d$ (%) | DP |
|---|---|---|---|---|---|---|---|---|---|---|---|---|---|
| 1 | 1a | 2 | 23 | 6 | 780:1 | 25 | 16 | 100 | 44 | 182 | 4.16 | 26 | 203 |
| 2 | 1b | 2 | 27 | 6 | 780:1 | 25 | 16 | 100 | 89 | 518 | 5.83 | 14 | 109 |
| 3 | 1c | 2 | 25 | 6 | 780:1 | 25 | 16 | 100 | 90 | 270 | 2.98 | 30 | 234 |
| 4 | 1d | 2 | 28 | 6 | 780:1 | 25 | 16 | 100 | 158 | 372 | 2.36 | 20 | 156 |
| 5 | 2a | 2 | 25 | 6 | 780:1 | 25 | 16 | 100 | 332 | 746 | 2.25 | 86 | 671 |
| 6 | 2b | 2 | 29 | 6 | 780:1 | 25 | 16 | 100 | 1224 | 2179 | 1.78 | 63 | 492 |
| 7 | 2c | 2 | 27 | 6 | 780:1 | 25 | 16 | 100 | 138 | 297 | 2.16 | 49 | 382 |
| 8 | 2d | 2 | 30 | 6 | 780:1 | 25 | 16 | 100 | 295 | 566 | 1.92 | 29 | 226 |
| 9 | 3a | 2 | 24 | 6 | 780:1 | 25 | 16 | 100 | 206 | 437 | 2.12 | 73 | 570 |
| 10 | 3b | 2 | 28 | 6 | 780:1 | 25 | 16 | 100 | 636 | 1333 | 2.10 | 60 | 468 |
| 11 | 3c | 2 | 26 | 6 | 780:1 | 25 | 16 | 100 | 151 | 314 | 2.08 | 69 | 538 |
| 12 | 3d | 2 | 29 | 6 | 780:1 | 25 | 16 | 100 | 169 | 395 | 2.34 | 24 | 187 |
| 13 | 4c | 2 | 30 | 6 | 780:1 | 25 | 16 | 100 | 132 | 439 | 3.33 | 78 | 609 |
| 14 | 4d | 2 | 33 | 6 | 780:1 | 25 | 16 | 100 | 465 | 889 | 1.91 | 75 | 585 |

TABLE 12 tert-Butyl Acrylate (tBA) polymerization in dark

| Entry | Catalyst | Monomer (mL) | Pd Cat. (mg) | DCM (mL) | [MA]:[Pd]$^a$ | Temp (Celsius) | Time hours | $M_{n, th.}^{b}$ kg/mol | $M_{n, GPC}^{c}$ kg/mol | $M_{w, GPC}^{c}$ kg/mol | Đ ($M_w/M_n$) | $\alpha^d$ (%) | DP |
|---|---|---|---|---|---|---|---|---|---|---|---|---|---|
| 1 | 1a | 2 | 23 | 6 | 780:1 | 25 | 16 | 100 | — | — | — | 0 | 0 |
| 2 | 1b | 2 | 27 | 6 | 780:1 | 25 | 16 | 100 | — | — | — | 0 | 0 |
| 3 | 1c | 2 | 25 | 6 | 780:1 | 25 | 16 | 100 | — | — | — | 0 | 0 |
| 4 | 1d | 2 | 28 | 6 | 780:1 | 25 | 16 | 100 | — | — | — | 0 | 0 |
| 5 | 2a | 2 | 25 | 6 | 780:1 | 25 | 16 | 100 | — | — | — | 0 | 0 |
| 6 | 2b | 2 | 29 | 6 | 780:1 | 25 | 16 | 100 | — | — | — | 0 | 0 |
| 7 | 2c | 2 | 27 | 6 | 780:1 | 25 | 16 | 100 | — | — | — | 0 | 0 |
| 8 | 2d | 2 | 30 | 6 | 780:1 | 25 | 16 | 100 | — | — | — | 0 | 0 |
| 9 | 3a | 2 | 24 | 6 | 780:1 | 25 | 16 | 100 | — | — | — | 0 | 0 |
| 10 | 3b | 2 | 28 | 6 | 780:1 | 25 | 16 | 100 | — | — | — | 0 | 0 |
| 11 | 3c | 2 | 26 | 6 | 780:1 | 25 | 16 | 100 | — | — | — | 0 | 0 |
| 12 | 3d | 2 | 29 | 6 | 780:1 | 25 | 16 | 100 | — | — | — | 0 | 0 |
| 13 | 4c | 2 | 30 | 6 | 780:1 | 25 | 16 | 100 | — | — | — | 0 | 0 |
| 14 | 4d | 2 | 33 | 6 | 780:1 | 25 | 16 | 100 | — | — | — | 0 | 0 |

Polymerization of n-Butyl Acrylate

Using the above general procedure, the homopolymerization of n-butyl acrylate (tBA) in the light and in the dark was explored.

Tables 13 and 14 show the reaction conditions and results for nBA polymerization with different catalyst. A typical $^1$H NMR for poly(nBA) includes the following peaks: $^1$H NMR (400 MHz, CDCl$_3$): δ 4.10-3.90 (m, 1H), 2.30-2.20 (br s, 1H), 2.00-1.80 (br s, 1H), 1.70-1.50 (m, 3H), 1.45-1.30 (m, 3H), 1.00-0.85 (q, 3H).

TABLE 13 n-Butyl acrylate (nBA) polymerization in light

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $α^d$ (%) | DP |
|---|---|---|---|---|---|---|---|---|---|---|---|---|---|
| 1 | 1a | 2 | 24 | 6 | 780:1 | 25 | 16 | 100 | 222 | 387 | 1.74 | 37 | 288 |
| 2 | 1b | 2 | 27 | 6 | 780:1 | 25 | 16 | 100 | 197 | 360 | 1.82 | 21 | 163 |
| 3 | 1c | 2 | 25 | 6 | 780:1 | 25 | 16 | 100 | 261 | 464 | 1.77 | 43 | 335 |
| 4 | 1d | 2 | 29 | 6 | 780:1 | 25 | 16 | 100 | 368 | 611 | 1.66 | 18 | 140 |
| 5 | 2a | 2 | 26 | 6 | 780:1 | 25 | 16 | 100 | 359 | 608 | 1.69 | 47 | 366 |
| 6 | 2b | 2 | 29 | 6 | 780:1 | 25 | 16 | 100 | 279 | 525 | 1.88 | 61 | 468 |
| 7 | 2c | 2 | 27 | 6 | 780:1 | 25 | 16 | 100 | 251 | 443 | 1.76 | 43 | 335 |
| 8 | 2d | 2 | 31 | 6 | 780:1 | 25 | 16 | 100 | 468 | 753 | 1.61 | 24 | 187 |
| 9 | 3a | 2 | 25 | 6 | 780:1 | 25 | 16 | 100 | 120 | 198 | 1.65 | 63 | 491 |
| 10 | 3b | 2 | 28 | 6 | 780:1 | 25 | 16 | 100 | 355 | 571 | 1.61 | 49 | 382 |
| 11 | 3c | 2 | 26 | 6 | 780:1 | 25 | 16 | 100 | 273 | 464 | 1.70 | 56 | 436 |
| 12 | 3d | 2 | 30 | 6 | 780:1 | 25 | 16 | 100 | 365 | 570 | 1.56 | 9 | 70 |
| 13 | 4c | 2 | 30 | 6 | 780:1 | 25 | 16 | 100 | 211 | 422 | 1.99 | 64 | 499 |
| 14 | 4d | 2 | 33 | 6 | 780:1 | 25 | 16 | 100 | 404 | 602 | 1.49 | 56 | 437 |

TABLE 14 n-Butyl acrylate (nBA) Polymerization in dark

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $α^d$ (%) | DP |
|---|---|---|---|---|---|---|---|---|---|---|---|---|---|
| 1 | 1a | 2 | 24 | 6 | 780:1 | 25 | 16 | 100 | — | — | — | 0 | 0 |
| 2 | 1b | 2 | 27 | 6 | 780:1 | 25 | 16 | 100 | — | — | — | 0 | 0 |
| 3 | 1c | 2 | 25 | 6 | 780:1 | 25 | 16 | 100 | — | — | — | 0 | 0 |
| 4 | 1d | 2 | 29 | 6 | 780:1 | 25 | 16 | 100 | — | — | — | 0 | 0 |
| 5 | 2a | 2 | 26 | 6 | 780:1 | 25 | 16 | 100 | — | — | — | 0 | 0 |
| 6 | 2b | 2 | 29 | 6 | 780:1 | 25 | 16 | 100 | — | — | — | 0 | 0 |
| 7 | 2c | 2 | 27 | 6 | 780:1 | 25 | 16 | 100 | — | — | — | 0 | 0 |
| 8 | 2d | 2 | 31 | 6 | 780:1 | 25 | 16 | 100 | — | — | — | 0 | 0 |
| 9 | 3a | 2 | 25 | 6 | 780:1 | 25 | 16 | 100 | — | — | — | 0 | 0 |
| 10 | 3b | 2 | 28 | 6 | 780:1 | 25 | 16 | 100 | — | — | — | 0 | 0 |
| 11 | 3c | 2 | 26 | 6 | 780:1 | 25 | 16 | 100 | — | — | — | 0 | 0 |
| 12 | 3d | 2 | 30 | 6 | 780:1 | 25 | 16 | 100 | — | — | — | 0 | 0 |
| 13 | 4c | 2 | 30 | 6 | 780:1 | 25 | 16 | 100 | — | — | — | 0 | 0 |
| 14 | 4d | 2 | 33 | 6 | 780:1 | 25 | 16 | 100 | — | — | — | 0 | 0 |

$^a$Experimental conditions: solvent, dichloromethane (DCM); light source, blue LED light ($λ_{max}$ = 460 nm).

$^b$Theoretical molecular weight was calculated based on 100% conversion of monomer from the following equation: Mn, th = [M]$_0$/[Pd] × MW$^M$, where [M]$_0$, [Pd], and MW$^M$ correspond to initial monomer concentration, initial Pd catalyst concentration, and molar mass of the monomer respectively.

$^c$Molecular weight and polydispersity index were determined by GPC analysis with samples run in THF at 40° C. calibrated to poly(methyl methacrylate) standards.

$^d$Monomer conversion was determined by using $^1$H NMR spectroscopy.

Polymerization of Methyl Methacrylate

Using the above general procedure, the homopolymerization of methyl methacrylate (MMA) in the light and in the dark was explored. Tables 15 and 16 show the reaction conditions and results for MMA polymerization with different catalyst.

A typical $^1$H NMR for poly(MMA) includes the following peaks: $^1$H NMR (400 MHz, CDCl$_3$): δ 3.63 (br s, 3H), 2.27 (br s, 1H), 1.91 (br s, 1H), 1.65 (br s, 1H), 1.46 (br s, 1H).

TABLE 15

Methyl methacrylate (MMA) polymerization in light

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | α$^d$ (%) | DP |
|---|---|---|---|---|---|---|---|---|---|---|---|---|---|
| 1 | 1a | 2 | 25 | 6 | 999:1 | 25 | 24 | 100 | 47 | 87 | 1.87 | 19 | 190 |
| 2 | 1b | 2 | 29 | 6 | 999:1 | 25 | 24 | 100 | 99 | 191 | 1.93 | 19 | 190 |
| 3 | 1c | 2 | 27 | 6 | 999:1 | 25 | 24 | 100 | 82 | 144 | 1.76 | 25 | 250 |
| 4 | 1d | 2 | 30 | 6 | 999:1 | 25 | 24 | 100 | 75 | 131 | 1.75 | 19 | 190 |
| 5 | 2a | 2 | 27 | 6 | 999:1 | 25 | 24 | 100 | 87 | 151 | 1.74 | 27 | 270 |
| 6 | 2b | 2 | 30 | 6 | 999:1 | 25 | 24 | 100 | 96 | 177 | 1.84 | 23 | 230 |
| 7 | 2c | 2 | 29 | 6 | 999:1 | 25 | 24 | 100 | 35 | 67 | 1.90 | 32 | 320 |
| 8 | 2d | 2 | 32 | 6 | 999:1 | 25 | 24 | 100 | 44 | 78 | 1.77 | 20 | 200 |
| 9 | 3a | 2 | 26 | 6 | 999:1 | 25 | 24 | 100 | 73 | 125 | 1.71 | 19 | 190 |
| 10 | 3b | 2 | 29 | 6 | 999:1 | 25 | 24 | 100 | 89 | 160 | 1.80 | 22 | 220 |
| 11 | 3c | 2 | 28 | 6 | 999:1 | 25 | 24 | 100 | 68 | 134 | 1.97 | 19 | 190 |
| 12 | 3d | 2 | 31 | 6 | 999:1 | 25 | 24 | 100 | 74 | 142 | 1.92 | 21 | 210 |
| 13 | 4c | 2 | 31 | 6 | 999:1 | 25 | 24 | 100 | 35 | 63 | 1.80 | 26 | 260 |
| 14 | 4d | 2 | 34 | 6 | 999:1 | 25 | 24 | 100 | 70 | 127 | 1.81 | 24 | 240 |

TABLE 16

Methyl methacrylate (MMA) polymerization in dark

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | α$^d$ (%) | DP |
|---|---|---|---|---|---|---|---|---|---|---|---|---|---|
| 1 | 1a | 2 | 25 | 6 | 999:1 | 25 | 24 | 100 | — | — | — | 0 | 0 |
| 2 | 1b | 2 | 29 | 6 | 999:1 | 25 | 24 | 100 | — | — | — | 0 | 0 |
| 3 | 1c | 2 | 27 | 6 | 999:1 | 25 | 24 | 100 | — | — | — | 0 | 0 |
| 4 | 1d | 2 | 30 | 6 | 999:1 | 25 | 24 | 100 | — | — | — | 0 | 0 |
| 5 | 2a | 2 | 27 | 6 | 999:1 | 25 | 24 | 100 | — | — | — | 0 | 0 |
| 6 | 2b | 2 | 30 | 6 | 999:1 | 25 | 24 | 100 | — | — | — | 0 | 0 |
| 7 | 2c | 2 | 29 | 6 | 999:1 | 25 | 24 | 100 | — | — | — | 0 | 0 |
| 8 | 2d | 2 | 32 | 6 | 999:1 | 25 | 24 | 100 | — | — | — | 0 | 0 |
| 9 | 3a | 2 | 26 | 6 | 999:1 | 25 | 24 | 100 | — | — | — | 0 | 0 |
| 10 | 3b | 2 | 29 | 6 | 999:1 | 25 | 24 | 100 | — | — | — | 0 | 0 |
| 11 | 3c | 2 | 28 | 6 | 999:1 | 25 | 24 | 100 | — | — | — | 0 | 0 |
| 12 | 3d | 2 | 31 | 6 | 999:1 | 25 | 24 | 100 | — | — | — | 0 | 0 |
| 13 | 4c | 2 | 31 | 6 | 999:1 | 25 | 24 | 100 | — | — | — | 0 | 0 |
| 14 | 4d | 2 | 34 | 6 | 999:1 | 25 | 24 | 100 | — | — | — | 0 | 0 |

Polymerization of Glycidyl Methacrylate

Using the above general procedure, the homopolymerization of glycidyl methacrylate (GMA) in the light and in the dark was explored. Tables 17 and 18 show the reaction conditions and results for GMA polymerization with different catalyst. A typical $^1$H NMR for poly(GMA) includes the following peaks: $^1$H NMR (400 MHz, CDCl$_3$): δ 4.36-4.19 (br s, 1H), 3.86-3.67 (br s, 1H), 3.23 (s, 1H), 2.84 (s, 1H), 2.63 (s, 1H), 1.80-2.00 (m, 2H), 0.70-1.20 (m, 3H).

TABLE 17

Glycidyl Methacrylate Polymerization in light

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $\alpha^d$ (%) | DP |
|---|---|---|---|---|---|---|---|---|---|---|---|---|---|
| 1 | 1a | 2 | 28 | 6 | 704:1 | 25 | 24 | 100 | 66 | 116 | 1.74 | 57 | 401 |
| 2 | 1b | 2 | 32 | 6 | 704:1 | 25 | 24 | 100 | 184 | 311 | 1.68 | 34 | 239 |
| 3 | 1c | 2 | 30 | 6 | 704:1 | 25 | 24 | 100 | 77 | 152 | 1.97 | 57 | 401 |
| 4 | 1d | 2 | 34 | 6 | 704:1 | 25 | 24 | 100 | 159 | 294 | 1.85 | 30 | 211 |
| 5 | 2a | 2 | 30 | 6 | 704:1 | 25 | 24 | 100 | 35 | 63 | 1.83$^e$ | 81 | 570 |
| 6 | 2b | 2 | 34 | 6 | 704:1 | 25 | 24 | 100 | 106 | 326 | 3.07$^e$ | 16 | 113 |
| 7 | 2c | 2 | 32 | 6 | 704:1 | 25 | 24 | 100 | 79(4) | 143(5) | 1.82(1.15)$^f$ | 55 | 387 |
| 8 | 2d | 2 | 36 | 6 | 704:1 | 25 | 24 | 100 | 142(3) | 227(6) | 1.60(1.73)$^f$ | 61 | 429 |
| 9 | 3a | 2 | 29 | 6 | 704:1 | 25 | 24 | 100 | 46 | 85 | 1.84 | 67 | 472 |
| 10 | 3b | 2 | 33 | 6 | 704:1 | 25 | 24 | 100 | 95 | 172 | 1.81 | 43 | 303 |
| 11 | 3c | 2 | 31 | 6 | 704:1 | 25 | 24 | 100 | 77 | 149 | 1.93 | 58 | 408 |
| 12 | 3d | 2 | 35 | 6 | 704:1 | 25 | 24 | 100 | 94 | 179 | 1.91 | 15 | 106 |
| 13 | 4c | 2 | 35 | 6 | 704:1 | 25 | 24 | 100 | 38 | 58 | 1.52 | 74 | 521 |
| 14 | 4d | 2 | 40 | 6 | 704:1 | 25 | 24 | 100 | 128 | 226 | 1.77 | 42 | 296 |

TABLE 18

Glycidyl Methacrylate Polymerization in dark

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $\alpha^d$ (%) | DP |
|---|---|---|---|---|---|---|---|---|---|---|---|---|---|
| 1 | 1a | 2 | 28 | 6 | 704:1 | 25 | 24 | 100 | — | — | — | 0 | 0 |
| 2 | 1b | 2 | 32 | 6 | 704:1 | 25 | 24 | 100 | — | — | — | 0 | 0 |
| 3 | 1c | 2 | 30 | 6 | 704:1 | 25 | 24 | 100 | — | — | — | 0 | 0 |
| 4 | 1d | 2 | 34 | 6 | 704:1 | 25 | 24 | 100 | — | — | — | 0 | 0 |
| 5 | 2a | 2 | 30 | 6 | 704:1 | 25 | 24 | 100 | — | — | — | 0 | 0 |
| 6 | 2b | 2 | 34 | 6 | 704:1 | 25 | 24 | 100 | — | — | — | 0 | 0 |
| 7 | 2c | 2 | 32 | 6 | 704:1 | 25 | 24 | 100 | — | — | — | 0 | 0 |
| 8 | 2d | 2 | 36 | 6 | 704:1 | 25 | 24 | 100 | — | — | — | 0 | 0 |
| 9 | 3a | 2 | 29 | 6 | 704:1 | 25 | 24 | 100 | — | — | — | 0 | 0 |
| 10 | 3b | 2 | 33 | 6 | 704:1 | 25 | 24 | 100 | — | — | — | 0 | 0 |
| 11 | 3c | 2 | 31 | 6 | 704:1 | 25 | 24 | 100 | — | — | — | 0 | 0 |
| 12 | 3d | 2 | 35 | 6 | 704:1 | 25 | 24 | 100 | — | — | — | 0 | 0 |
| 13 | 4c | 2 | 35 | 6 | 704:1 | 25 | 24 | 100 | — | — | — | 0 | 0 |
| 14 | 4d | 2 | 40 | 6 | 704:1 | 25 | 24 | 100 | — | — | — | 0 | 0 |

$^a$Experimental conditions: solvent, dichloromethane (DCM); light source, blue LED light ($\lambda_{max}$ = 460 nm).

$^b$Theoretical molecular weight was calculated based on 100% conversion of monomer from the following equation: $M_{n, th}$ = [M]$_0$/[Pd] × MW$^M$, where [M]$_0$, [Pd], and MW$^M$ correspond to initial monomer concentration, initial Pd catalyst concentration, and molar mass of the monomer respectively.

$^c$Molecular weight and polydispersity index were determined by GPC analysis with samples run in THF at 40° C. calibrated to poly(methyl methacrylate) standards.

$^d$Monomer conversion was determined by using $^1$H NMR spectroscopy.

$^e$Appearance of a bimodal GPC trace.

$^f$Appearance of two separate GPC traces.

Polymerization of Dimethyl Acrylamide

Using the above general procedure, the homopolymerization of dimethyl acrylamide (DMAA) in the light and in the dark was explored. Tables 19 and 20 show the reaction conditions and results for DMAA polymerization with different catalyst. A typical $^1$H NMR for poly(DMAA) includes the following peaks: $^1$H NMR (400 MHz, CDCl$_3$, ppm): δ 3.08 (s, 3H), 3.00 (s, 3H), 2.47 (bs, 1H), 1.70 (bs, 1H), 1.27 (bs, 1H).

TABLE 19

Dimethyl Acrylamide (DMAA) Polymerization in light

| Entry | Catalyst | Monomer (mL) | Pd Cat. (mg) | DCM (mL) | [MA]:[Pd]$^a$ | Temp (Celsius) | Time hours | $M_{n, th.}$[b] kg/mol | $M_{n, GPC}$[c] kg/mol | $M_{w, GPC}$[c] kg/mol | Đ ($M_w/M_n$) | α[d] (%) | DP |
|---|---|---|---|---|---|---|---|---|---|---|---|---|---|
| 1 | 1a | 2 | 25 | 6 | 1009:1 | 25 | 24 | 100 | 251 | 414 | 1.65 | 29 | 293 |
| 2 | 1b | 2 | 29 | 6 | 1009:1 | 25 | 24 | 100 | 258 | 435 | 1.68 | 32 | 323 |
| 3 | 1c | 2 | 27 | 6 | 1009:1 | 25 | 24 | 100 | 0 | 0 | 0 | 0 | 0 |
| 4 | 1d | 2 | 31 | 6 | 1009:1 | 25 | 24 | 100 | 0 | 0 | 0 | 0 | 0 |
| 5 | 2a | 2 | 28 | 6 | 1009:1 | 25 | 24 | 100 | 497 | 1,041 | 2.10 | 44 | 444 |
| 6 | 2b | 2 | 31 | 6 | 1009:1 | 25 | 24 | 100 | 593 | 1,228 | 2.07 | 33 | 333 |
| 7 | 2c | 2 | 29 | 6 | 1009:1 | 25 | 24 | 100 | 0 | 0 | 0 | 0 | 0 |
| 8 | 2d | 2 | 33 | 6 | 1009:1 | 25 | 24 | 100 | 0 | 0 | 0 | 0 | 0 |
| 9 | 3a | 2 | 27 | 6 | 1009:1 | 25 | 24 | 100 | 512 | 1,035 | 2.02 | 8 | 81 |
| 10 | 3b | 2 | 30 | 6 | 1009:1 | 25 | 24 | 100 | 668 | 1,346 | 2.02 | 12 | 121 |
| 11 | 3c | 2 | 28 | 6 | 1009:1 | 25 | 24 | 100 | 254 | 457 | 1.80 | 72 | 726 |
| 12 | 3d | 2 | 32 | 6 | 1009:1 | 25 | 24 | 100 | 328 | 584 | 1.78 | 5 | 50 |
| 13 | 4c | 2 | 32 | 6 | 1009:1 | 25 | 24 | 100 | 581 | 1154 | 1.99 | 73 | 737 |
| 14 | 4d | 2 | 36 | 6 | 1009:1 | 25 | 24 | 100 | 557 | 1,241 | 2.23 | 56 | 565 |

TABLE 20

Dimethyl Acrylamide (DMAA) Polymerization in dark

| Entry | Catalyst | Monomer (mL) | Pd Cat. (mg) | DCM (mL) | [MA]:[Pd]$^a$ | Temp (Celsius) | Time hours | $M_{n, th.}$[b] kg/mol | $M_{n, GPC}$[c] kg/mol | $M_{w, GPC}$[c] kg/mol | Đ ($M_w/M_n$) | α[d] (%) | DP |
|---|---|---|---|---|---|---|---|---|---|---|---|---|---|
| 1 | 1a | 2 | 25 | 6 | 1009:1 | 25 | 24 | 100 | 0 | 0 | 0 | 0 | 0 |
| 2 | 1b | 2 | 29 | 6 | 1009:1 | 25 | 24 | 100 | 0 | 0 | 0 | 0 | 0 |
| 3 | 1c | 2 | 27 | 6 | 1009:1 | 25 | 24 | 100 | 0 | 0 | 0 | 0 | 0 |
| 4 | 1d | 2 | 31 | 6 | 1009:1 | 25 | 24 | 100 | 0 | 0 | 0 | 0 | 0 |
| 5 | 2a | 2 | 28 | 6 | 1009:1 | 25 | 24 | 100 | 0 | 0 | 0 | 0 | 0 |
| 6 | 2b | 2 | 31 | 6 | 1009:1 | 25 | 24 | 100 | 0 | 0 | 0 | 0 | 0 |
| 7 | 2c | 2 | 29 | 6 | 1009:1 | 25 | 24 | 100 | 0 | 0 | 0 | 0 | 0 |
| 8 | 2d | 2 | 33 | 6 | 1009:1 | 25 | 24 | 100 | 0 | 0 | 0 | 0 | 0 |
| 9 | 3a | 2 | 27 | 6 | 1009:1 | 25 | 24 | 100 | 0 | 0 | 0 | 0 | 0 |
| 10 | 3b | 2 | 30 | 6 | 1009:1 | 25 | 24 | 100 | 0 | 0 | 0 | 0 | 0 |
| 11 | 3c | 2 | 28 | 6 | 1009:1 | 25 | 24 | 100 | 0 | 0 | 0 | 0 | 0 |
| 12 | 3d | 2 | 32 | 6 | 1009:1 | 25 | 24 | 100 | 0 | 0 | 0 | 0 | 0 |
| 13 | 4c | 2 | 32 | 6 | 1009:1 | 25 | 24 | 100 | 0 | 0 | 0 | 0 | 0 |
| 14 | 4d | 2 | 36 | 6 | 1009:1 | 25 | 24 | 100 | 0 | 0 | 0 | 0 | 0 |

Polymerization of N-Isopropyl Acrylamide

Using the above general procedure, the homopolymerization of n-isopropyl acrylamide (NIPAm) in the light and in the dark was explored. Tables 21 and 22 show the reaction conditions and results for NIPAm polymerization with different catalyst. A typical $^1$H NMR for poly(NIPAm) includes the following peaks: $^1$H NMR (400 MHz, CD$_3$OD, ppm): δ 7.63 (bs, 1H), 3.96 (bs, 1H), 2.08 (bs, 1H), 1.58 (bs, 2H), 1.15 (s, 6H).

TABLE 21

N-isopropylacrylamide (NIPAm) Polymerization in light

| Entry | Catalyst | Monomer (mL) | Pd Cat. (mg) | DCM (mL) | [MA]:[Pd]$^a$ | Temp (Celsius) | Time hours | $M_{n, th.}$[b] kg/mol | $M_{n, GPC}$[c] kg/mol | $M_{w, GPC}$[c] kg/mol | Đ ($M_w/M_n$) | α[d] (%) | DP |
|---|---|---|---|---|---|---|---|---|---|---|---|---|---|
| 1 | 1a | 2 | 26 | 6 | 880:1 | 25 | 24 | 100 | — | — | — | 0 | 0 |
| 2 | 1b | 2 | 30 | 6 | 880:1 | 25 | 24 | 100 | — | — | — | 0 | 0 |

TABLE 21-continued

N-isopropylacrylamide (NIPAm) Polymerization in light

| Entry | Catalyst | Monomer (mL) | Pd Cat. (mg) | DCM (mL) | [MA]:[Pd]$^a$ | Temp (Celsius) | Time hours | $M_{n,\,th.}{}^b$ kg/mol | $M_{n,\,GPC}{}^c$ kg/mol | $M_{w,\,GPC}{}^c$ kg/mol | Đ ($M_w/M_n$) | $\alpha^d$ (%) | DP |
|---|---|---|---|---|---|---|---|---|---|---|---|---|---|
| 3 | 1c | 2 | 28 | 6 | 880:1 | 25 | 24 | 100 | — | — | — | 0 | 0 |
| 4 | 1d | 2 | 32 | 6 | 880:1 | 25 | 24 | 100 | — | — | — | 0 | 0 |
| 5 | 2a | 2 | 28 | 6 | 880:1 | 25 | 24 | 100 | 140 | 302 | 2.16 | 12 | 106 |
| 6 | 2b | 2 | 32 | 6 | 880:1 | 25 | 24 | 100 | 338 | 727 | 2.15 | 4 | 35 |
| 7 | 2c | 2 | 31 | 6 | 880:1 | 25 | 24 | 100 | — | — | — | 0 | 0 |
| 8 | 2d | 2 | 35 | 6 | 880:1 | 25 | 24 | 100 | — | — | — | 0 | 0 |
| 9 | 3a | 2 | 27 | 6 | 880:1 | 25 | 24 | 100 | 317 | 727 | 2.29 | 19 | 167 |
| 10 | 3b | 2 | 32 | 6 | 880:1 | 25 | 24 | 100 | 349 | 666 | 1.91 | 3 | 26 |
| 11 | 3c | 2 | 29 | 6 | 880:1 | 25 | 24 | 100 | 187 | 385 | 2.06 | 19 | 167 |
| 12 | 3d | 2 | 33 | 6 | 880:1 | 25 | 24 | 100 | 216 | 280 | 1.29 | 3 | 26e |
| 13 | 4c | 2 | 33 | 6 | 880:1 | 25 | 24 | 100 | 374 | 718 | 1.92 | 30 | 264 |
| 14 | 4d | 2 | 37 | 6 | 880:1 | 25 | 24 | 100 | 371 | 746 | 2.01 | 34 | 299 |

TABLE 22

N-isopropylacrylamide (NIPAm) Polymerization in dark

| Entry | Catalyst | Monomer (mL) | Pd Cat. (mg) | DCM (mL) | [MA]:[Pd]$^a$ | Temp (Celsius) | Time hours | $M_{n,\,th.}{}^b$ kg/mol | $M_{n,\,GPC}{}^c$ kg/mol | $M_{w,\,GPC}{}^c$ kg/mol | Đ ($M_w/M_n$) | $\alpha^d$ (%) | DP |
|---|---|---|---|---|---|---|---|---|---|---|---|---|---|
| 1 | 1a | 2 | 26 | 6 | 880:1 | 25 | 24 | 100 | — | — | — | 0 | 0 |
| 2 | 1b | 2 | 30 | 6 | 880:1 | 25 | 24 | 100 | — | — | — | 0 | 0 |
| 3 | 1c | 2 | 28 | 6 | 880:1 | 25 | 24 | 100 | — | — | — | 0 | 0 |
| 4 | 1d | 2 | 32 | 6 | 880:1 | 25 | 24 | 100 | — | — | — | 0 | 0 |
| 5 | 2a | 2 | 28 | 6 | 880:1 | 25 | 24 | 100 | — | — | — | 0 | 0 |
| 6 | 2b | 2 | 32 | 6 | 880:1 | 25 | 24 | 100 | — | — | — | 0 | 0 |
| 7 | 2c | 2 | 31 | 6 | 880:1 | 25 | 24 | 100 | — | — | — | 0 | 0 |
| 8 | 2d | 2 | 35 | 6 | 880:1 | 25 | 24 | 100 | — | — | — | 0 | 0 |
| 9 | 3a | 2 | 27 | 6 | 880:1 | 25 | 24 | 100 | — | — | — | 0 | 0 |
| 10 | 3b | 2 | 32 | 6 | 880:1 | 25 | 24 | 100 | — | — | — | 0 | 0 |
| 11 | 3c | 2 | 29 | 6 | 880:1 | 25 | 24 | 100 | — | — | — | 0 | 0 |
| 12 | 3d | 2 | 33 | 6 | 880:1 | 25 | 24 | 100 | — | — | — | 0 | 0 |
| 13 | 4c | 2 | 33 | 6 | 880:1 | 25 | 24 | 100 | — | — | — | 0 | 0 |
| 14 | 4d | 2 | 37 | 6 | 880:1 | 25 | 24 | 100 | — | — | — | 0 | 0 | aExperimental conditions: solvent, dichloromethane (DCM); light source, blue LED light ($\lambda_{max}$ = 460 nm).
bTheoretical molecular weight was calculated based on 100% conversion of monomer from the following equation: Mn, th = [M]$_0$/[Pd] × MW$^M$, where [M]$_0$, [Pd], and MW$^M$ correspond to initial monomer concentration, initial Pd catalyst concentration, and molar mass of the monomer respectively.
cMolecular weight and polydispersity index ($M_w/M_n$) were determined by GPC analysis with samples run in THF at 40° C. calibrated to poly(methyl methacrylate) standards.
dMonomer conversion was determined by using $^1$H NMR spectroscopy.

Polymerization of Vinyl Acetate

Using the above general procedure, the homopolymerization of vinyl acetate (VAc) in the light and in the dark was explored. Tables 23 and 24 show the reaction conditions and results for VAc polymerization with different catalyst. No polymer was formed in any of the reactions.

TABLE 23

Vinyl Acetate (VAc) Polymerization in light

| Entry | Catalyst | Monomer (mL) | Pd Cat. (mg) | DCM (mL) | [MA]:[Pd]$^a$ | Temp (Celsius) | Time hours | $M_{n,\,th.}{}^b$ kg/mol | $M_{n,\,GPC}{}^c$ kg/mol | $M_{w,\,GPC}{}^c$ kg/mol | Đ ($M_w/M_n$) | $\alpha^d$ (%) | DP |
|---|---|---|---|---|---|---|---|---|---|---|---|---|---|
| 1 | 1a | 2 | 25 | 6 | 1162:1 | 25 | 16 | 100 | — | — | — | 0 | 0 |
| 2 | 1b | 2 | 28 | 6 | 1162:1 | 25 | 16 | 100 | — | — | — | 0 | 0 |
| 3 | 1c | 2 | 26 | 6 | 1162:1 | 25 | 16 | 100 | — | — | — | 0 | 0 |
| 4 | 1d | 2 | 30 | 6 | 1162:1 | 25 | 16 | 100 | — | — | — | 0 | 0 |
| 5 | 2a | 2 | 27 | 6 | 1162:1 | 25 | 16 | 100 | — | — | — | 0 | 0 |
| 6 | 2b | 2 | 30 | 6 | 1162:1 | 25 | 16 | 100 | — | — | — | 0 | 0 |
| 7 | 2c | 2 | 29 | 6 | 1162:1 | 25 | 16 | 100 | — | — | — | 0 | 0 |
| 8 | 2d | 2 | 32 | 6 | 1162:1 | 25 | 16 | 100 | — | — | — | 0 | 0 |
| 9 | 3a | 2 | 26 | 6 | 1162:1 | 25 | 16 | 100 | — | — | — | 0 | 0 |
| 10 | 3b | 2 | 29 | 6 | 1162:1 | 25 | 16 | 100 | — | — | — | 0 | 0 |
| 11 | 3c | 2 | 27 | 6 | 1162:1 | 25 | 16 | 100 | — | — | — | 0 | 0 |

TABLE 23-continued

Vinyl Acetate (VAc) Polymerization in light

| Entry | Catalyst | Monomer (mL) | Pd Cat. (mg) | DCM (mL) | [MA]:[Pd]$^a$ | Temp (Celsius) | Time hours | $M_{n,th.}^{b}$ kg/mol | $M_{n,GPC}^{c}$ kg/mol | $M_{w,GPC}^{c}$ kg/mol | Đ ($M_w/M_n$) | $\alpha^d$ (%) | DP |
|---|---|---|---|---|---|---|---|---|---|---|---|---|---|
| 12 | 3d | 2 | 31 | 6 | 1162:1 | 25 | 16 | 100 | — | — | — | 0 | 0 |
| 13 | 4c | 2 | 31 | 6 | 1162:1 | 25 | 16 | 100 | — | — | — | 0 | 0 |
| 14 | 4d | 2 | 35 | 6 | 1162:1 | 25 | 16 | 100 | — | — | — | 0 | 0 |

TABLE 24

Vinyl Acetate (VAc) Polymerization in dark

| Entry | Catalyst | Monomer (mL) | Pd Cat. (mg) | DCM (mL) | [MA]:[Pd]$^a$ | Temp (Celsius) | Time hours | $M_{n,th.}^{b}$ kg/mol | $M_{n,GPC}^{c}$ kg/mol | $M_{w,GPC}^{c}$ kg/mol | Đ ($M_w/M_n$) | $\alpha^d$ (%) | DP |
|---|---|---|---|---|---|---|---|---|---|---|---|---|---|
| 1 | 1a | 2 | 25 | 6 | 1162:1 | 25 | 16 | 100 | — | — | — | 0 | 0 |
| 2 | 1b | 2 | 28 | 6 | 1162:1 | 25 | 16 | 100 | — | — | — | 0 | 0 |
| 3 | 1c | 2 | 26 | 6 | 1162:1 | 25 | 16 | 100 | — | — | — | 0 | 0 |
| 4 | 1d | 2 | 30 | 6 | 1162:1 | 25 | 16 | 100 | — | — | — | 0 | 0 |
| 5 | 2a | 2 | 27 | 6 | 1162:1 | 25 | 16 | 100 | — | — | — | 0 | 0 |
| 6 | 2b | 2 | 30 | 6 | 1162:1 | 25 | 16 | 100 | — | — | — | 0 | 0 |
| 7 | 2c | 2 | 29 | 6 | 1162:1 | 25 | 16 | 100 | — | — | — | 0 | 0 |
| 8 | 2d | 2 | 32 | 6 | 1162:1 | 25 | 16 | 100 | — | — | — | 0 | 0 |
| 9 | 3a | 2 | 26 | 6 | 1162:1 | 25 | 16 | 100 | — | — | — | 0 | 0 |
| 10 | 3b | 2 | 29 | 6 | 1162:1 | 25 | 16 | 100 | — | — | — | 0 | 0 |
| 11 | 3c | 2 | 27 | 6 | 1162:1 | 25 | 16 | 100 | — | — | — | 0 | 0 |
| 12 | 3d | 2 | 31 | 6 | 1162:1 | 25 | 16 | 100 | — | — | — | 0 | 0 |
| 13 | 4c | 2 | 31 | 6 | 1162:1 | 25 | 16 | 100 | — | — | — | 0 | 0 |
| 14 | 4d | 2 | 35 | 6 | 1162:1 | 25 | 16 | 100 | — | — | — | 0 | 0 |

Polymerization of Styrene

Using the above general procedure, the homopolymerization of styrene (St) in the light and in the dark was explored. Tables 25 and 26 show the reaction conditions and results for St polymerization with different catalyst. A typical $^1$H NMR for poly(St) includes the following peaks: $^1$H NMR (400 MHz, CDCl$_3$): δ 7.50-7.20 (m, 5H), 6.74 (dd, 1H), 5.76 (d, 1H), 5.25 (d, 1H)

TABLE 25

Styrene (St) Polymerization in light

| Entry | Catalyst | Monomer (mL) | Pd Cat. (mg) | DCM (mL) | [MA]:[Pd]$^a$ | Temp (Celsius) | Time hours | $M_{n,th.}^{b}$ kg/mol | $M_{n,GPC}^{c}$ kg/mol | $M_{w,GPC}^{c}$ kg/mol | Đ ($M_w/M_n$) | $\alpha^d$ (%) | DP |
|---|---|---|---|---|---|---|---|---|---|---|---|---|---|
| 1 | 1a | 2 | 26 | 6 | 960:1 | 25 | 24 | 100 | 0 | 0 | 0 | 0 | 0 |
| 2 | 1b | 2 | 29 | 6 | 960:1 | 25 | 24 | 100 | 47 | 93 | 1.99 | 11 | 106 |
| 3 | 1c | 2 | 28 | 6 | 960:1 | 25 | 24 | 100 | 36 | 61 | 1.70 | 26 | 250 |
| 4 | 1d | 2 | 31 | 6 | 960:1 | 25 | 24 | 100 | 32 | 57 | 1.76 | 40 | 384 |
| 5 | 2a | 2 | 27 | 6 | 960:1 | 25 | 24 | 100 | — | — | — | 0 | 0 |
| 6 | 2b | 2 | 31 | 6 | 960:1 | 25 | 24 | 100 | — | — | — | 0 | 0 |
| 7 | 2c | 2 | 29 | 6 | 960:1 | 25 | 24 | 100 | 39 | 66 | 1.71 | 7 | 67 |
| 8 | 2d | 2 | 31 | 6 | 960:1 | 25 | 24 | 100 | 38 | 75 | 1.98 | 24 | 230 |
| 9 | 3a | 2 | 24 | 6 | 960:1 | 25 | 24 | 100 | — | — | — | 0 | 0 |
| 10 | 3b | 2 | 32 | 6 | 960:1 | 25 | 24 | 100 | — | — | — | 0 | 0 |
| 11 | 3c | 2 | 29 | 6 | 960:1 | 25 | 24 | 100 | — | — | — | 0 | 0 |
| 12 | 3d | 2 | 33 | 6 | 960:1 | 25 | 24 | 100 | — | — | — | 0 | 0 |
| 13 | 4c | 2 | 32 | 6 | 960:1 | 25 | 24 | 100 | 12 | 24 | 1.92 | 62 | 595 |
| 14 | 4d | 2 | 33 | 6 | 960:1 | 25 | 24 | 100 | 35 | 67 | 1.91 | 15 | 144 |

TABLE 26

Styrene (St) Polymerization in dark

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $\alpha^d$ (%) | DP |
|---|---|---|---|---|---|---|---|---|---|---|---|---|---|
| 1 | 1a | 2 | 26 | 6 | 960:1 | 25 | 24 | 100 | — | — | — | 0 | 0 |
| 2 | 1b | 2 | 29 | 6 | 960:1 | 25 | 24 | 100 | — | — | — | 0 | 0 |
| 3 | 1c | 2 | 28 | 6 | 960:1 | 25 | 24 | 100 | 25 | 46 | 1.80 | 83 | 797 |
| 4 | 1d | 2 | 31 | 6 | 960:1 | 25 | 24 | 100 | 26 | 49 | 1.86 | 61 | 586 |
| 5 | 2a | 2 | 27 | 6 | 960:1 | 25 | 24 | 100 | — | — | — | 0 | 0 |
| 6 | 2b | 2 | 31 | 6 | 960:1 | 25 | 24 | 100 | — | — | — | 0 | 0 |
| 7 | 2c | 2 | 29 | 6 | 960:1 | 25 | 24 | 100 | — | — | — | 0 | 0 |
| 8 | 2d | 2 | 31 | 6 | 960:1 | 25 | 24 | 100 | 41 | 91 | 2.24 | 7 | 67 |
| 9 | 3a | 2 | 24 | 6 | 960:1 | 25 | 24 | 100 | — | — | — | 0 | 0 |
| 10 | 3b | 2 | 32 | 6 | 960:1 | 25 | 24 | 100 | — | — | — | 0 | 0 |
| 11 | 3c | 2 | 29 | 6 | 960:1 | 25 | 24 | 100 | — | — | — | 0 | 0 |
| 12 | 3d | 2 | 33 | 6 | 960:1 | 25 | 24 | 100 | — | — | — | 0 | 0 |
| 13 | 4c | 2 | 32 | 6 | 960:1 | 25 | 24 | 100 | 12 | 23 | 1.92 | 67 | 643 |
| 14 | 4d | 2 | 33 | 6 | 960:1 | 25 | 24 | 100 | 31 | 58 | 1.85 | 20 | 192 |

$^a$Experimental conditions: solvent, dichloromethane (DCM); light source, blue LED light ($\lambda_{max}$ = 460 nm).
$^b$Theoretical molecular weight was calculated based on 100% conversion of monomer from the following equation: $M_{n, th}$ = [M]$_0$/[Pd] × MW$^M$, where [M]$_0$, [Pd], and MW$^M$ correspond to initial monomer concentration, initial Pd catalyst concentration, and molar mass of the monomer respectively.
$^c$Molecular weight and polydispersity index were determined by GPC analysis with samples run in THF at 40° C. calibrated to poly(methyl methacrylate) standards.
$^d$Monomer conversion was determined by using $^1$H NMR spectroscopy.

Polymerization of Isobutyl Vinyl Ether

Using the above general procedure, the homopolymerization of isobutyl vinyl ether (IBVE) in the light and in the dark was explored. Tables 27 and 28 show the reaction conditions and results for VAc polymerization with different catalyst. A typical $^1$H NMR for poly(VAc) includes the following peaks: $^1$H NMR (400 MHz, CDCl$_3$, ppm): δ 3.70-3.28 (bs, 1H), 3.28-2.90 (t, 2H), 1.93-1.67 (m, 2H), 1.67-1.27 (m, 1H), 0.87 (s, 6H).

TABLE 27

Isobutyl Vinyl Ether (IBVE) Polymerization in light

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $\alpha^d$ (%) | DP |
|---|---|---|---|---|---|---|---|---|---|---|---|---|---|
| 1 | 1a | 2 | 26 | 6 | 999:1 | 25 | 16 | 100 | 15 | 32 | 2.14 | 99 | 989 |
| 2 | 1b | 2 | 30 | 6 | 999:1 | 25 | 16 | 100 | 18 | 35 | 2.02 | 99 | 989 |
| 3 | 1c | 2 | 28 | 6 | 999:1 | 25 | 16 | 100 | 12 | 23 | 1.92 | 99 | 989 |
| 4 | 1d | 2 | 32 | 6 | 999:1 | 25 | 16 | 100 | 12 | 26 | 2.10 | 99 | 989 |
| 5 | 2a | 2 | 28 | 6 | 999:1 | 25 | 16 | 100 | 11 | 25 | 2.27 | 99 | 989 |
| 6 | 2b | 2 | 32 | 6 | 999:1 | 25 | 16 | 100 | 9 | 25 | 2.69 | 99 | 989 |
| 7 | 2c | 2 | 31 | 6 | 999:1 | 25 | 16 | 100 | 12 | 27 | 2.35 | 99 | 989 |
| 8 | 2d | 2 | 35 | 6 | 999:1 | 25 | 16 | 100 | 11 | 26 | 2.27 | 99 | 989 |
| 9 | 3a | 2 | 27 | 6 | 999:1 | 25 | 16 | 100 | 12 | 31 | 2.65 | 99 | 989 |
| 10 | 3b | 2 | 32 | 6 | 999:1 | 25 | 16 | 100 | 16 | 36 | 2.21 | 99 | 989 |
| 11 | 3c | 2 | 29 | 6 | 999:1 | 25 | 16 | 100 | 13 | 33 | 2.55 | 99 | 989 |
| 12 | 3d | 2 | 33 | 6 | 999:1 | 25 | 16 | 100 | 20 | 43 | 2.18 | 99 | 989 |
| 13 | 4c | 2 | 33 | 6 | 999:1 | 25 | 16 | 100 | 9 | 14 | 1.64 | 99 | 989 |
| 14 | 4d | 2 | 37 | 6 | 999:1 | 25 | 16 | 100 | 14 | 27 | 2.00 | 99 | 989 |

TABLE 28

Isobutyl Vinyl Ether (IBVE) Polymerization in dark

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $\alpha^d$ (%) | DP |
|---|---|---|---|---|---|---|---|---|---|---|---|---|---|
| 1 | 1a | 2 | 26 | 6 | 999:1 | 25 | 16 | 100 | 17 | 37 | 2.07 | 95 | 949 |
| 2 | 1b | 2 | 30 | 6 | 999:1 | 25 | 16 | 100 | 14 | 33 | 2.32 | 98 | 979 |
| 3 | 1c | 2 | 28 | 6 | 999:1 | 25 | 16 | 100 | 14 | 23 | 1.70 | 99 | 989 |
| 4 | 1d | 2 | 32 | 6 | 999:1 | 25 | 16 | 100 | 14 | 25 | 1.87 | 99 | 989 |
| 5 | 2a | 2 | 28 | 6 | 999:1 | 25 | 16 | 100 | 12 | 25 | 2.15 | 99 | 989 |
| 6 | 2b | 2 | 32 | 6 | 999:1 | 25 | 16 | 100 | 11 | 27 | 2.34 | 99 | 989 |
| 7 | 2c | 2 | 31 | 6 | 999:1 | 25 | 16 | 100 | 12 | 27 | 2.37 | 99 | 989 |
| 8 | 2d | 2 | 35 | 6 | 999:1 | 25 | 16 | 100 | 12 | 26 | 2.13 | 99 | 989 |

TABLE 28-continued

Isobutyl Vinyl Ether (IBVE) Polymerization in dark

| Entry | Catalyst | Monomer (mL) | Pd Cat. (mg) | DCM (mL) | [MA]:[Pd]$^a$ | Temp (Celsius) | Time hours | $M_{n, th.}^b$ kg/mol | $M_{n, GPC}^c$ kg/mol | $M_{w, GPC}^c$ kg/mol | Đ ($M_w/M_n$) | $α^d$ (%) | DP |
|---|---|---|---|---|---|---|---|---|---|---|---|---|---|
| 9 | 3a | 2 | 27 | 6 | 999:1 | 25 | 16 | 100 | 13 | 33 | 2.56 | 99 | 989 |
| 10 | 3b | 2 | 32 | 6 | 999:1 | 25 | 16 | 100 | 14 | 32 | 2.21 | 99 | 989 |
| 11 | 3c | 2 | 29 | 6 | 999:1 | 25 | 16 | 100 | 15 | 37 | 2.44 | 96 | 959 |
| 12 | 3d | 2 | 33 | 6 | 999:1 | 25 | 16 | 100 | 19 | 37 | 1.93 | 90 | 899 |
| 13 | 4c | 2 | 33 | 6 | 999:1 | 25 | 16 | 100 | 9 | 14 | 1.60 | 99 | 989 |
| 14 | 4d | 2 | 37 | 6 | 999:1 | 25 | 16 | 100 | 14 | 27 | 1.97 | 99 | 989 |

As evidenced herein, the above experiments were performed to verify that light irradiation can be utilized to covert a palladium (Pd) diimine catalyst into a photocatalytic system which enables a controlled "ON/OFF" radical polymerization process. With the activation of light, the catalyst produces acrylate polymers with a control over a broad molecular weight reaching from a number average molecular weight ($M_n$) from about equal to 50,000 g/mol to an $M_n$ about equal to 300,000 g/mol, with exceptional low dispersity values. Having successfully polymerized acrylates, investigation was made into the incorporation of two distinct monomers which were known to show preference, respectively, for an insertion or radical polymerization process: hexene and methacrylate, respectively. It was further discovered that a mixture of methacrylate and hexene can be selectively polymerized from a radical or insertion process, respectively, in the presence of each other, enabling the formation of distinct block copolymer architectures. To test the achievable selectivity of MILRad polymerization, multi-block copolymers ABABA and BABA starting either with acrylates (A) or hexenes (B), respectively, in a mixture of both monomers were formed, in one-pot. The MILRad polymerization is further utilized in the one-pot synthesis of olefinic diblocks containing in-chain active ester detailed herein below.

Example 3

One-Pot Synthesis of Olefinic Diblocks Containing In-Chain Active Ester Via MILRad Polymerization:

In some embodiments provided herein is a one-pot synthesis of olefinic diblocks containing an in-chain active ester that is produced by an embodiment of the disclosed MILRad polymerization, wherein the presence of an in-chain ester gives rise to the ability to perform Post-Polymerization Modification (PPM) of said ester. Thus, in an embodiment disclosed herein, 1-hexene was polymerized with the comonomer of methyl acrylate (MA) and activated ester N-Acryloxysuccinimide (NAS) in a one-pot fashion. The resulting block copolymer p(1-hexene)-b-(MA-co-NAS) has the ester functional group incorporated statistically in the radically polymerized block, which allows further tailored post-modification. Hydrolysis of the activated ester with acids, and aminolysis of the ester with functional amines thus affords polymers with new functional group incorporation including amines, alcohols, acids etc. These polymers may be utilized as compatibilizers for nylon and also be used in the synthesis of novel thermoplastic elastomers.

Experimental Methods

Synthesis Steps for an Embodiment of a Pd Diimine Catalyst Described Herein

1) Bis(2,6-diisopropylaniline)-butane-2,3-diimine

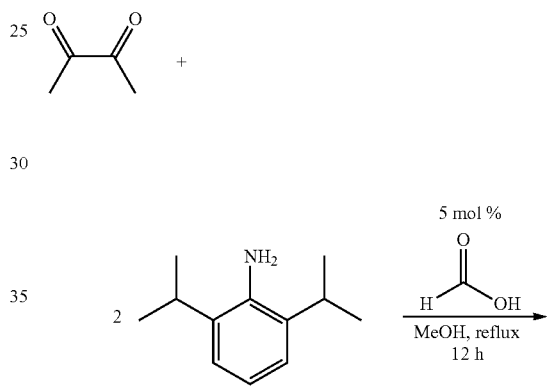

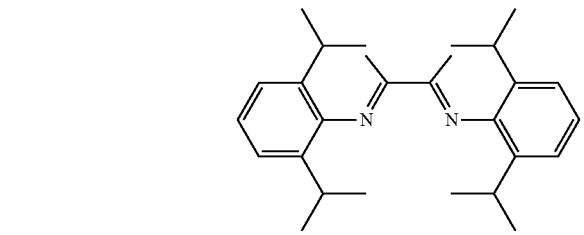

To a 250 mL rb flask equipped with a stir bar, a solution of butanedione (3.50 g, 40.7 mmol, 1.00 equiv), 2,6-diisopropylaniline (15.1 g, 85.4 mmol, 2.10 equiv), MeOH (100 mL) was added, followed by formic acid (198 μL, 4.01 mmol, 0.05 equiv) as a catalyst. The reaction was refluxed for 12 hours, then cooled to room temperature, concentrated under reduced pressure and cooled to −20° C. overnight. A yellow solid product was recrystallized from cold EtOH (~200 mL), washed with cold MeOH (~50 mL), and then dried in vacuo to afford 10.5 g (64% yield). The spectroscopic data for this compound were in agreement with those reported in the literature. $^1$H NMR (400 MHz, CD$_2$Cl$_2$, ppm) δ 7.15 (m, 4H), 7.08 (m 2H), 2.71 (sp, 4H), 2.02 (s, 6H), 1.17 (d, 6H), 1.15 (d, 6H), 1.13 (d, 6H).

2) (Ar—N═C(Me)—C(Me)═N—Ar)Pd(Me)(Cl)
(Ar=2,6-diisopropylaniline)

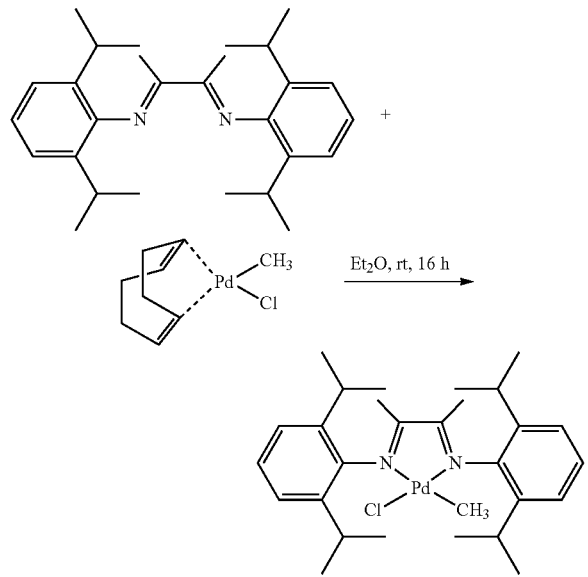

This compound was synthesized using literature procedures[6]. To a 25 mL rb flask, a solution of chloro(1,5-cyclooctadiene)methylpalladium(II) (270 mg, 1.02 mmol, 1 equiv), diethyl ether (10 mL), and a slight excess of bis(2,6-diisopropylaniline)-butane-2,3-diimine (45 p mg, 1.11 mmol, 1.09 equiv) was added and allowed to run overnight. An orange precipitate was observed within few minutes after mixing. The orange solid product was collected via filtration, washed with 20 mL (×3) cold diethyl ether, and dried overnight in vacuo to afford 420 mg (74% yield). The spectroscopic data for this compound were consistent with those reported in the literature. $^1$H NMR (400 MHz, CDCl$_3$, ppm): δ 7.31-7.20 (m, 6H), 3.07 (sep, 2H), 2.94 (sep, 2H), 2.01 (s, 3H), 2.00 (s, 3H), 1.37 (d, 6H), 1.32 (d, 6H), 1.15 (d, 6H), 1.14 (d, 6H), 0.34 (s, 3H).

3) [(Ar—N═C(Me)—C(Me)═N—Ar)Pd(Me)(CH3CN)]+[B(3,5-C6H3(CF3)2)4]-(Ar=2,6-diisopropylaniline)

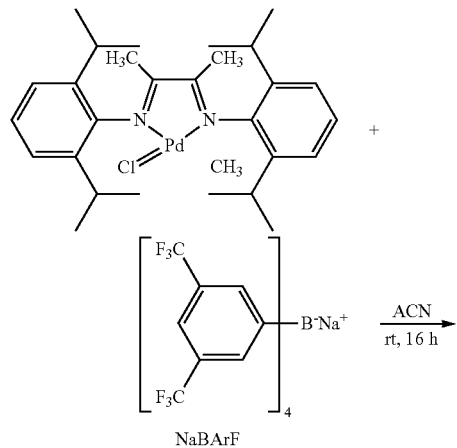

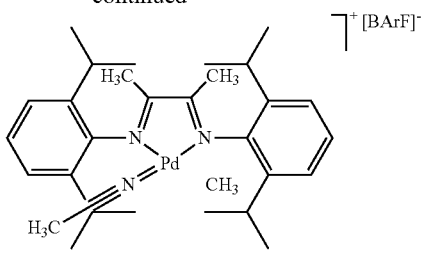

A flame-dried 100 mL rb flask was charged with a stir bar, and a solution of 20 mL acetonitrile, 1 g sodium tetrakis[3,5-bis(trifluoromethyl)phenyl]borate (NaBAr'F), and 600 mg of (Ar—N═C(Me)—C(Me)═N—Ar)Pd(Me)(Cl) (Ar=2,6-diisopropylaniline) at room temperature and allowed to stir overnight. NaCl formed in solution was removed via filtration, and the solvent itself via rotary evaporation. The solid was subsequently dissolved in minimal amount of DCM, and filtered with a 0.45 μm PTFE syringe filter to 200 mL hexanes. The product precipitated as yellow solid, which was washed twice with hexanes, and dried in vacuo to give 4.5 g (90% yield). The spectroscopic data for this compound were consistent with those reported in the literature. $^1$H NMR (400 MHz, CD$_2$Cl$_2$, ppm): δ 7.69 (m, 8H), 7.53 (m, 4H), 7.39-7.29 (m, 6H), 2.90 (sep, 2H), 2.79 (sep, 2H), 2.20 (s, 6H), 1.77 (s, 3H), 1.35 (d, 6H), 1.30 (d, 6H), 1.23 (d, 6H), 1.20 (d, 6H), 0.50 (s, 3H).

MILRad. Photopolymerization Reaction Setup: Reactions were performed in flamed dried 4-dram vials equipped with magnetic stir bars and sealed with rubber septum stoppers. The reaction mixtures were irradiated with Sunnet RGB blue led light ($\lambda_{max}$=450, 3600 lumens, 40W). All reactions were hung from a glass crystallization dish from the same height and distance from the light source using aluminum wire. A stream of dry air and a temperature probe was used to maintain the temperature of the reactor at 25° C. All reaction vials were covered in aluminum foil to prevent pre-exposure of light prior to reactions.

Figures 14, 14A:
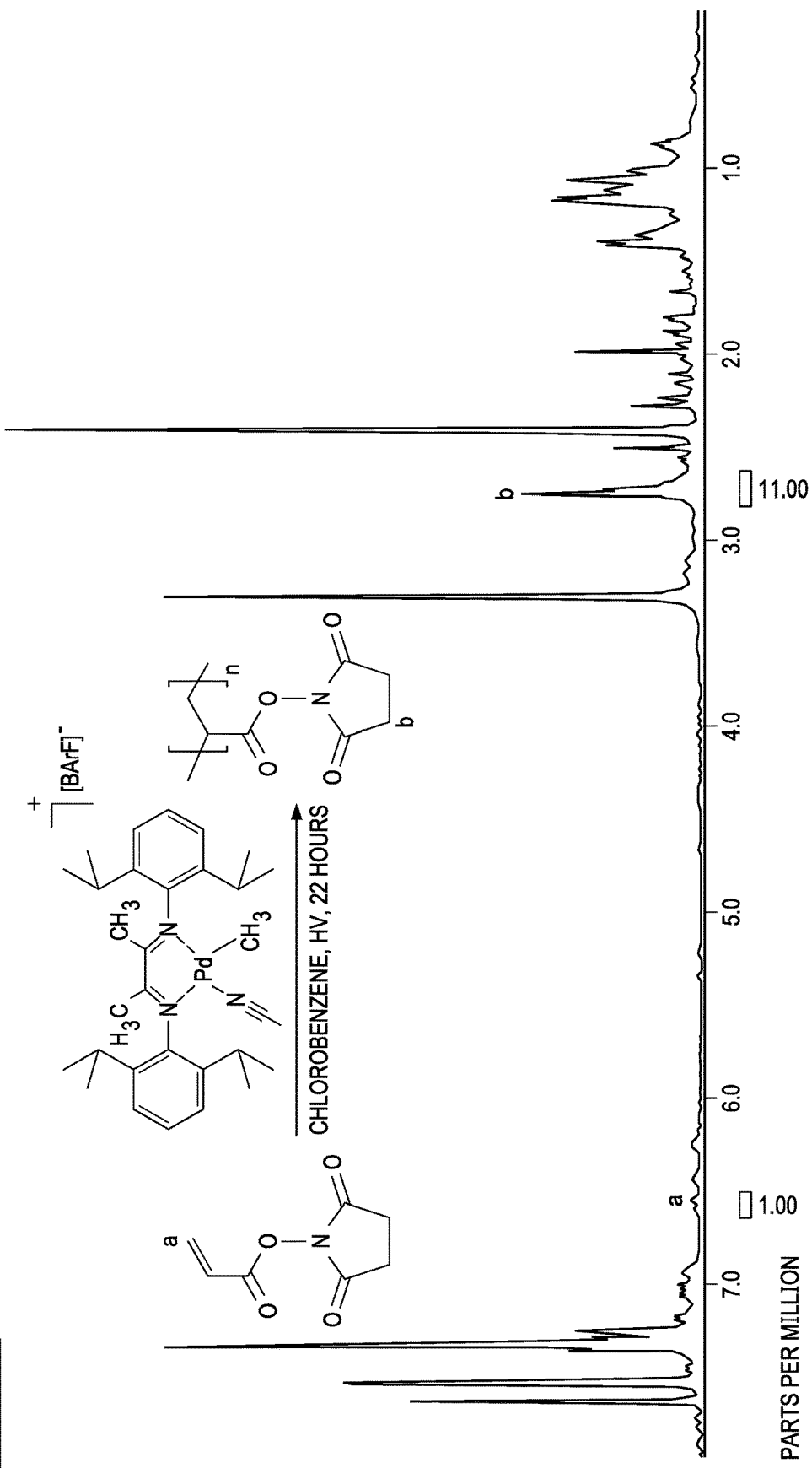
FIG. 14. depicts and $^1$H (400 MHz, DMSO-d$_6$, Top) NMR spectra of NAS free radical homopolymerization in the presence of Pd(II) under blue light condition, which is indicated by the absence of the Pd-Me bond. (Bottom) Chelate formation of NAS and Pd(II) in the dark.
Figure 14B:
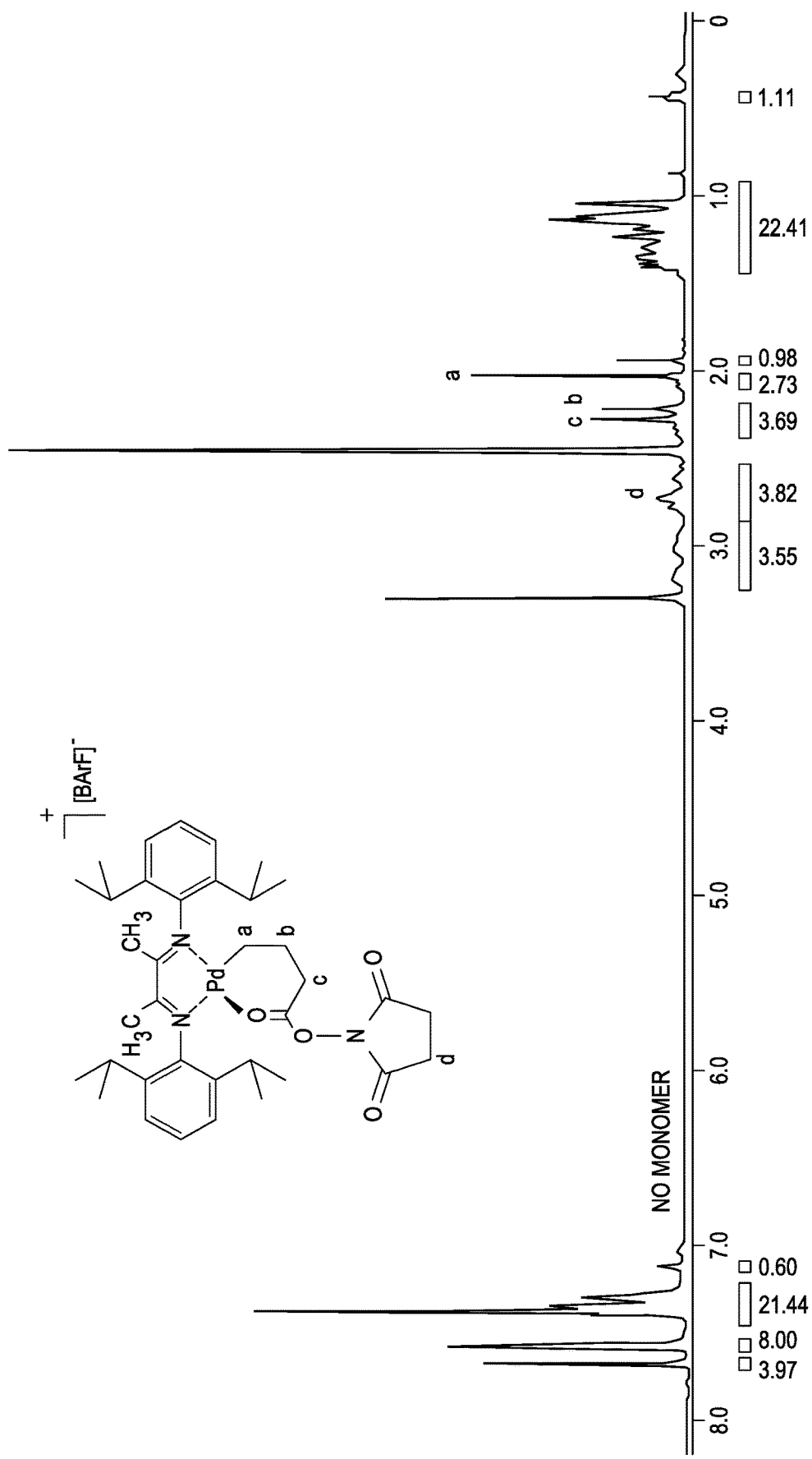

Procedures for the investigation of NAS reactivity in the presence of Pd(II) catalyst: In a 4-dram flame-dried vial equipped with a stir bar, a solution of 6 mg NAS, 50 mg Pd(II) catalyst (mol ratios [NAS]:[Pd]=1:1), and 2 mL of chlorobenzene, which was distilled and freeze-pump-thawed 3 times prior to use, was added and irradiated with blue light for 22 hours. The solution turned black due to degradation of Pd(II) catalyst. The solvent was removed via rotary evaporation and the black residue was dissolved in DMSO-d$_6$ for $^1$H NMR spectra. FIG. 14 depicts NAS undergoes free radical homopolymerization, in which the conversion of pNAS (64%) was calculated by comparing the ratios between a and b. Formation of 5-member ring of NAS and Pd(II) catalyst (major product) takes place in reaction kept in the dark for 22 hours as shown in FIG. 14, whose spectroscopic data are similar to those reported in the literatures. Isolation of this chelate was done in the same aforementioned manner. As expected, there are no peaks of NAS monomer appeared in 6.0-7.0 ppm.

Figure 15:
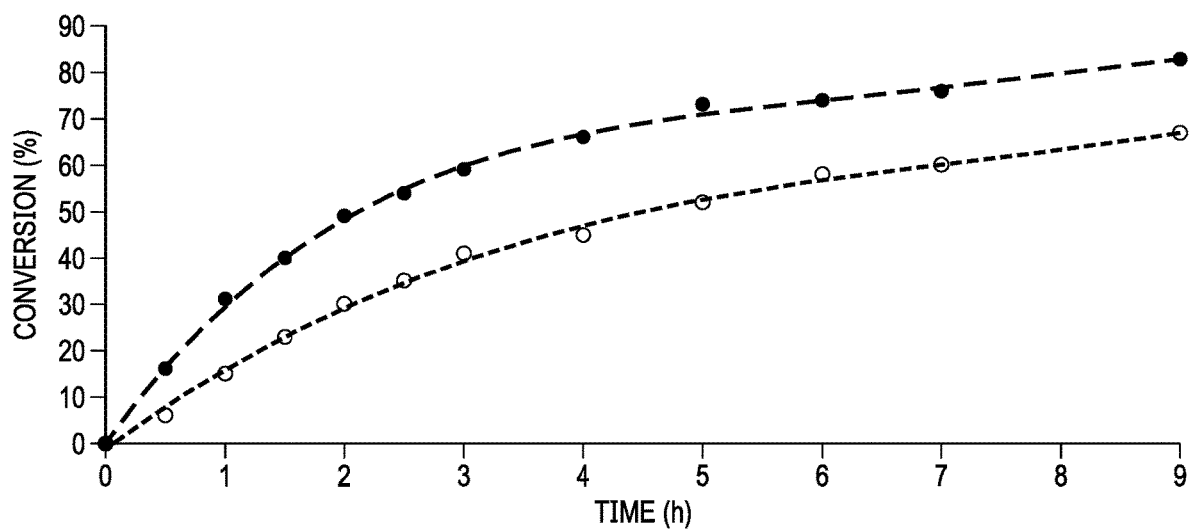
FIG. 15. depicts a graph demonstrating conversion vs. time for MILRad polymerization kinetics of p(MA-co-NAS) in blue light (green/lower plot line: MA; purple/upper plot line: NAS).

Procedure for Kinetic Investigation of Photocontrolled Copolymerization of methyl Acrylate and N-acryloxysuccinimide p(MA-co-NAS) using α-diimine Pd(II) Catalyst:

In a nitrogen filled glove bag, a flamed-dried 4-dram vial equipped with a stir bar and wrapped with aluminum foil, was charged with 27 mg Pd(II), and a solution of 6 mL DCM, 2 mL MA and 186 mg NAS. Once the aluminum foil was removed, the vial was hung next to blue LED strips (~460 nm). The reaction was stirred while keeping the reaction temperature at 25° C. by blowing N$_2$ over the reaction vessel. FIG. 15 depicts conversion vs. time for the polymerization kinetics of aliquots taken out at specific time points.

Figures 16, 16A:
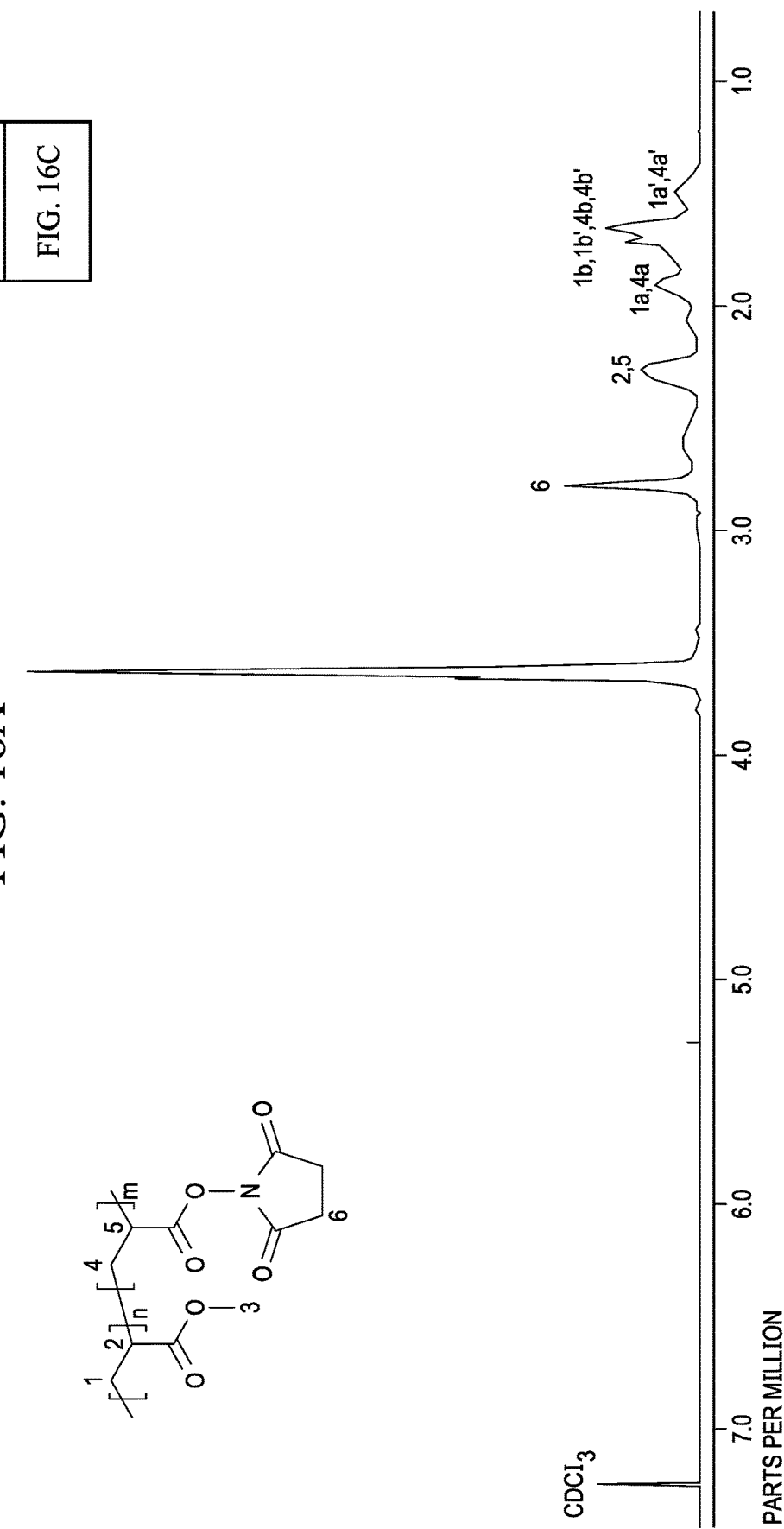
FIG. 16 (top and middle spectra show) $^1$H (400 MHz, CDCl$_3$) NMR spectrum of incorporation of NAS into the copolymer chains were calculated by comparing the resonances assigned as 3 and 6, and lower spectra depicts a $^1$H (400 MHz, CDCl$_3$) NMR spectrum p(MA-co-NAS).
Figure 16B:
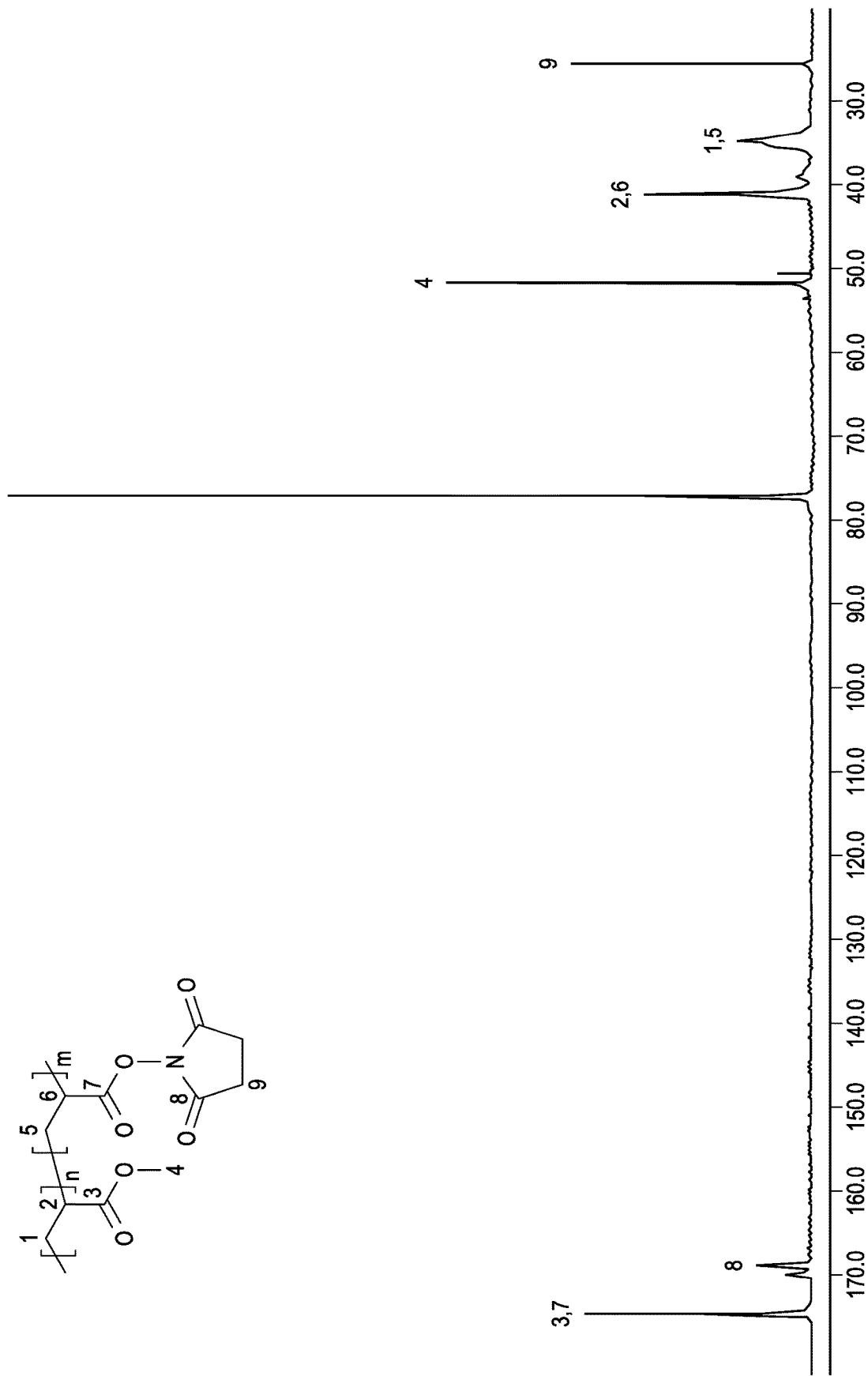
Figure 16C:
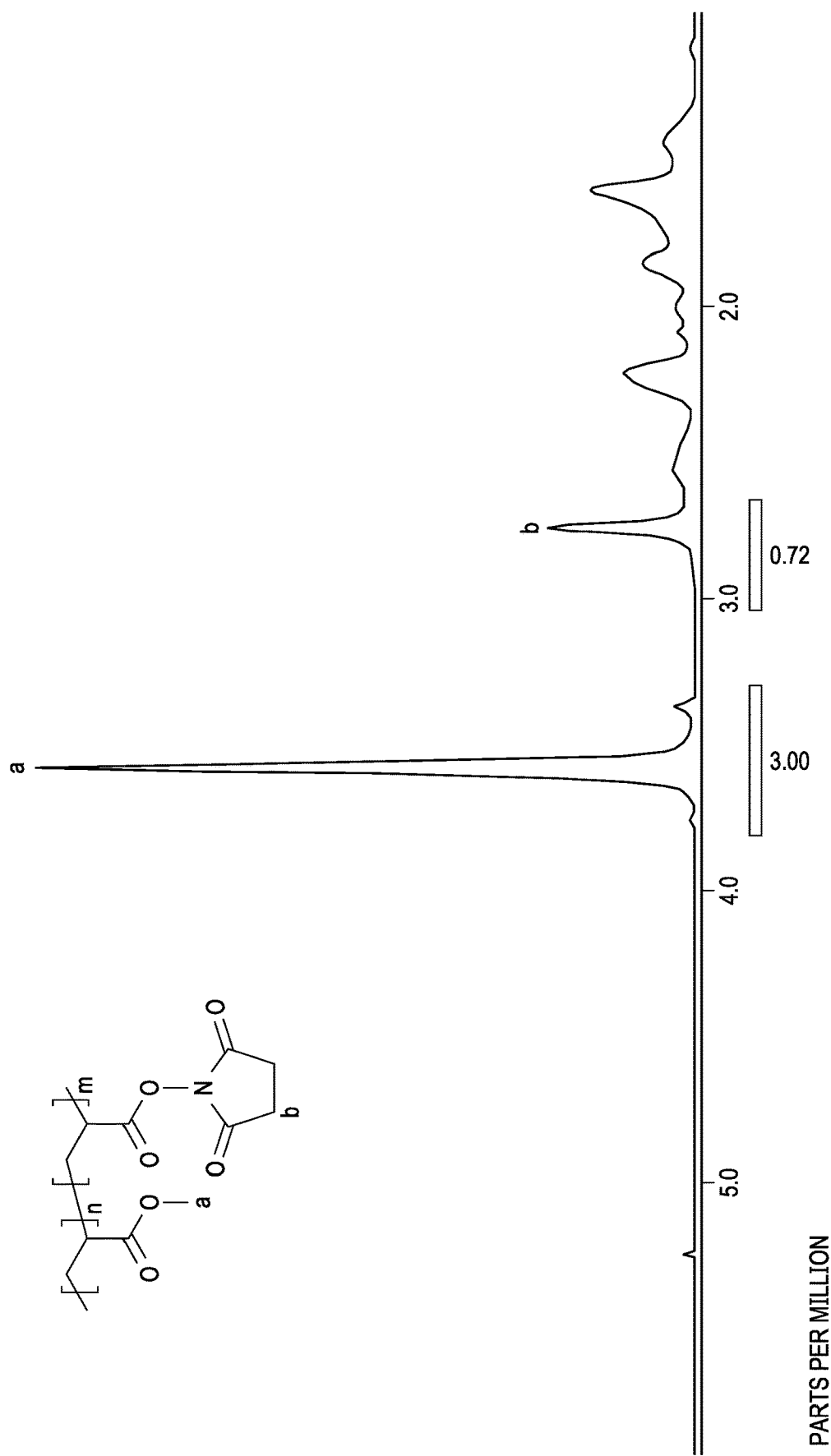

Varied concentration of NAS in polymerization reactions with M4: In a nitrogen filled glove bag, a flamed-dried 4-dram vial, equipped with a stir bar was charged with 27 mg a-diimine Pd(II) complex, 6 mL DCM, desired amount (Table 29) of NAS and 2 mL of MA. The vial was placed next to blue LED-strips-lined dish as described above in the glove bag. Following the desired amount of reaction time, aliquots were taken and subjected to $^1$H NMR. % incorporation of NAS incorporated into the copolymer chains were calculated by comparing the resonances assigned as 3 and 6 as shown in FIG. 16.

% NAS Incorporation=$(b/4)/(a/3)*100\%$

TABLE 29

Varied concentration of NAS in copolymerization of p(MA-co-NAS)

| Entry | NAS (mg) | MA (mL) | DCM (mL) | Pd Cat (mg) | [NAS]:[MA]$^a$ | Time$^b$ (h) | $M_{n, theo}$$^c$ (kg/mol) | $M_{n, GPC}$ (kg/mol) | $M_{w, GPC}$ (kg/mol) | Đ$^c$ | α$^d$ % NAS | α$^d$ % MA | % NAS Incp$^d$ |
|---|---|---|---|---|---|---|---|---|---|---|---|---|---|
| 1 | 932 | 2 | 6 | 27 | 1:4 | 0.5 | 100 | | | | | | |
| 2 | 466 | 2 | 6 | 27 | 1:8 | 7 | 100 | 27 | 54 | 1.99 | 76 | 53 | 16 |
| 3 | 372 | 2 | 6 | 27 | 1:10 | 22 | 100 | 27 | 60 | 2.26 | 96 | 83 | 16 |
| 4 | 186 | 2 | 6 | 27 | 1:20 | >24 | 100 | 102 | 256 | 2.51 | 96 | 85 | 15 |
| 5 | 37 | 2 | 6 | 27 | 1:100 | | 100 | | | | | | |

$^a$Experimental conditions: mol ratio of [NAS]:[MA]; solvent, dichloromethane (DCM); light source, blue LED light ($\lambda_{max}$ = 460 nm).
$^b$Amount of time able to take aliquots before high gelation.
$^c$Theoretical molecular weight was calculated based on 100% conversion of monomer from the following equation: $M_n^{th} = [M]_0/[Pd] \times MW^M$, where $[M]_0$, [Pd], and $MW^M$ correspond to initial monomer concentration, initial Pd catalyst concentration, and molar mass of the monomer respectively, molecular weight and polydispersity index ($M_w/M_n$) were determined by GPC analysis with samples run in THF at 40° C. calibrated to poly (methyl methacrylate) (PMMA) standards.
$^d$Monomer conversion and incorporation percentage were determined by using $^1$H NMR spectroscopy.

Procedure for "ON/OFF" photo-controlled polymerization of p(1-hexene)-b-(MA-co-NAS) using α-diimine Pd(II) catalyst: In a nitrogen filled glove bag, a flamed-dried 4-dram vial, equipped with a stir bar was charged with 92 mg a-diimine Pd(II) complex, 6 mL DCM, 186 mg of NAS, 2 mL of 1-hexene, and 2 mL of MA. The vial was placed next to blue LED-strips-lined dish as described above in the glove bag, covered with aluminum foil during the "OFF" periods, and unfoiled during the "ON" periods. The reaction was stirred while the temperature was maintained at 25° C. by blowing air over the reaction vessel. Following the desired amount of reaction time, aliquots were taken and subjected to $^1$H NMR and GPC analysis.

Incorporation percentage of NAS in the diblock copolymer: the percent incorporation of NAS in the diblock copolymers was determined by $^1$H NMR spectroscopy, according to the same calculation formula, and 9% NAS was incorporated into the chain of the diblock copolymers.

Post-Polymerization Modification (PPM) of p(1-hexene)-b-(MA-co-NAS.)

Aminolysis with benzyl amine (BnNH$_2$)

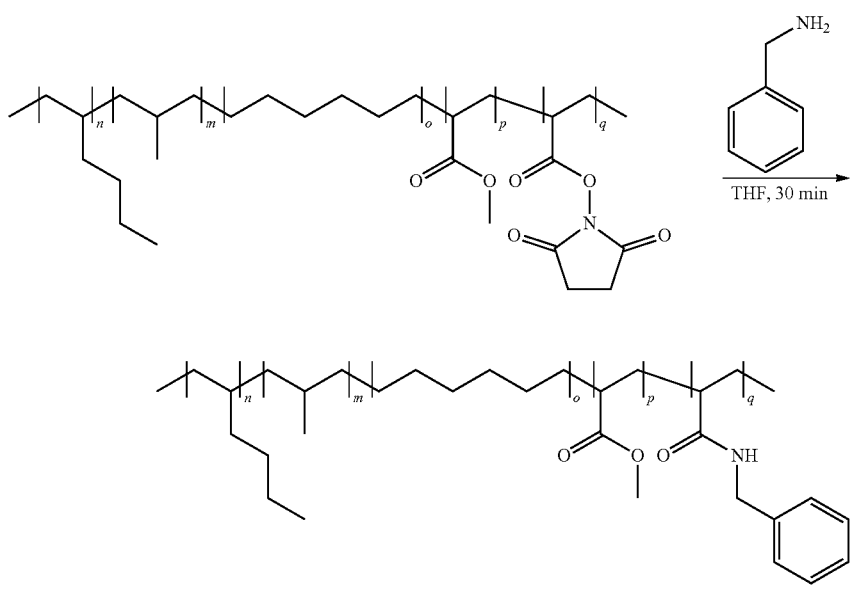

In a 6-dram vial charged with a stir bar, a solution of 6 mL THF and 200 mg of purified diblock copolymers p(1-hexene)-b-(MA-co-NAS) (HMANAS) (black solid) was mixed with 0.1 mL benzyl amine (BnNH$_2$). The solution turned cloudy with black flakes precipitation slowly formed after stirring for 10 minutes. The reaction was then concentrated down by rotary evaporation after 30 minutes, precipitated and washed several times in distilled water and acetone, heat dried in sand bath, and dried in vacuo overnight to afford a 104 mg of PPM sticky black flakes (52% yield, Table 30).

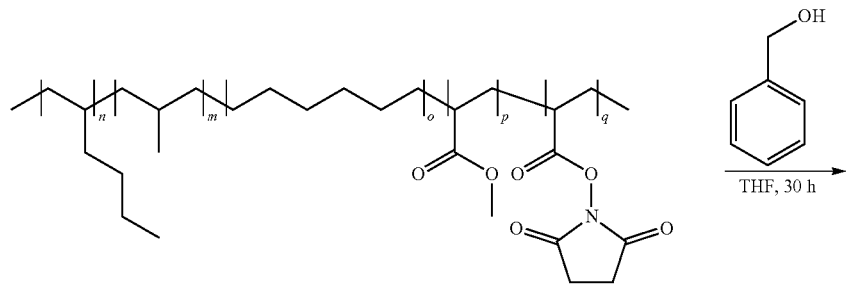

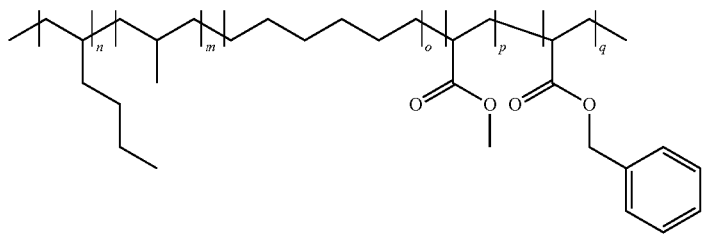

Esterification with Benzyl Alcohol (BnOH):

In a 6-dram vial charged with a stir bar, a solution of 6 mL THF and 200 mg of purified diblock copolymers (HMA-NAS) (black solid) was mixed with 0.1 mL benzyl alcohol (BnOH). The reaction was then concentrated down by rotary evaporation after 3 hours, precipitated and washed several times in distilled water and acetone to remove succinimide, heat dried in sand bath, and dried in vacuo overnight to afford a 75 mg of PPM sticky and rubbery black solid (38% yield) (Table 30).

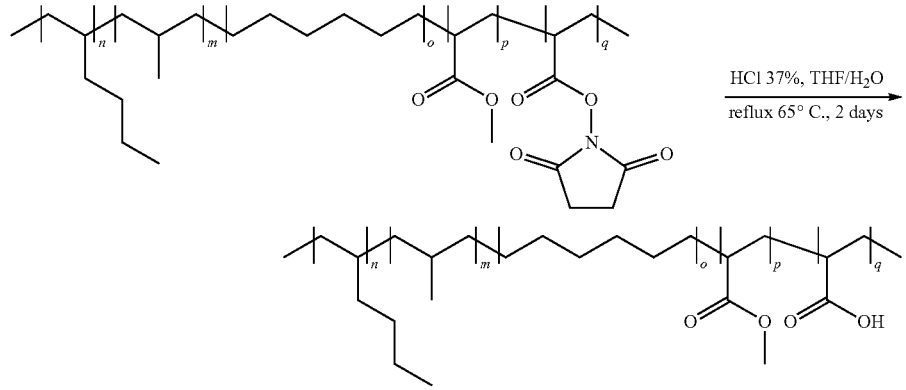

Hydrolysis with HCl 37%:

In a 6-dram vial charged with a stir bar, a solution of 6 mL THF, 3 mL of distilled water, and 250 mg of purified diblock copolymers (HMANAS) was mixed with 1 mL HCl 37%. The reaction turned cloudy after adding water drop-wise and following by addition of acid. The reaction was allowed to reflux at 65° C. for 2 days, which was then concentrated down by rotary evaporation. White precipitation formed slowly upon evaporation of solvent, which was subsequently precipitated and washed several times in distilled water to remove succinimide, heat dried in sand bath, and dried in vacuo overnight to afford the product.

TABLE 30

Post-polymerization Modification of p(1-hexene)-b-(MA-co-NAS)

| Entry | Polymer (mg) | $BnNH_2$ (mL) | BnOH (mL) | HCl (mL) | THF (mL) | Temp (° C.) | Time (h) | PPM polymer (mg) | Yield (%) |
|---|---|---|---|---|---|---|---|---|---|
| 1 | 200 | 0.1 | — | — | 6 | 25 | 0.5 | 104 | 52 |
| 2 | 200 | — | 0.1 | — | 6 | 25 | 3 | 75 | 38 |
| 3 | 250 | — | — | 0.1 | 6 | 25 | 2 | | |

Example 4

MILRad Polymerization for Triblock Copolymers

Figure 3A:
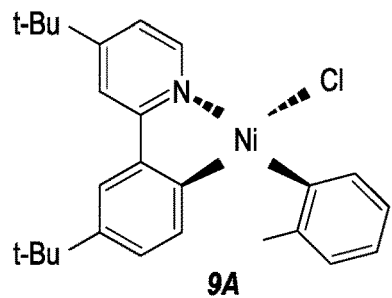
FIG. 3 (A) is a schematic of suitable nickel, iron, and cobalt polymerization catalysts, according to embodiments of this disclosure; and (B) is a schematic of embodiments of functional chelated catalysts, according to embodiments of this disclosure
Figure 3A:
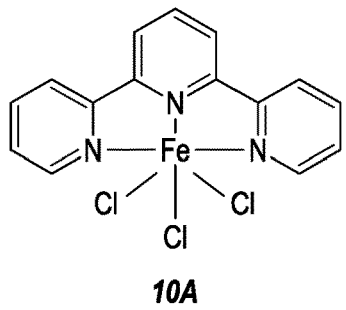
Figure 3A:
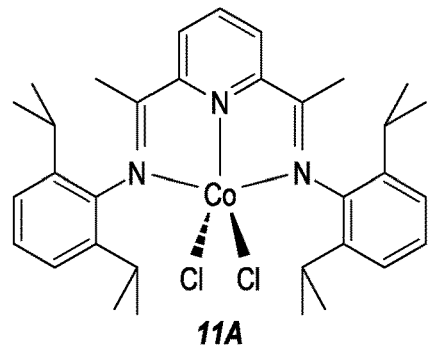
Figure 3A:
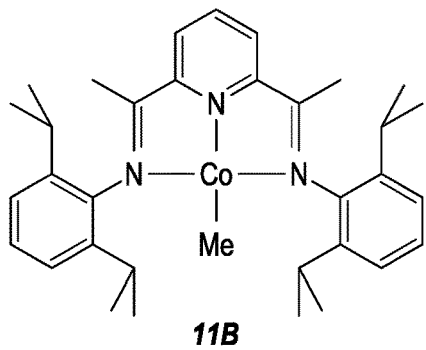
Figure 3A:
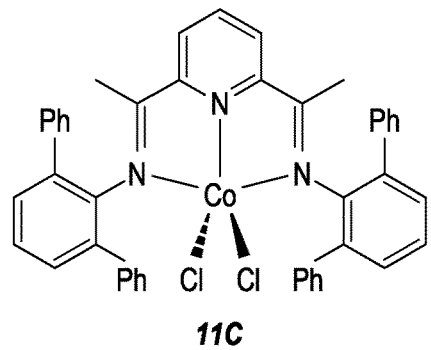
Figure 3A:
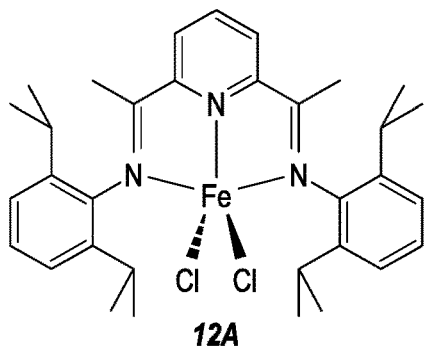
Figure 3B:
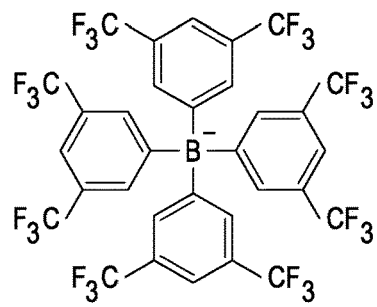
Figure 3B:
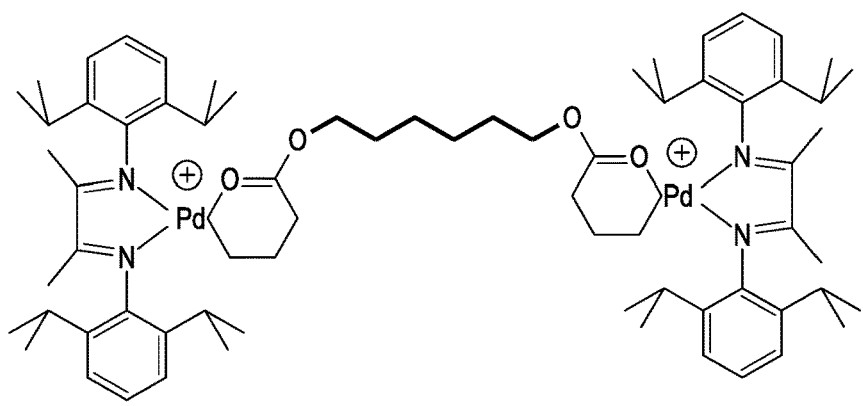
Figure 3B:
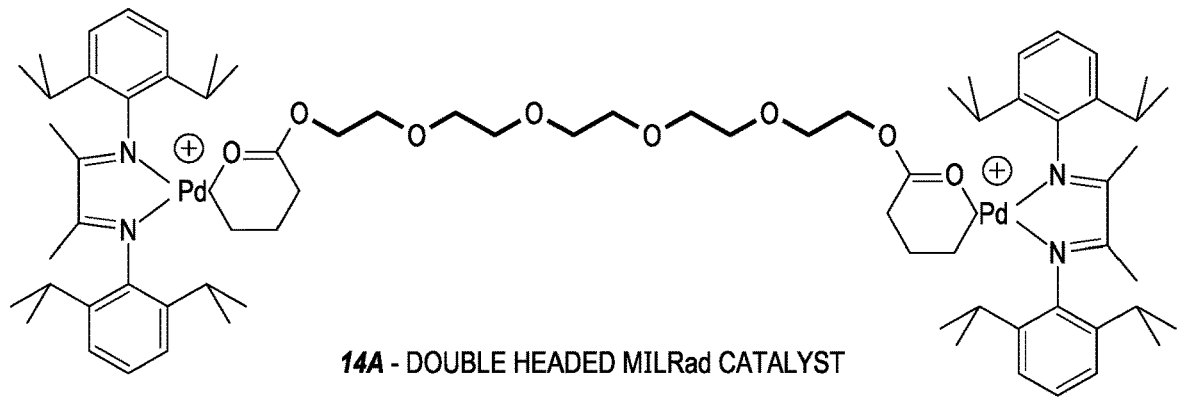
Figure 3B:
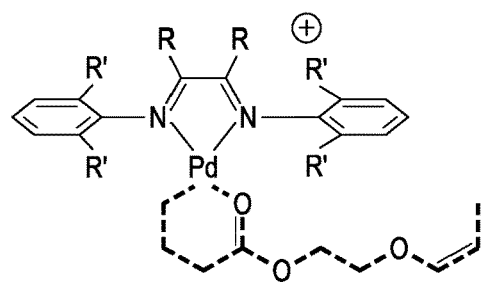

In some embodiments herein disclosed are chelated catalysts such as those exemplified in in FIG. 3(B) wherein, in some embodiments the chelated catalysts include a chelated Palladium as a metal center. Embodiments of the chelated catalysts described herein are capable of (a) a coordination-insertion mechanism to polymerize olefins; and (b) a light initiated radical mechanism to polymerize vinyl polar monomers as described herein; they are also capable of catalyzing (c) an additional mechanism that either allows for (ring opening metathesis polymerization) ROMP of cyclic olefins and producing a triblock polymer (ABA/ABC) or allows for ROP (ring opening polymerization) of cyclic esters also resulting in a triblock copolymer synthesis; and (d) allows for an additional light initiated radical mechanism, allowing growth of vinyl polar monomers from two chain ends.

Synthesis of ROMP-Chelate Catalyst: In one embodiment the synthesis of ROMP-Chelate is disclosed, wherein: a flame-dried 200 ml round bottom flask, equipped with magnetic stir bar and sealed with a rubber septum, containing (Ar—N═C(An)—C(An)═N—Ar)Pd(Me)(CH$_3$CN)]$^+$[B (3, 5-C$_6$H$_3$(CF$_3$)$_2$)$_4$]$^-$ (Ar=2,4-diisopropylphenyl; An=acenaphthene) (1000 mg, 0.655 mmol, 1 equiv), was added diethyl ether (50 ml) followed by dichloromethane (50 ml). 2-(1-Propenyl)oxyethyl acrylate (POEA) (210 mg, 1.34 mmol, 2.05 equiv). The reaction mixture was stirred for two to three days at room temperature and monitored by NMR for complete consumption of diimine-Pd catalyst. Upon completion, the reaction was concentrated and precipitated into 200 ml of dry pentane. The product was washed three times with pentane, then dried overnight under vacuo to yield 600 mg (56% yield) of the title compound as a red-orange solid (See for example FIG. 3 (B) structure (15a)).

Figures 17, 17A:
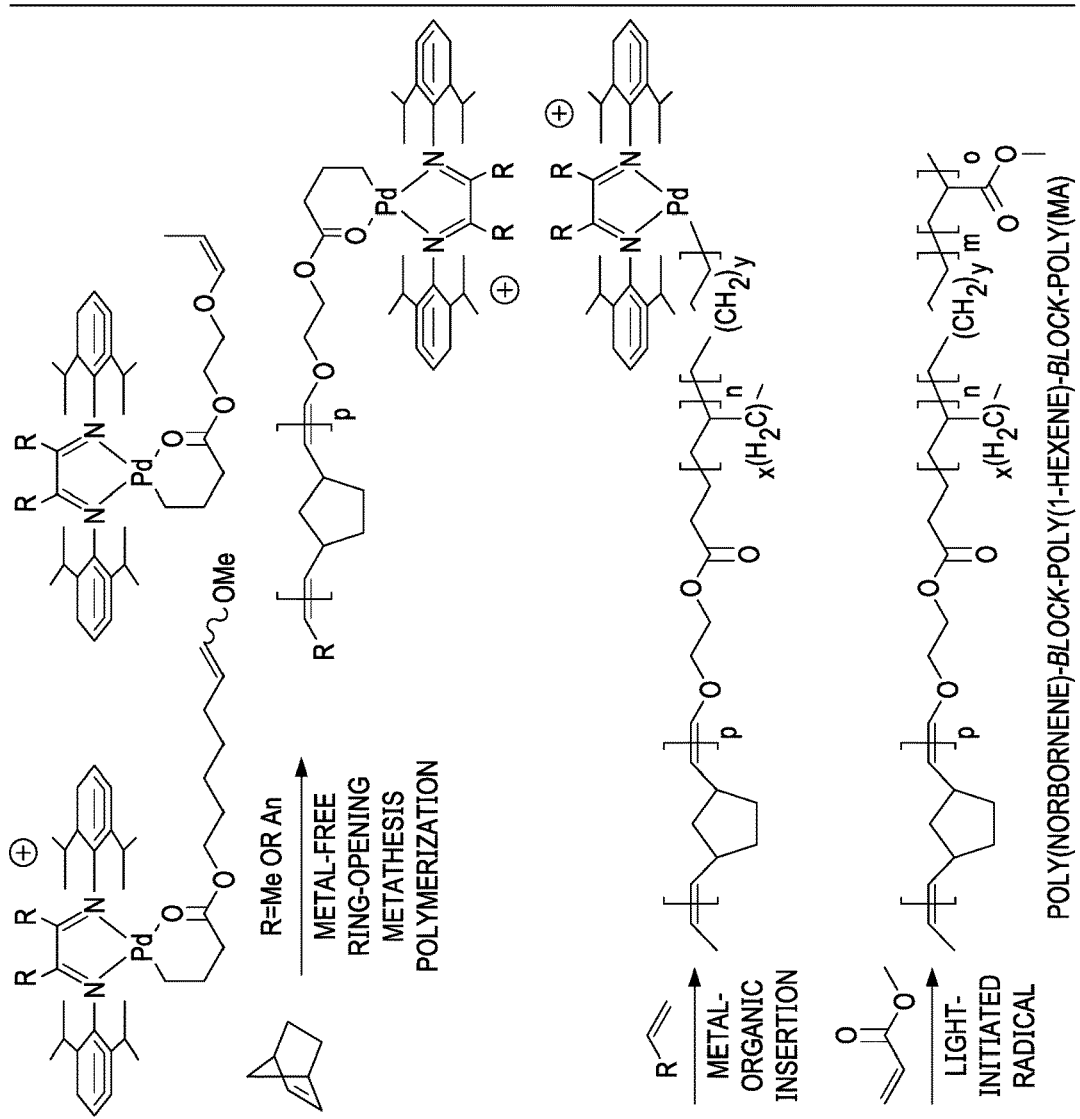
FIG. 17 depicts: a schematic of a first embodiment for combining MILRad with ROMP for a triblock copolymer synthesis; a schematic of a second embodiment for combining MILRad with ROMP for a triblock copolymer synthesis; and the chemical structure of a triblock polymer (poly (norbornene)-block-poly(1-hexene)-block-poly(MA)) product.
Figure 17B:
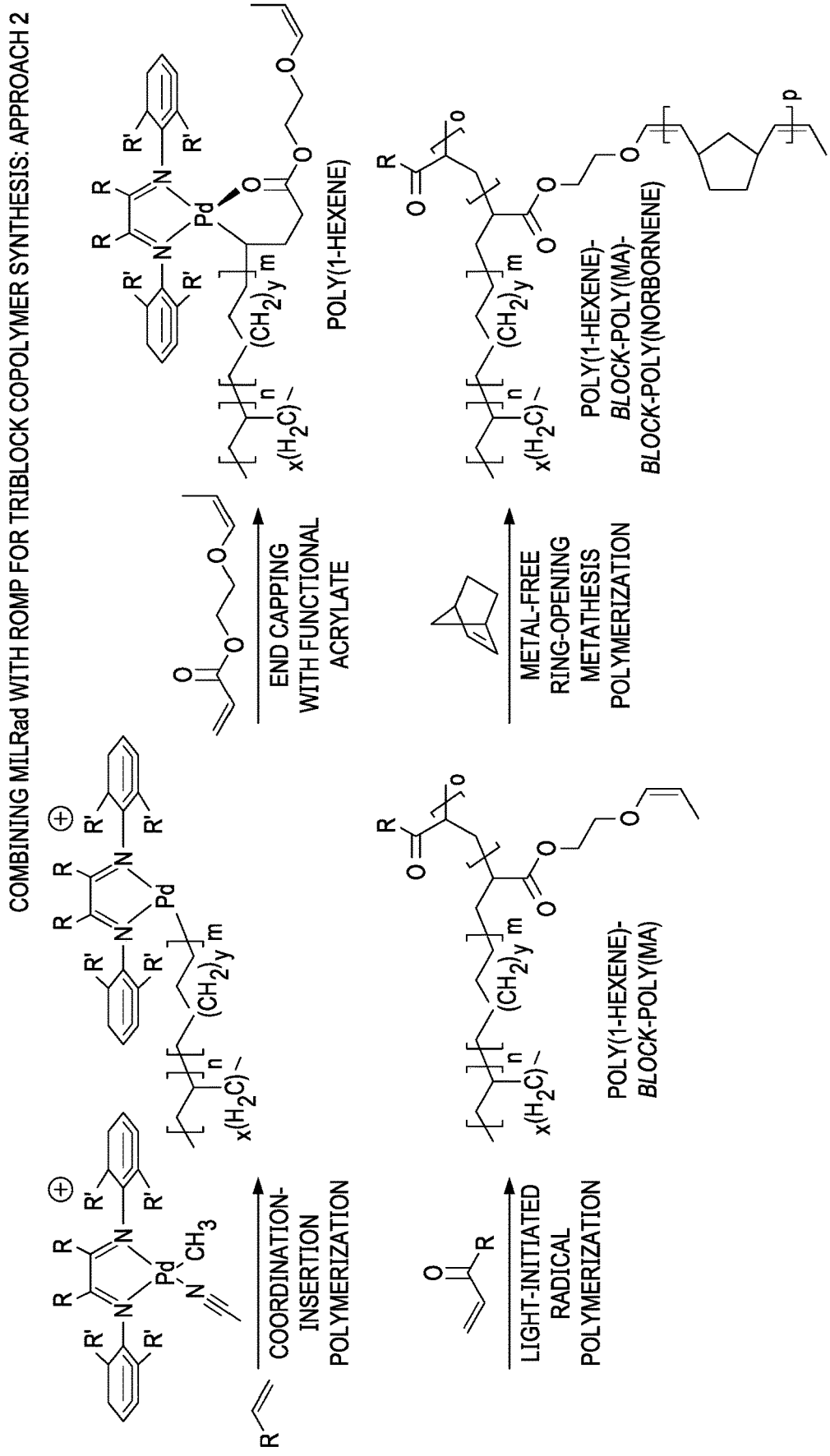
Figure 17C:
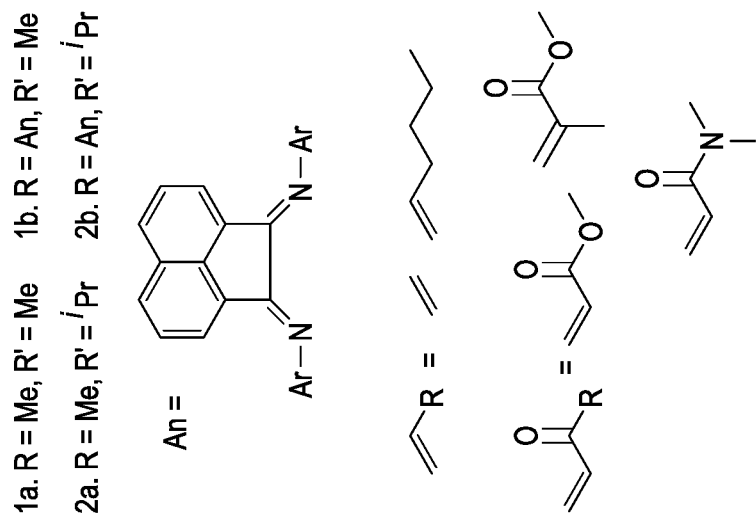
Figure 17C:
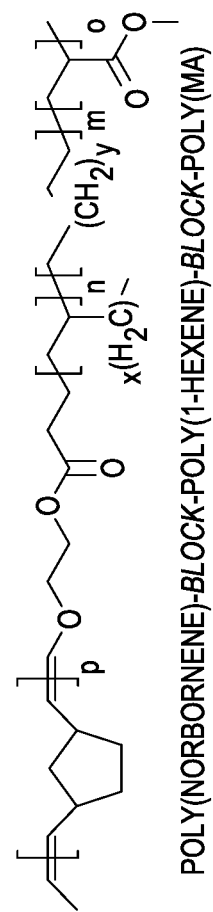

MILRad ROMP Chelate Reaction Polymerization: In a nitrogen filled glove bag, a flamed-dried 25 ml round bottom flask, equipped with a stir bar and wrapped with aluminum foil, was charged with a-diimine cationic Pd(II) POEA chelate (65 mg, 0.040 mmol), chlorobenzene (6.00 mL) and 1-hexene (0.68 g, 8.08 mmol). The reaction flask was sealed with a rubber septum under nitrogen and allowed to stir at room temperature, for 1 hour in the dark. At the end of dark cycle, aliquots were removed for GPC and NMR analysis. Afterwards, methyl acrylate (1.00 mL, 11.00 mmol) was added to the reaction vessel, followed by the removal of the aluminum foil covering. The reaction was placed next to blue LED light strips and the reaction was stirred for 24 h at room temperature. At the end of the reaction in the light, aliquots for NMR and GPC analysis were taken. The reaction was then quenched with 100 µl of triethylsilane and precipitated in an abundance of methanol. The precipitated polymer was collected and dried in vacuo to yield the pure BA diblock copolymer. The ROMP polymerization can be performed either before or after the MILRad Polymerization. (FIG. 17).

Figure 18:
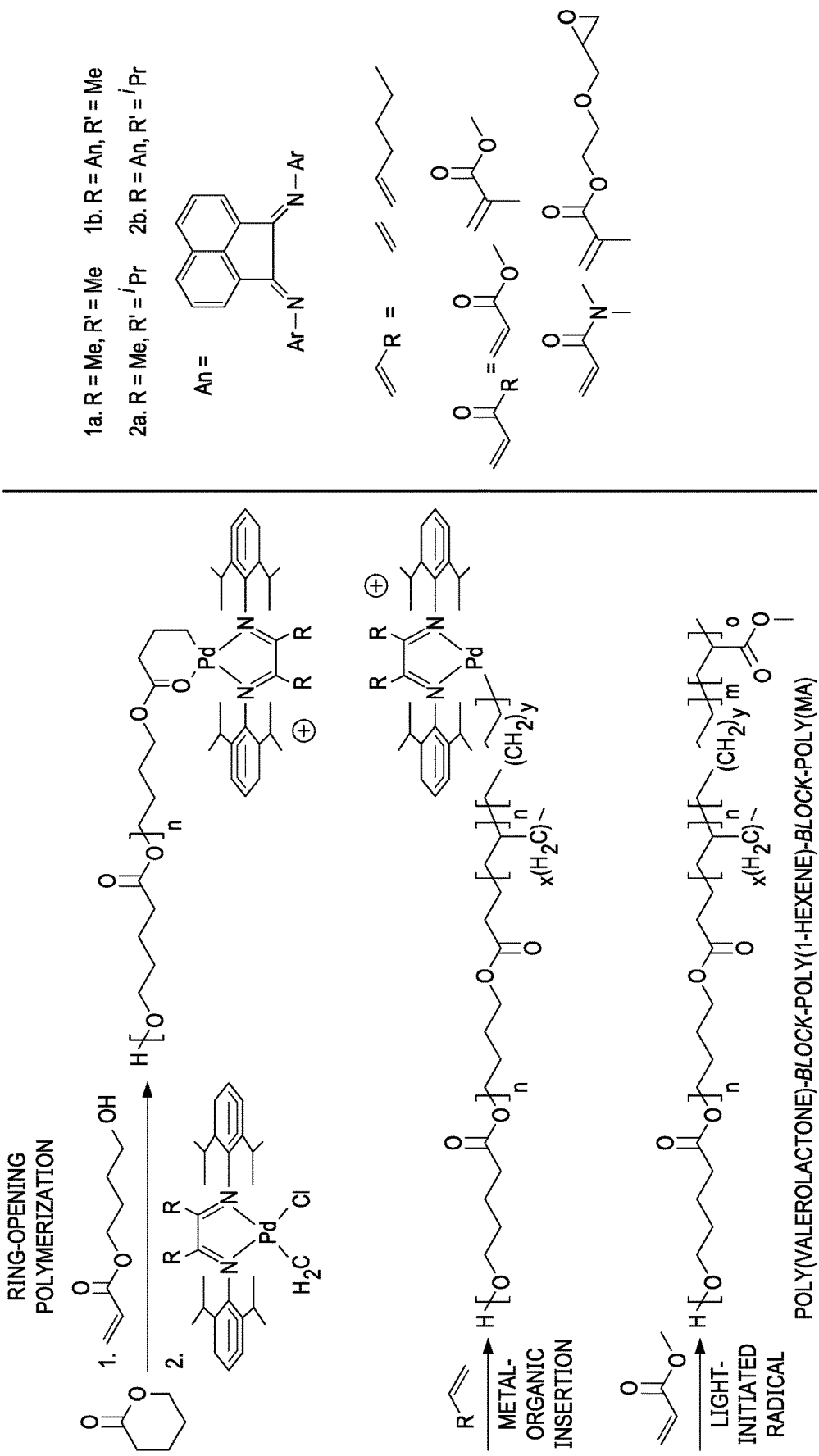
FIG. 18 depicts: a schematic of an embodiment for combining MILRad with ROP for a triblock copolymer synthesis.

MILRad ROP Chelate Reaction Polymerization: In the equivalent procedure the MILRad ROP can start from the chelate, following the ROP and then MILRad or can start from a chelate containing already polymer resulting from the Ring Opening Polymerization. (FIG. 18).

Figure 19:
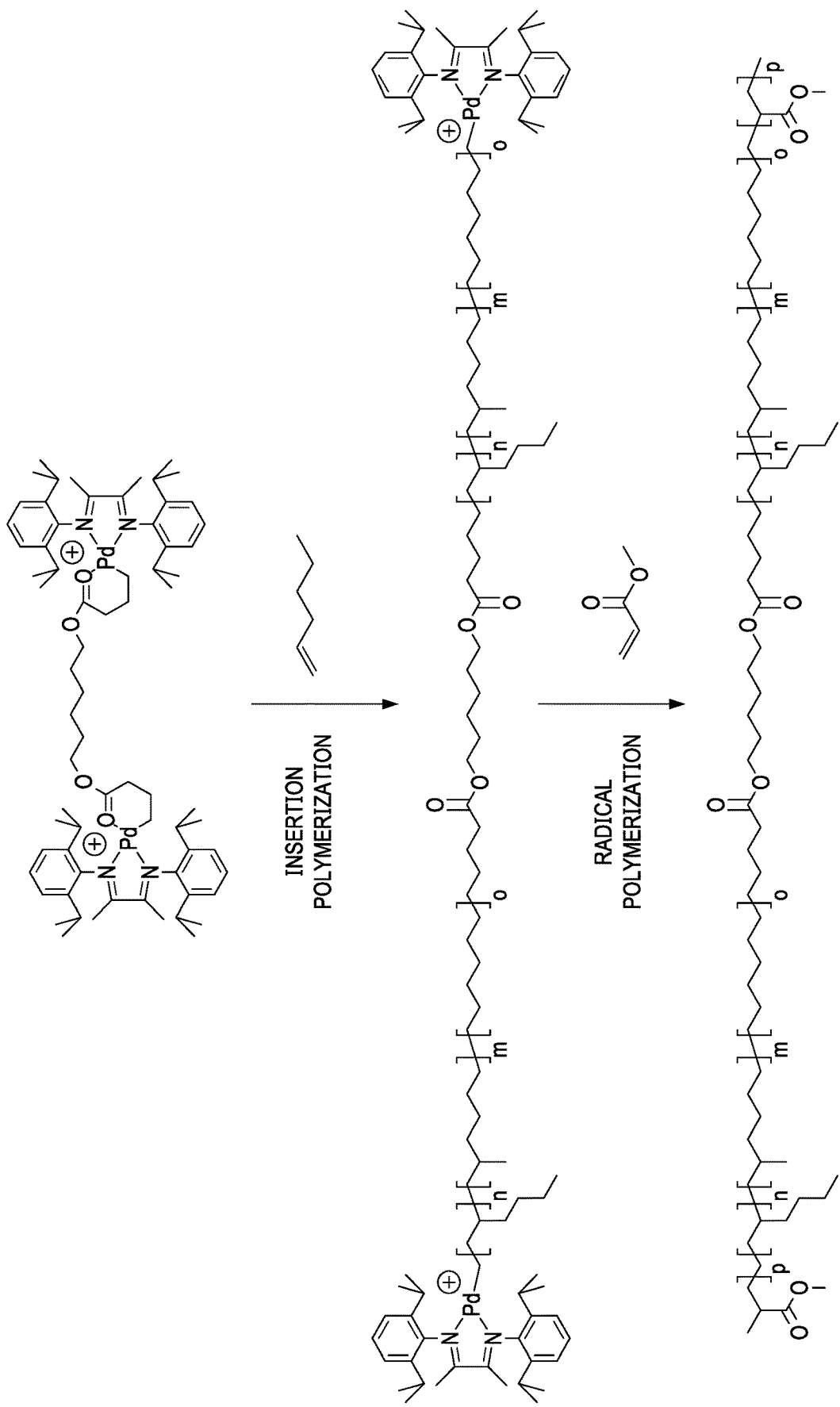
FIG. 19 depicts: a schematic of an embodiment for a one-pot synthesis of functional polyolefin triblock copolymer synthesis.

MILRad-Palladium Catalyst Reaction Polymerization: In some embodiments double headed MILRad chelated catalysts (FIG. 3 (B)) are used in a one-pot synthesis of functionalized triblock Copolymers. As such, embodiments of reactions were performed in flamed dried 4-dram vials equipped with magnetic stir bars and sealed with rubber septum stoppers. The reaction mixtures were irradiated with Sunnet RGB blue led light (λmax=450, 3600 lumens, 40W). All reactions were hung from a glass crystallization dish from the same height and distance from the light source using aluminum wire. A stream of dry air and a temperature probe was used to keep the temperature of the reactor at 25° C. Reactions were covered in aluminum foil to prevent pre-exposure of light prior to reactions. Reactions were conducted by mixing catalysts, solvent and monomer(s) in the 4 dram vials which were allowed to stir in the dark with aluminum foil. The foil was removed for the light synthesis (FIG. 19).

Example 5

MILRad Functionalization of Polyolefins and Post-Polymerization (AB Diblocks and ABA Triblocks)

In some embodiments, herein disclosed are chelated and non-chelated catalysts (FIGS. 1, 2, 3 (A) and 3 (B)) as described herein, that allow for the single installment or double installment of nitroxides respectively for the functionalization of polyolefins. These polymers in some embodiments are capable of (a) coordination-insertion mechanism to polymerize olefins, (b) a light initiated radical mechanism to install stable nitroxide radicals at the polyolefin chain ends; and (c) nitroxide mediated polymerization of styrene and methacrylates can be initiated from the chain end of these functionalized polymers, and wherein the employed catalysts include either non-chelated or chelated Palladium as a metal center.

Figure 20:
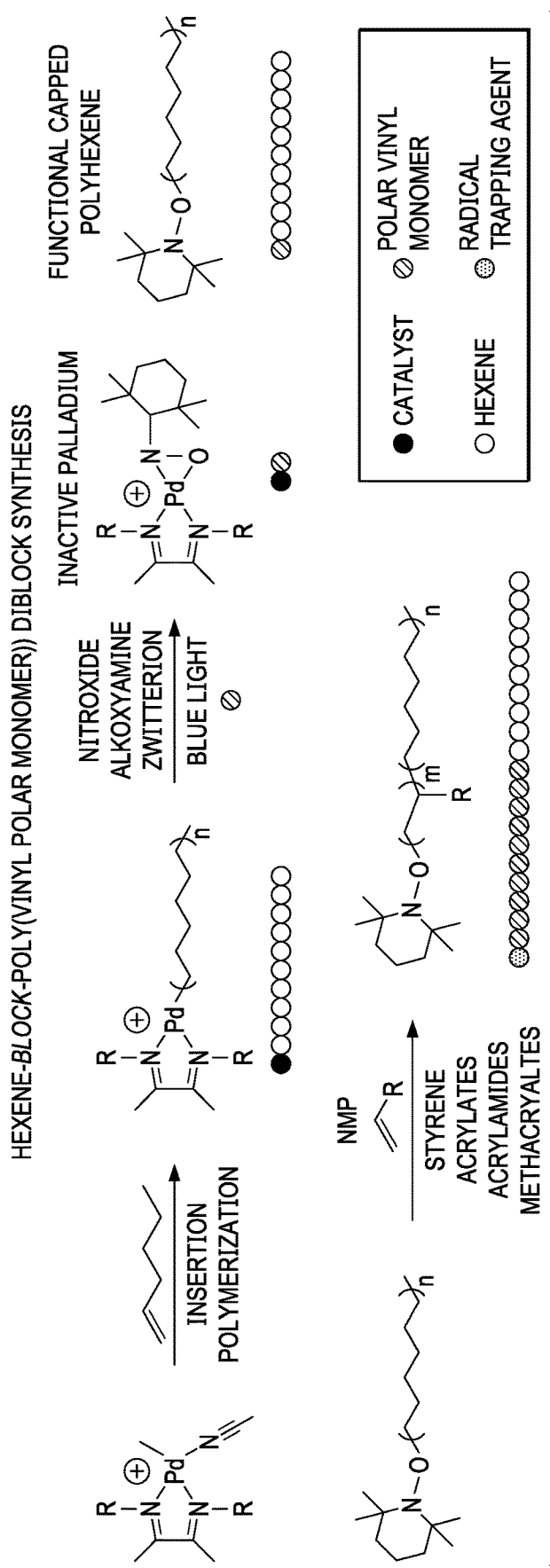
FIG. 20 depicts: a schematic of an embodiment for a hexene-block-styrene or hexene-acrylate (polar monomer) diblock synthesis. These polymers can be also be synthesized with ethylene equivalents.
Figure 21:
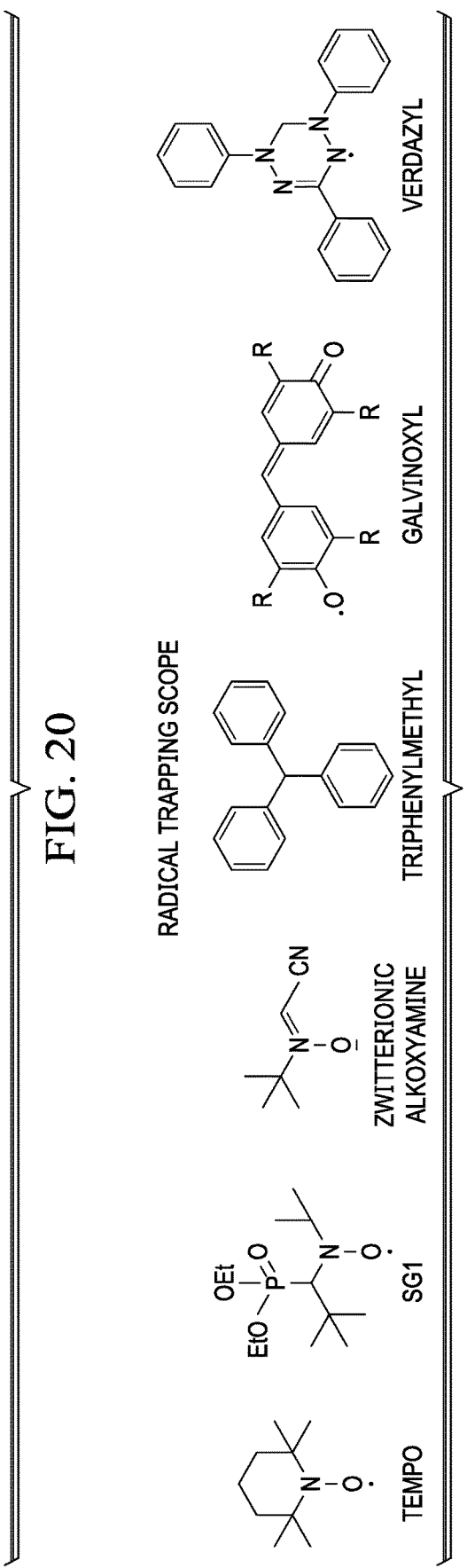
FIG. 21 depicts embodiments of structures comprising radical trapping moieties.

Synthesis of Polyolefin Capped with Nitroxides:

Reactions were performed in flamed dried 25 mL round bottom flasks equipped with magnetic stir bars and sealed with rubber septum stoppers. All reactions were hung from a glass crystallization dish from the same height and distance from the light source using aluminum wire. A stream of dry air and a temperature probe was used to keep the temperature of the reactor at 25° C. Reactions were covered in aluminum foil to prevent pre-exposure of light prior to reactions. Reactions were conducted by mixing embodiments of palladium catalysts, toluene and olefin(s) as described herein (FIG. 20 and FIG. 21) in the round bottoms which were allowed to stir in the dark with aluminum foil.

The foil was removed for the light synthesis (Sunnet RGB blue led light, max=450, 3600 lumens, 40 W), and a solution of the nitroxide dissolved in toulene was injected into the flask and allowed to react overnight. Nitroxide capping has further been confirmed with H-NMR.

While various exemplary embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

ADDITIONAL DESCRIPTION

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

While exemplary embodiments of the invention have been shown and described, modifications thereof can be made by one skilled in the art without departing from the teachings of this disclosure. The embodiments described herein are exemplary only, and are not intended to be limiting. Many variations and modifications of these examples are possible and are within the scope of the invention that is defined by the claims that follow below.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present disclosure. The disclosures of all patents, patent applications, and publications cited herein are hereby incorporated by reference. Unless expressly stated otherwise, the steps in a method claim may be performed in any order and with any suitable combination of materials and processing conditions.

The invention claimed is:

1. A method of polymerization to form a product polymer, the method comprising:
   polymerizing, in the presense of light and of a polymerization catalyst, a first monomer (A) selected from a first class of monomers; and
   polymerizing, in the absence of light and in the presence of the polymerization catalyst, a second monomer (B) comprising a non-functional olefin selected from a second class of monomers,
   wherein the first class of monomers comprises monomers (A) that polymerize via a radical pathway in the presence of light, wherein the second class of monomers comprises monomers (B) that polymerize via an insertion pathway the absence of light.

2. The method of claim 1, wherein the polymerization catalyst comprises an organometallic catalyst, including metallocene catalysts, for which light activation of the organometallic catalyst makes it operable as a radical polymerization catalyst, and for which the absence of light makes the catalyst operable as an insertion polymerization catalyst.

3. The method of claim 1, wherein the polymerization of the first monomer and the polymerization of the second monomer are effected substantially sequentially.

4. The method of claim 3, wherein the polymerization of the first monomer (A) is effected prior to the polymerization of the second monomer (B), wherein the polymerization of the second monomer is effected prior to the polymerization of the first monomer, or a combination thereof.

5. The method of claim 1, wherein the first monomer class comprises functionalized olefins.

6. The method of claim 5, wherein the first monomer is selected from vinyl monomers, acrylates, methacrylates, acrylam ides, styrenes, vinylethers, acrylonitrile, fluorinated olefins, norbornene, acrylesters, and derivatives thereof.

7. The method of claim 5, wherein the first monomer comprises methyl acrylate.

8. The method of claim 1, wherein the second monomer is selected from hexenes, butadienes, propylenes, ethylenes, or a combination thereof.

9. The method of claim 1, wherein the polymerization of the first monomer and the polymerization of the second monomer are initiated by turning a light ON or OFF, respectively.

10. The method of claim 1, wherein the presence of light comprises the presence of blue light.

11. The method of claim 1 further comprising controlling a polydispersity and/or molecular weight of each of the polymerization of the first monomer and the polymerization of the second monomer.

12. The method of claim 1, wherein the product polymer comprises a block copolymer.

13. The method of claim 12, wherein the polymerization of the first monomer and the polymerization of the second monomer are effected in a single vessel.

14. The method of claim 12, wherein the block copolymer comprises a di-, tri-, or higher multi-block copolymer.

15. A method of polymerization, the method comprising:
   (a) providing a polymerization mixture comprising a polymerization catalyst, a first monomer (A), and a second monomer (B), wherein the first monomer is selected from a first class of monomers that polymerize via a radical pathway in the presence of light, and wherein the second monomer comprises a non-functionalized olefin selected from a second class of monomers that polymerize via an insertion pathway in the absence of light;
   (b) effecting polymerization of the first monomer (A) by exposing the polymerization catalyst to light; and
   (c) effecting polymerization of the second monomer (B) by exposing the polymerization catalyst to darkness,
   to provide a product polymer.

16. The method of claim 15 further comprising first performing (b) subsequent (a), and/or alternating between (b) and (c) to provide a product polymer comprising the structure A, AB, ABA, or ABAB or ABC.

17. The method of claim 15 further comprising first performing (c) subsequent to (a) and prior to first performing (b), and/or alternating between (c) and (b) to provide a product polymer comprising the structure B, BA, BAB, or BABA or BAC.

18. The method of claim 15 further comprising providing a third monomer (C) and effecting polymerization of the third monomer in the presence of the product polymer.

19. The method of claim 18, wherein the polymerization of the third monomer (C) is effected via the same or a different polymerization catalyst, and wherein the polymerization of the third monomer (C) is effected prior to or subsequent (b) and/or (c) to form ABC triblock copolymers.

20. The method of claim 15, wherein said product polymer comprises an in-chain ester.

21. The method of claim 15, wherein said in-chain ester is further functionalized to produce polymers including at least one of an amine, an alcohol, and an acid moiety to form ABC triblock copolymers.

22. The method of claim 3, wherein said catalyst comprises at least one of compounds 1a, 1b, 1c, 1d, 2a, 2b, 2c, 2d, 3a, 3b, 3c, 3d, 4a, 4b, 4c, 4d, 5a, 5b, 5c, 5d, 6a, 6b, 6c, 6d, 7a, 7b, 7c, 7d, 8a, 8b, 8c, 8d, 9a, 10a, 11a, 11b, 11c, 12a, 13a, 14a, and 15a;

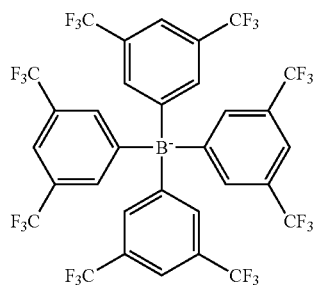

tetrakis[3,5-bis(triflouromethyl)phenyl]-borate (BArF) counterion for cationic Pd(II)

-continued
1a
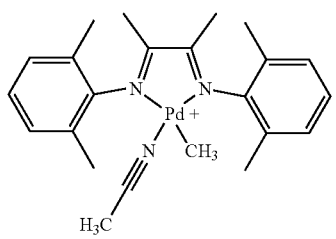
1b
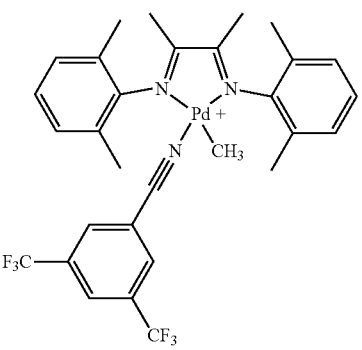
1c
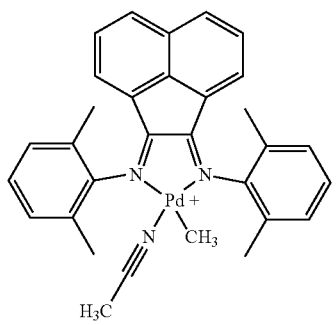
1d
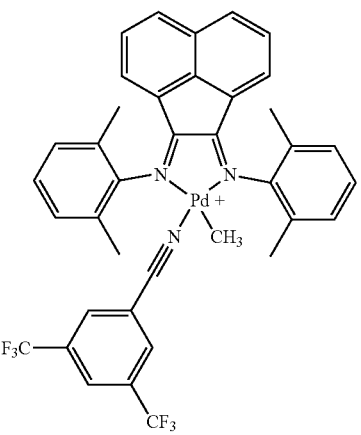
2a
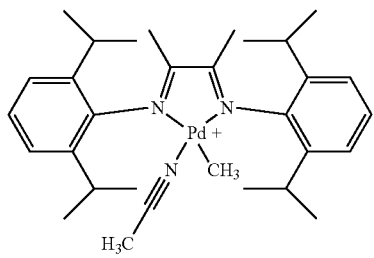
2b
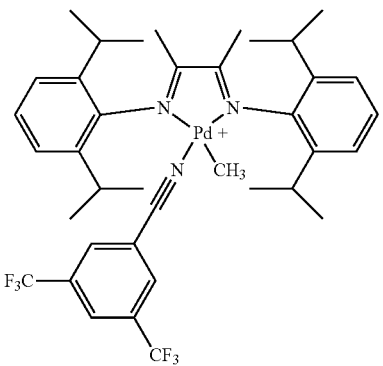
2c
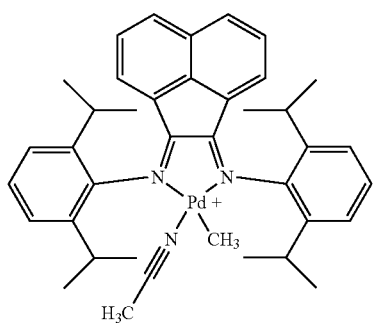
2d
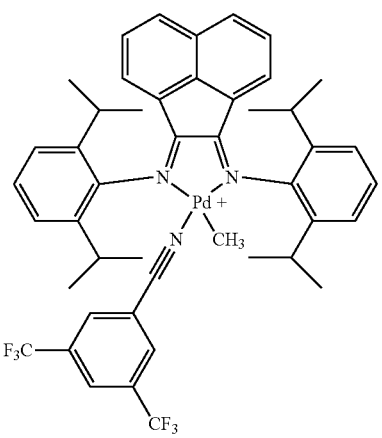

-continued
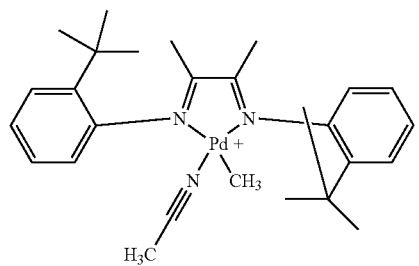
3a
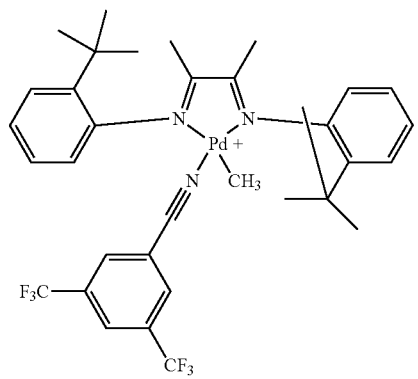
3b
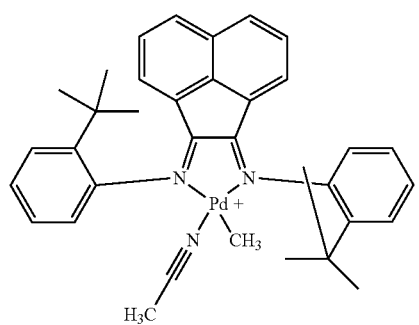
3c
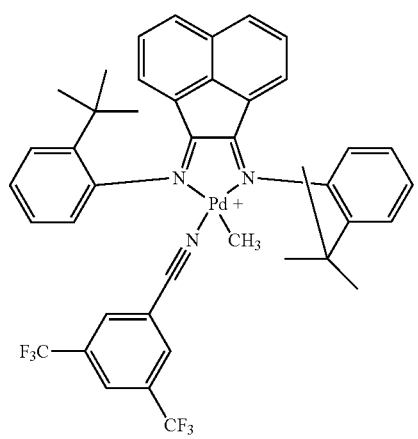
3d
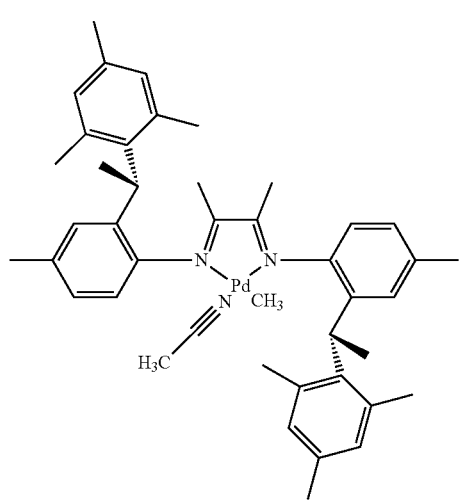
4a
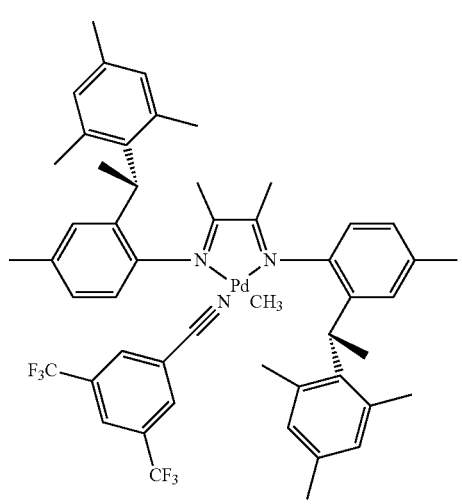
4b -continued
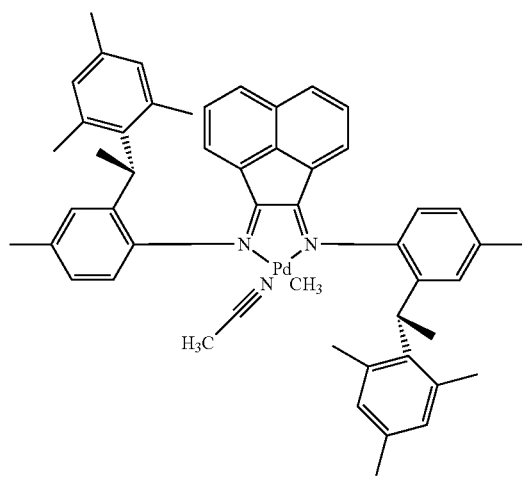
4c
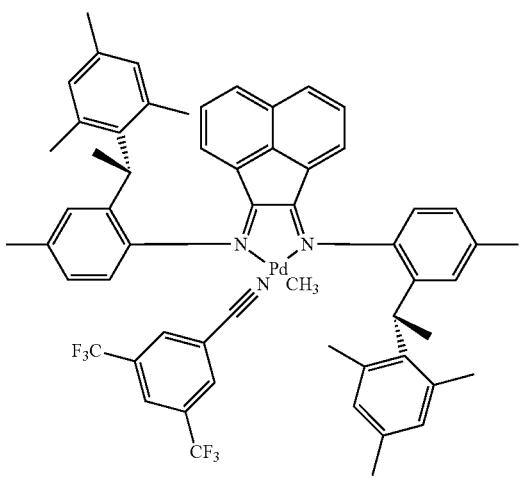
4d
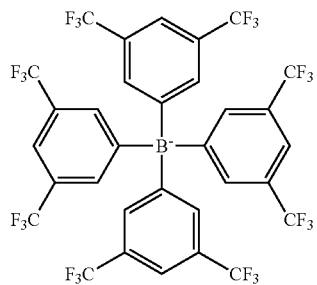
tetrakis[3,5-bis(triflouromethyl)phenyl]-borate
(BArF) counterion for cationic Ni(II)
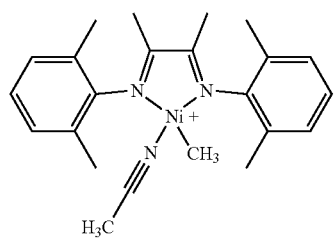
5a
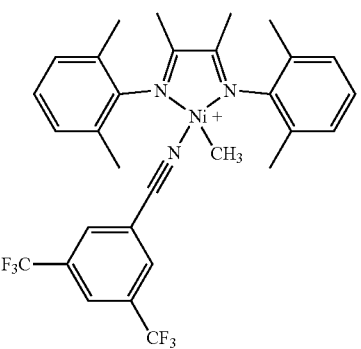
5b
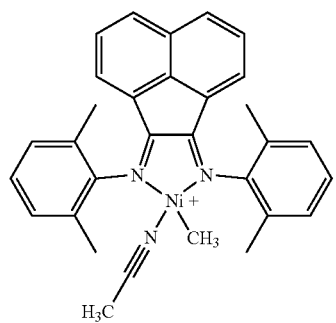
5c
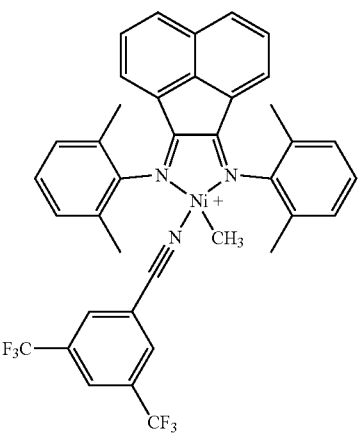
5d -continued
81
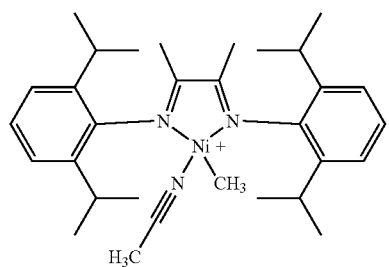
6a
82
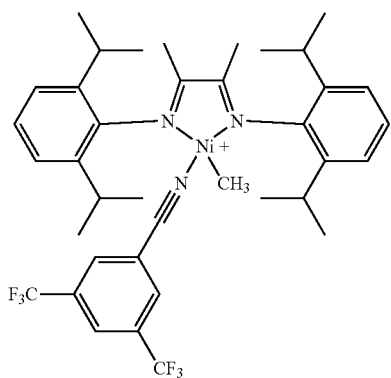
6b
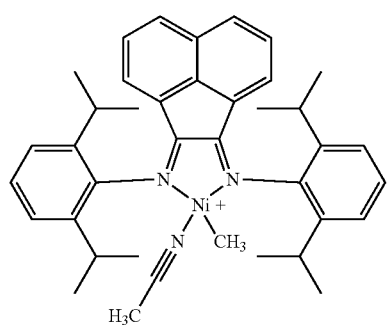
6c
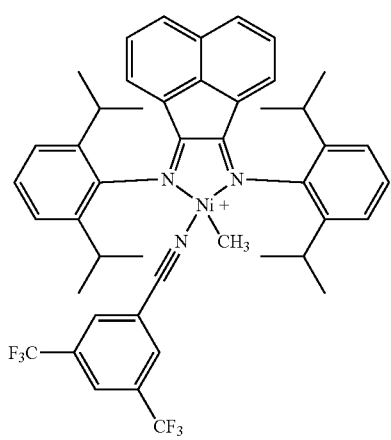
6d
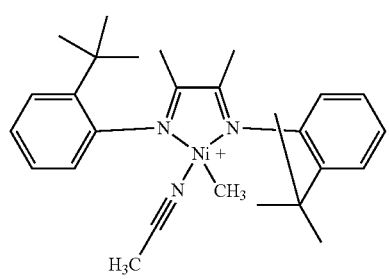
7a
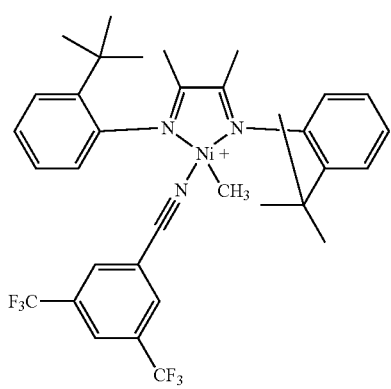
7b -continued
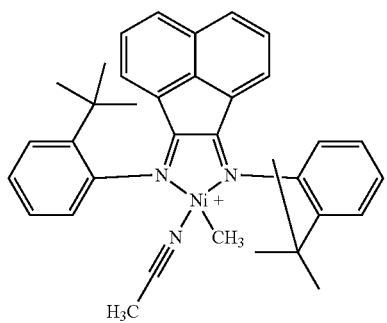
7c
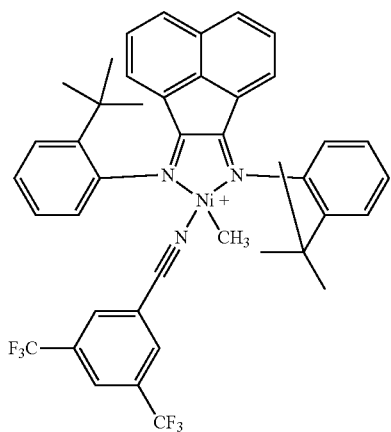
7d
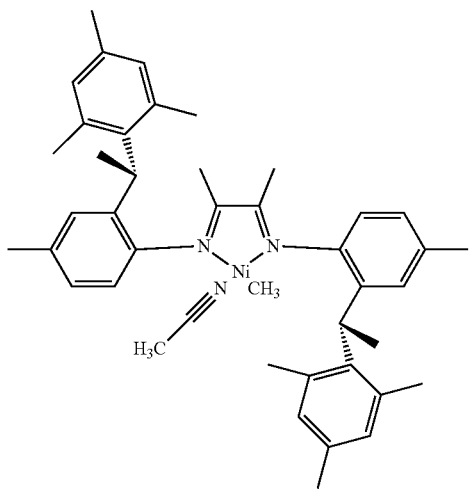
8a
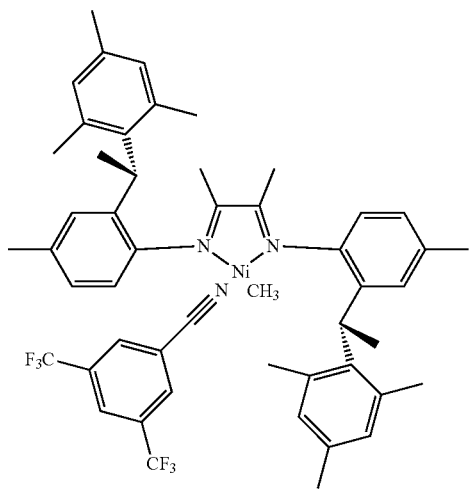
8b
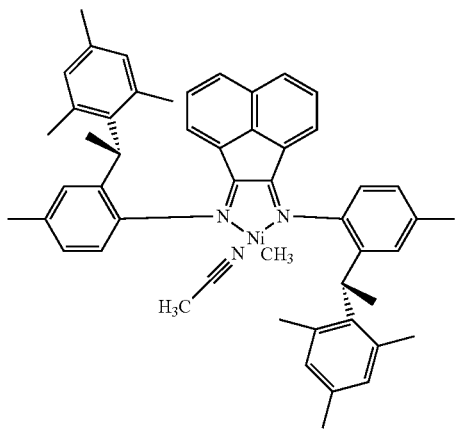
8c
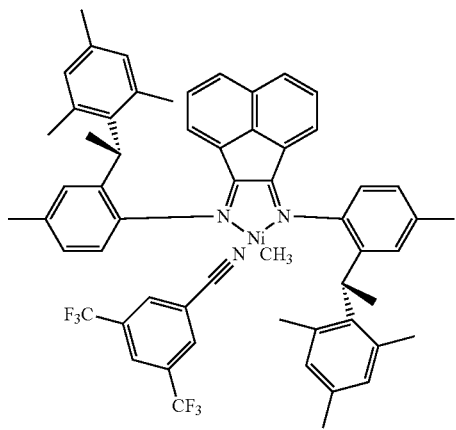
8d

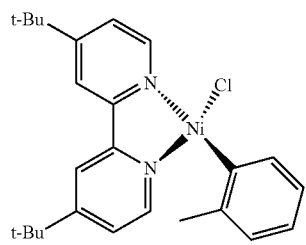
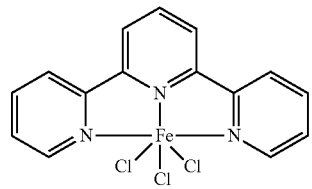
9a
10a
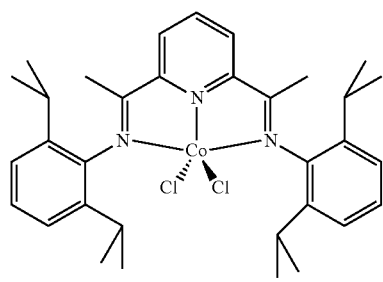
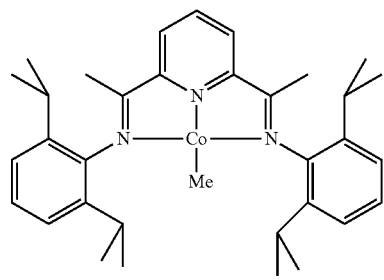
11a
11b
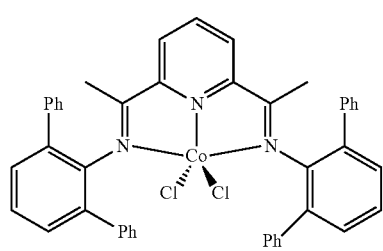
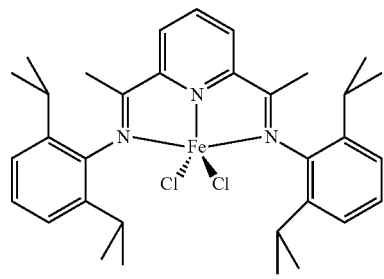
11c
12a
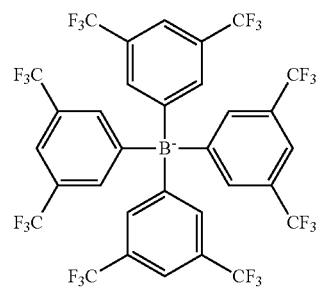
tetrakis[3,5-bis(triflouromethyl)phenyl]-borate
(BArF) counterion for cationic Ni(II)

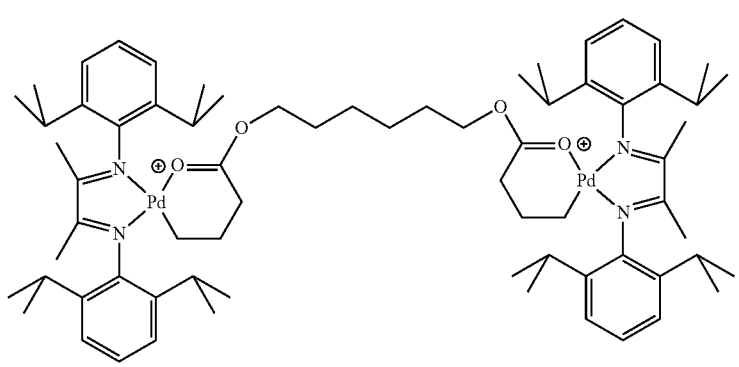
Double Headed MILRad Catalyst
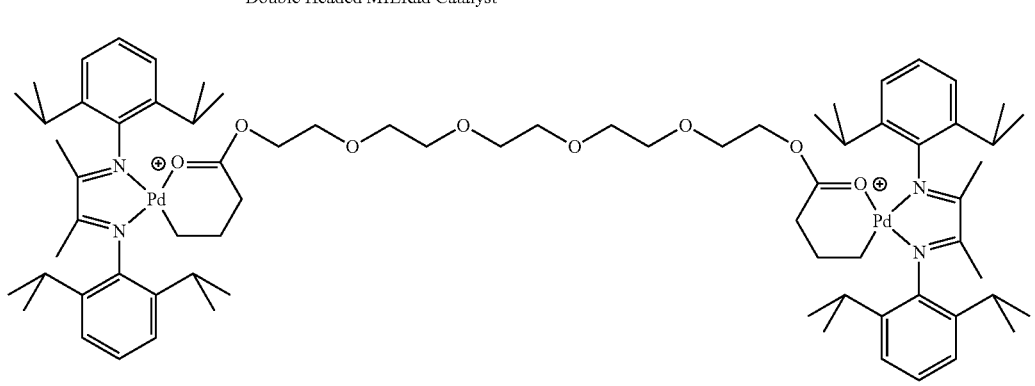
Double Headed MILRad Catalyst
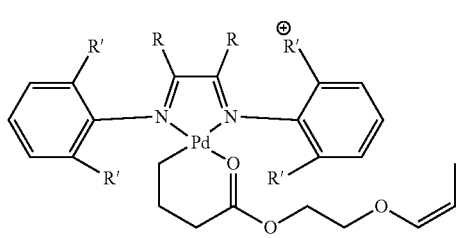
One-Pot MILRad/ROMP Chelate
and a BarF Pd(ii) counterion.
* * * * *